United States Patent
Kamahara

(10) Patent No.: US 8,381,434 B2
(45) Date of Patent: Feb. 26, 2013

(54) GREENHOUSE WINDBREAK MECHANISM

(76) Inventor: Masataka Kamahara, Kochi (JP)

( * ) Notice: Subject to any disclaimer, the term of this patent is extended or adjusted under 35 U.S.C. 154(b) by 88 days.

(21) Appl. No.: 12/742,483

(22) PCT Filed: Jul. 8, 2009

(86) PCT No.: PCT/JP2009/003170
§ 371 (c)(1), (2), (4) Date: May 12, 2010

(87) PCT Pub. No.: WO2010/073423
PCT Pub. Date: Jul. 1, 2010

(65) Prior Publication Data
US 2011/0041397 A1 Feb. 24, 2011

(30) Foreign Application Priority Data

Dec. 22, 2008 (JP) ................................. 2008-325823
Jun. 23, 2009 (JP) ................................. 2009-148184

(51) Int. Cl.
*A01G 13/00* (2006.01)

(52) U.S. Cl. ......................................................... 47/17

(58) Field of Classification Search .............. 47/17, 20.1
See application file for complete search history.

(56) References Cited

U.S. PATENT DOCUMENTS

| | | | | |
|---|---|---|---|---|
| 2,715,794 A * | 8/1955 | Atkinson | ....................... | 47/29.3 |
| 3,004,543 A * | 10/1961 | Pinet | ............................ | 135/137 |
| 3,100,950 A * | 8/1963 | Heuer | ............................. | 135/87 |
| 3,762,110 A * | 10/1973 | Boss, Jr. | ............................ | 52/63 |
| 3,874,114 A * | 4/1975 | Rowell | ............................ | 47/29.3 |
| 4,313,650 A * | 2/1982 | Ward et al. | ..................... | 359/596 |
| 4,527,544 A * | 7/1985 | Wolf et al. | ..................... | 126/605 |
| 4,586,297 A * | 5/1986 | Tagiasco | .............................. | 52/1 |
| 4,852,298 A * | 8/1989 | Markos | .............................. | 47/17 |
| 4,928,425 A * | 5/1990 | Walker et al. | ..................... | 47/18 |
| 5,524,381 A * | 6/1996 | Chahroudi | ........................ | 47/17 |
| 6,079,152 A * | 6/2000 | Hou | ................................. | 47/17 |
| 6,832,448 B2 * | 12/2004 | Stefan | ............................... | 47/17 |
| 7,533,488 B2 * | 5/2009 | Singer | ............................ | 47/19.1 |
| 2004/0177582 A1 * | 9/2004 | Adriaansen | ..................... | 52/537 |
| 2008/0016790 A1 * | 1/2008 | Weber | ............................. | 52/90.1 |

* cited by examiner

*Primary Examiner* — Monica Williams
*Assistant Examiner* — Joshua Huson
(74) *Attorney, Agent, or Firm* — Cheng Law Group PLLC

(57) ABSTRACT

There is provided a greenhouse windbreak mechanism which is less prone to collapse of cultivation greenhouses, even when the greenhouse windbreak mechanism is constructed along with the cultivation greenhouses such as plastic greenhouses with relatively-lower strength and is subjected to storm winds or strong monsoons. There are provided a windbreak fence which surrounds one or more cultivation greenhouses and is annularly placed to be erected with a larger height than that of the cultivation greenhouses, a ventilation portion which is formed, at an upper portion of the windbreak fence, to have a predetermined longitudinal width from the upper end of the windbreak fence and includes a plurality of through holes which are dispersedly placed; and a plurality of baffle plates which form a plurality of through holes in its entire surface or partially for passing strong winds therethrough when they are laterally placed above the cultivation greenhouses. The ventilation portion and the baffle plates alleviate strong winds intruding into the inside of the mechanism by getting around the upper end of the windbreak fence, when the strong winds impinge on the windbreak fence.

8 Claims, 35 Drawing Sheets

※Remark of perforated iron plate
(Hole diameter φ: 10 mm,
Hole pitch: 15 mm,
Thickness of perforated iron plate: 3 mm)

※Details of perforated
baffle plate
Hole diameter φ: 25 mm,
Thickness: 12 mm
A=Hole ※Details of perforated
baffle plate
Hole diameter φ: 25 mm.
Thickness: 12 mm
A-Hole ※Details of perforated baffle plate
[Hole diameter Φ: 25 mm, Thickness: 12 mm]

※ Details of perforated baffle plate
(A) Hole diameter Φ: 21 mm,
Other hole diameters Φ: 25 mm,
Thickness: 12mm ※Details of perforated baffle plate
[Hole diameter Φ: 25 mm,
Thickness: 12 mm]

※ Details of perforated baffle plate
{ (A) Hole diameter Φ: 21 mm,
Other hole diameters Φ: 25 mm,
Thickness: 12mm }

※Details of perforated baffle plate
[Hole diameter Φ: 25 mm, Thickness: 12 mm]

FIG.29
Cultivation greenhouse G-8
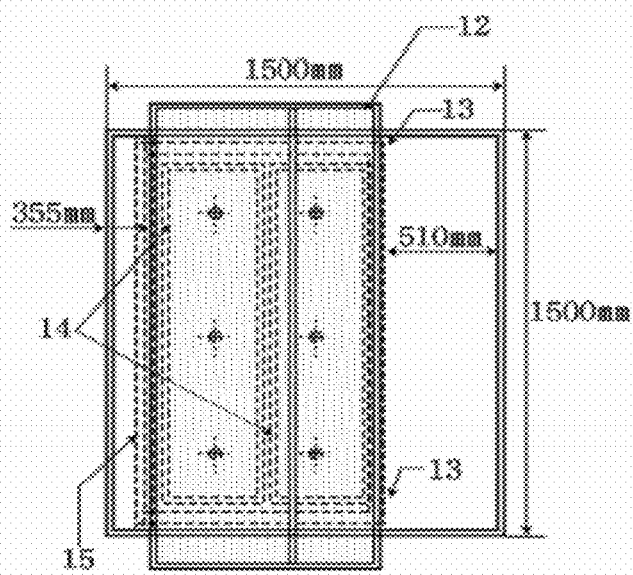
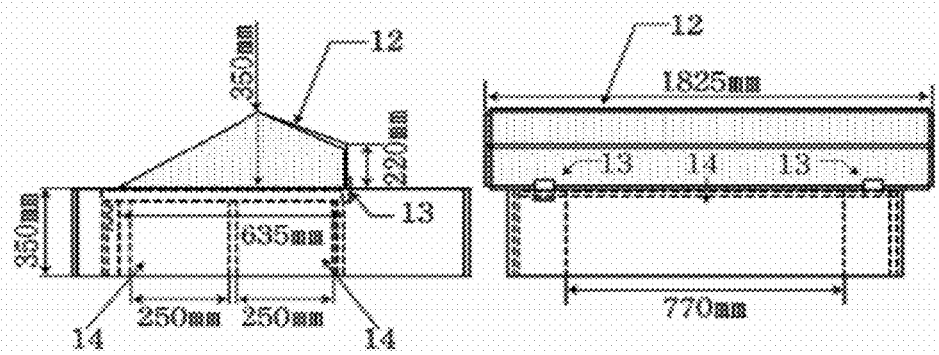

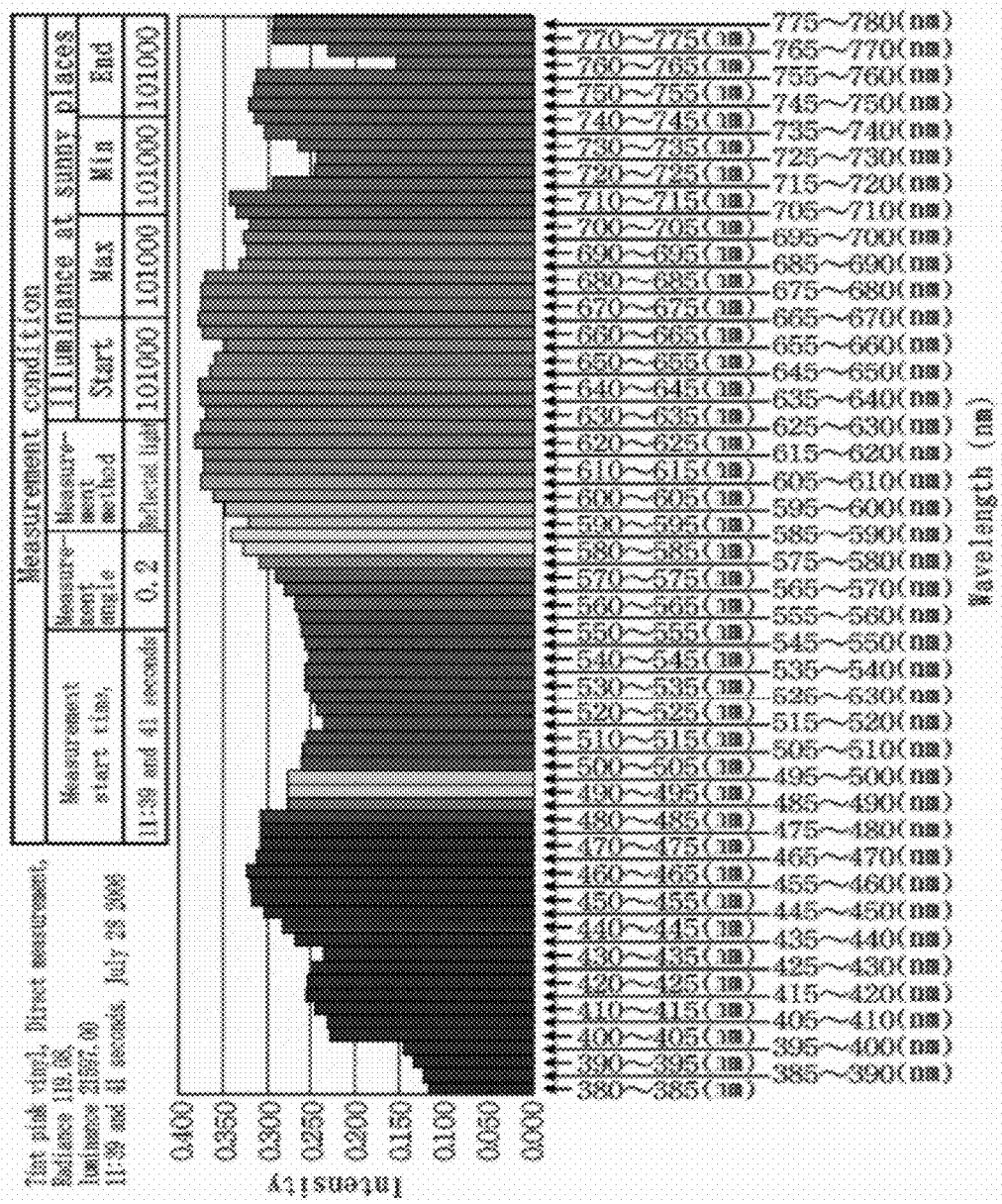

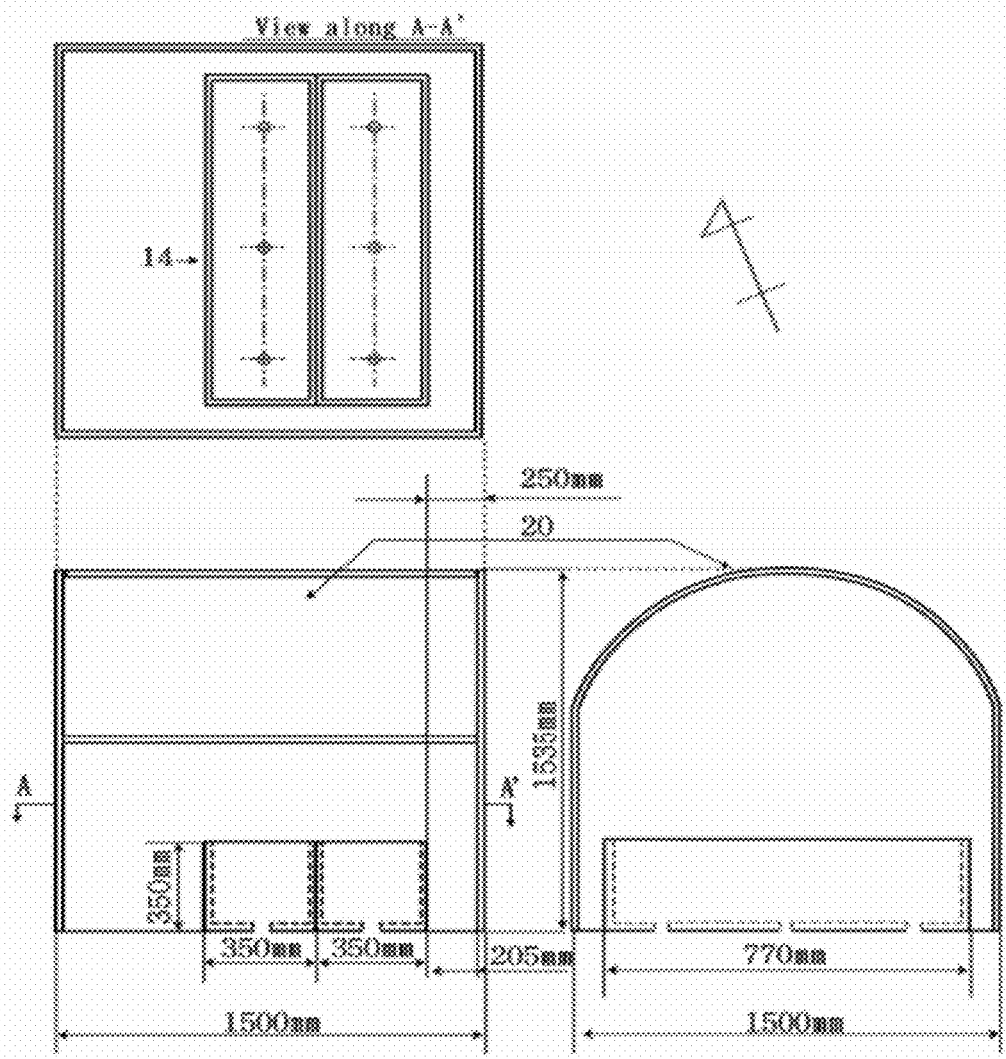

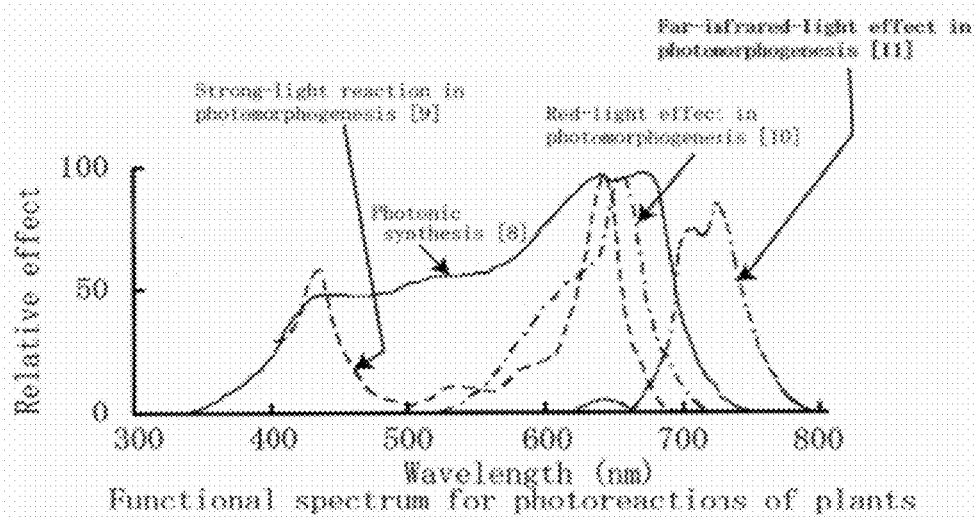

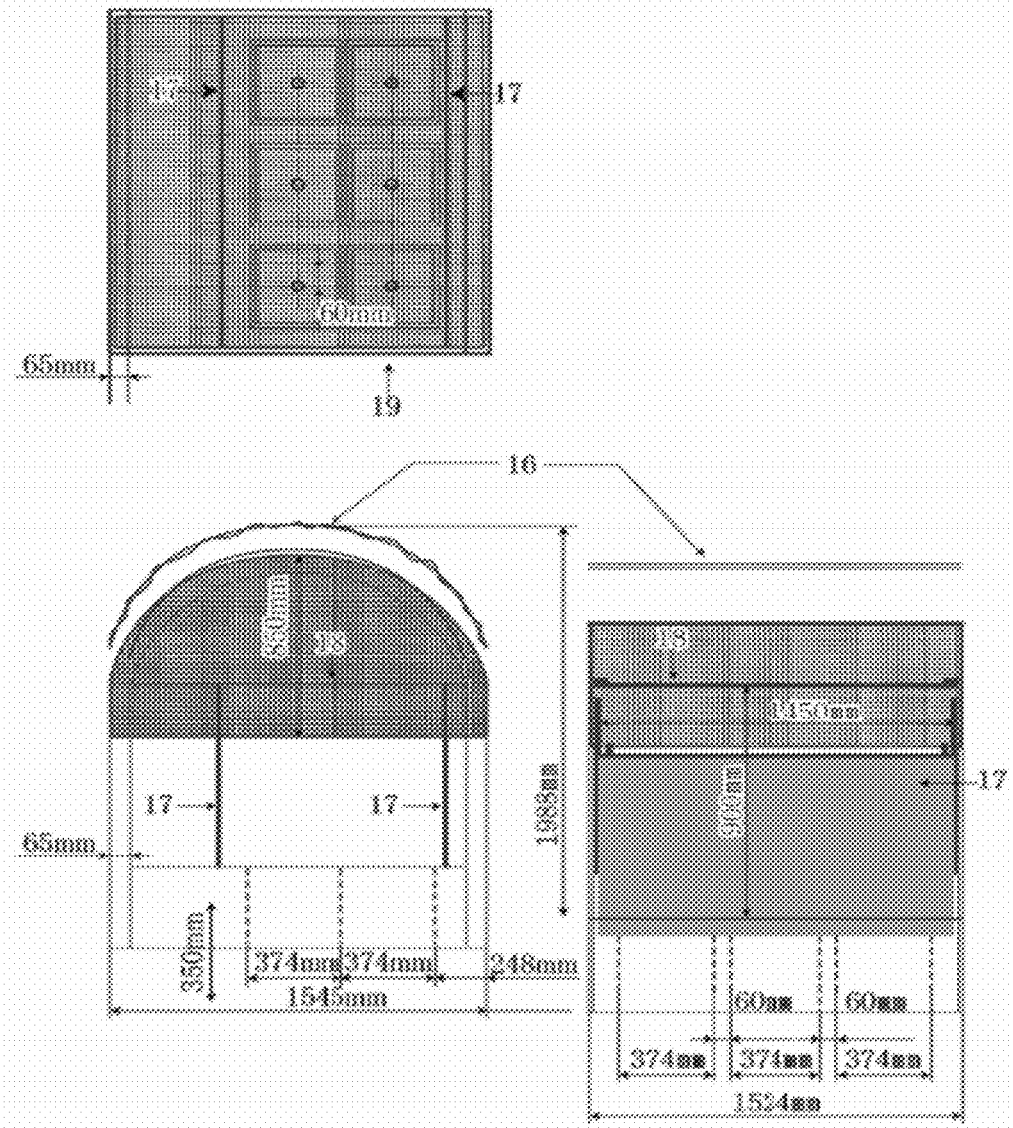

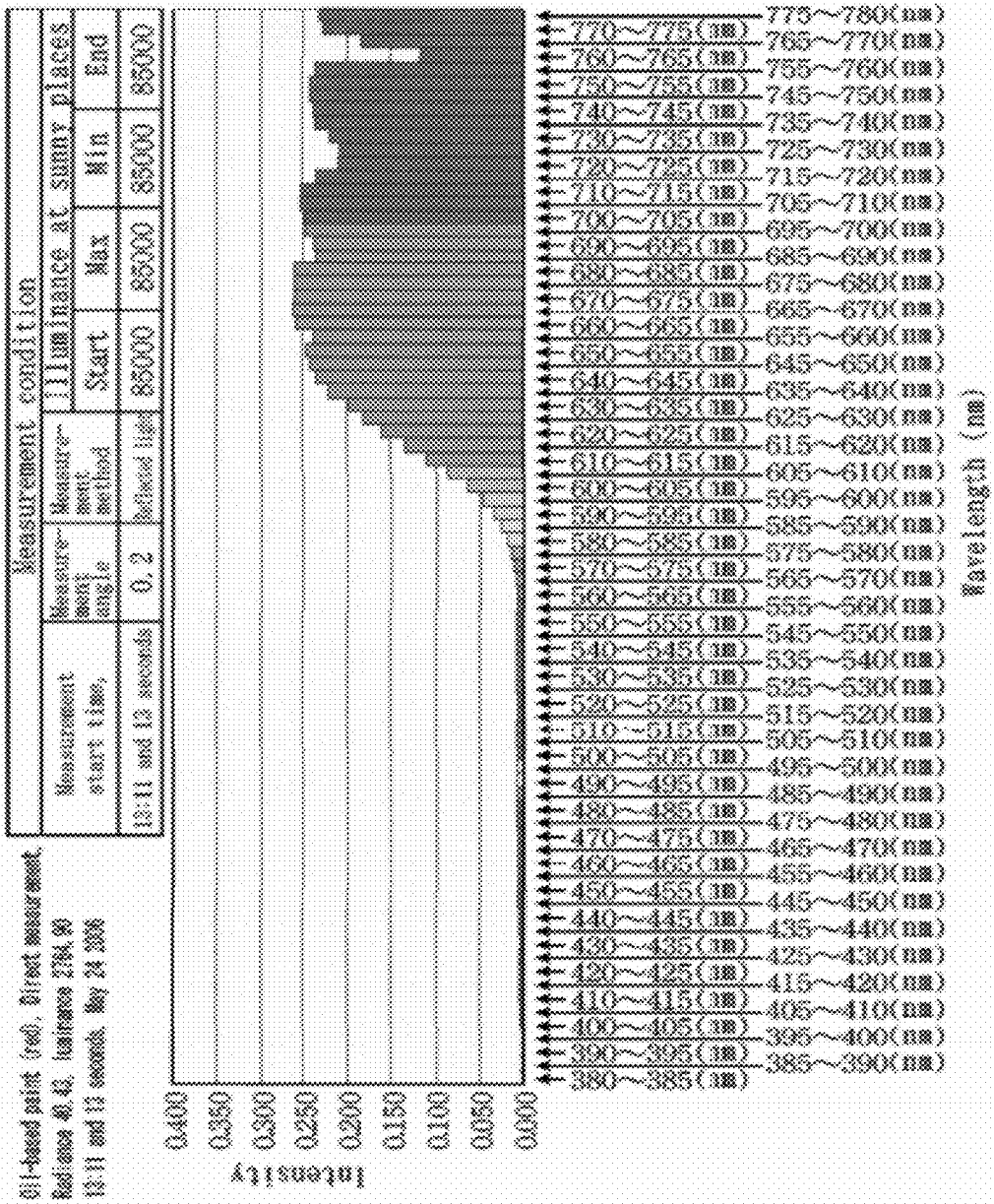

GREENHOUSE WINDBREAK MECHANISM

TECHNICAL FIELD

The present invention relates to a greenhouse windbreak mechanism which is less prone to collapses of cultivation greenhouses, even when the greenhouse windbreak mechanism is installed along with sunlight-parallel-use type cultivation greenhouses with relatively lower strength and is subjected to strong monsoons or storm winds caused by tropical cyclones such as typhoons. Another object of the present invention relates to a greenhouse windbreak mechanism capable of realizing environments which facilitate the growth of plants.

BACKGROUND ART

Cultivation greenhouses prevent vegetables within the greenhouses from being directly influenced by external air, which enables controlling environments other than sunlight, such as temperature, humidity, air flows and watering, thereby stabilizing production and product quality, in comparison with outdoor cultivations which are directly influenced by atmospheric temperature and weather. Cultivation greenhouses of sunlight-use types which utilize only sunlight and cultivation greenhouses of sunlight-parallel-use types which partially utilize photonic synthesis through sunlight are popular, since they enable cultivations in season-shift manners and sales with higher prices, in comparison with complete-control type plant factories which perform photonic synthesis only through artificial light sources without utilizing sunlight. Cultivation greenhouses generally include plastic greenhouses and glass greenhouses and have been installed in various areas, as well as in cold areas in Japan, at the present time.

A plastic greenhouse includes iron pipes or wooden members as its frames and also is covered at its outer walls with synthetic resin films made of polyethylene, polyvinyl chloride or the like. Plastic greenhouses are reduced in transmittance, since the resin films therein are degraded by ultraviolet rays in sunlight, which necessitate replacement of these films at regular time intervals. However, these plastic greenhouses are more inexpensive than glass greenhouses provided with large-sized and heavy glass plates and are used in wider ranges than those of glass greenhouses. Plastic greenhouses necessitate replacement of resin films at regular time intervals and, furthermore, have the problem of the occurrence of damages of crops therein and collapse of the greenhouses themselves in the event that the vinyl films are fractured by strong winds. This problem is also induced in glass greenhouses more than a little.

As a countermeasure against collapse of vinyl greenhouses, in JP-A No. 9-51729, beams are formed from iron pipes with larger thicknesses, similarly to the supporting columns, and nets or vinyl sheets integrated with tension-construction wires are mounted to the outer sides of greenhouses. In JP-A No. 2001-95397, films or nets which are attached to greenhouses are enabled to be completely eliminated or upwardly wound immediately before the occurrence of typhoons, further two films are provided and stretched such that they overlap with each other, arch pipes arranged in conformance to a ridge are bound to one another at their center portions through reinforcing ropes, and these ropes are coupled, at their opposite ends, to a vertical frame pipe. In JP-A No. 2002-78421, poles are erected outside outer-peripheral poles constituting a greenhouse framework with intervals provided therebetween, pipes are coupled to both the poles therebetween for reinforcing them with each other, and this framework is placed at a predetermined interval from the greenhouse in the circumferential direction and is coupled to the greenhouse.

Prior Art Literature
Patent Literature
  Patent Literature 1: JP-A No. 9-51729
  Patent Literature 2: JP-A No. 2001-95397
  Patent Literature 3: JP-A No. 2002-78421
Non-Patent Literature
  Non-Patent Literature 1: Masaki Takatsuji, "The Basic and Practices of Plant Factories", Shoka Shobo

SUMMARY OF INVENTION

Problems to be Solved by the Invention

Most of countermeasures against strong winds and storm winds for plastic greenhouses involve reinforcing frames as described above. In this case, vinyl films are laminated in two layers or three layers in many cases. In cases of glass greenhouses, similarly, glass plates are merely laminated in two layers. Therefore, strong winds directly impinge on the vinyl films or nets in the plastic greenhouses, which tends to damage the vinyl films or nets, even though the frame is reinforced for preventing their collapse. Even when vinyl sheets integrated with tension-construction wires are employed as in JP-A No. 9-51729 or even when agricultural polyolefin-based films or fluorocarbon resin films are provided in a stretched manner, instead of deteriorative polyvinyl chloride films, in order to prevent the fracture of the films, it is impossible to overcome the problem. Even in cases of glass greenhouses, the glass plates may break.

The present invention was suggested in order to overcome the aforementioned problems in conventional plastic greenhouses and aims at providing a greenhouse windbreak mechanism capable of preventing cultivation greenhouses from being collapsed even in the event of strong winds. It is another object of the present invention to provide a greenhouse windbreak mechanism capable of continuously introducing, into greenhouses, external air closer to slight winds, even under strong-wind conditions. It is still another object of the present invention to provide a greenhouse windbreak mechanism capable of realizing environments close to sunbeams streaming through leaves which facilitate the growth of plants.

Means for Solving the Problems

A first aspect of the present invention provides a greenhouse windbreak mechanism comprising: a windbreak fence which surrounds one or more cultivation greenhouses and is annularly placed to be erected with a larger height than that of the cultivation greenhouses; a ventilation portion which is formed, at an upper portion of the windbreak fence, to have a predetermined longitudinal width from the upper end of the windbreak fence and includes a plurality of through holes which are dispersedly placed; and a plurality of baffle plates which form a plurality of through holes in its entire surface or partially for passing strong winds therethrough when they are laterally placed above the cultivation greenhouses; wherein the ventilation portion and the baffle plates alleviate strong winds intruding into the inside of the mechanism by getting around the upper end of the windbreak fence, when the strong winds impinge on the windbreak fence.

A second aspect of the present invention provides a greenhouse windbreak mechanism according to the first aspect, wherein the ventilation portion is formed to have a longitudinal width of 50 to 200 mm from the upper end of the windbreak fence.

A third aspect of the present invention provides a greenhouse windbreak mechanism according to the first aspect, wherein when strong winds pass through the baffle plates, the average wind speed value thereof is reduced to 24 to 32%.

A fourth aspect of the present invention provides a greenhouse windbreak mechanism according to the first aspect, wherein the lateral width of the baffle plates is larger than the longitudinal width of the ventilation portion.

A fifth aspect of the present invention provides a greenhouse windbreak mechanism according to the first aspect, wherein in the placement of the baffle plates in a plane at an upper portion of the greenhouse windbreak mechanism, the baffle plates are arranged at equal intervals in the longitudinal and lateral directions and in a brace shape, in their entirety.

A sixth aspect of the present invention provides a greenhouse windbreak mechanism according to the first aspect, wherein a windbreak fence is made of a transparent or semi-transparent material.

A seventh aspect of the present invention provides a greenhouse windbreak mechanism according to the first aspect, wherein the windbreak fence is vertically fixed by supporting column which is vertically erected on the ground.

An eighth aspect of the present invention provides a greenhouse windbreak mechanism according to the first aspect, wherein an openable ventilating door is mounted at a portion of the windbreak wall.

A ninth aspect of the present invention provides a greenhouse windbreak mechanism, wherein, assuming that spectral radiance in a wavelength range having a red light effect on photomorphogenesis is red light R, spectral radiance in a blue-light wavelength range which belongs to strong light reactions in photomorphogenesis is blue light B, and spectral radiance in a wavelength range having a far infrared light effect on photomorphogenesis is far infrared light FR, the windbreak fence, the column and the baffle plates, and vinyl or glass forming a plastic greenhouse or glass greenhouse installed inside the greenhouse windbreak mechanism are colored in a color having a spectrum in which spectral radiances of visible light of other colors than the color which reflects red light R and the color which reflects far infrared light FR are smaller than those of the red light R and the far infrared light FR, brightness with light intensity equal to or more than the photosynthesis-rate saturation light intensities for vegetables to be cultivated in the greenhouses is ensured, and the red-light-R/blue-light-B ratio is higher than that of bare grounds and the red-light-R/far-infrared-light-FR ratio is lower than that of bare grounds in the cultivation environment in the greenhouses.

Effects of the Invention

The greenhouse windbreak mechanism according to the present invention is capable of preventing crops in greenhouses from being damaged and preventing the cultivation greenhouses from being collapsed when the greenhouses are subjected to strong monsoons or storm winds caused by tropical cyclones such as typhoons, thereby enabling stably supplying vegetables even during years including many adverse weather conditions. With the greenhouse windbreak mechanism according to the present invention, it is possible to enable normal plastic greenhouses to withstand in strong winds, thereby providing greenhouses with excellent durability more cheaply than glass greenhouses. The greenhouses constructed inside the fence are greenhouses with a height of about 2 m and a longitudinal width of about 3 m, and these greenhouses have smaller capacities therein per unit area, which provides the advantage that the fuel cost for warming up during winter seasons is reduced by an amount corresponding to the reduction of the capacity.

Sunlight impinges on the fence, the poles and the baffle plates and is reflected thereby, which makes the R/B ratio larger than that in bare grounds and makes the R/FR ratio smaller than that in bare grounds, in the sunlight spectrum. This provides the effect of changing the spectrum of sunlight to increase the amount of crops. Further, by coloring the fence, the poles and the baffle plates in a mixed color constituted by red light (R) and infrared red light (FR), it is possible to change the photo ratio more largely. The windbreak mechanism can be used as equipment capable of offering the effect utilizing the fact.

BRIEF DESCRIPTION OF DRAWINGS

FIG. 29 illustrates a cultivation greenhouse G-B: a greenhouse constituted by a plastic subjected to spraying of red-color paint until its transmittance reached 46.4%.

FIG. 31 is a spectrum of a tint pink plastic.

FIG. 32 illustrates a cultivation greenhouse [8]: normal plastic greenhouse.

FIG. 33 is a spectrum of the actions of photoreactions of plants.

FIG. 34 illustrates a cultivation greenhouse [14].

FIG. 35 is a spectrum of a red-color oil-based paint.

BEST MODE FOR CARRYING OUT THE INVENTION

Next, an embodiment of the present invention will be described with reference to the drawings.

Figure 1:
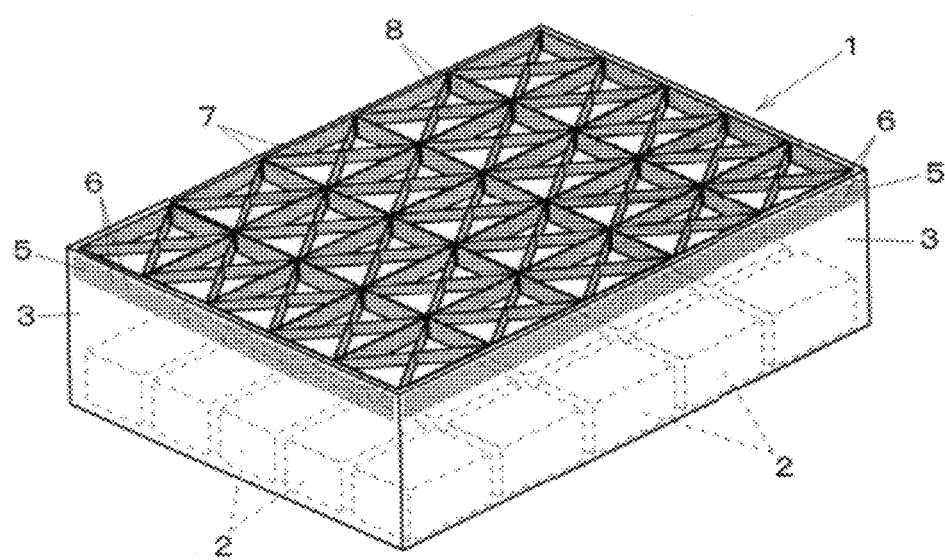
FIG. 1 is a schematic perspective view illustrating an example of a greenhouse windbreak mechanism according to the present invention.

FIG. 1 illustrates a greenhouse windbreak mechanism 1 according to the present invention. The greenhouse windbreak mechanism 1 includes a windbreak fence 3 or a windbreak wall with rectangular plane which surround one or more plastic greenhouses 2 or glass greenhouses, and the height of the windbreak fence is set to be much higher than that of the greenhouses 2. Usually, the windbreak fence 3 is secured to a metal frame (not illustrated) including poles installed vertically on the ground and, when the windbreak fence 3 is vertically installed, usually, the windbreak fence 3 has the same height over its entirety, but its height can be partially changed.

The windbreak fence 3 is provided, at its upper portion, with a ventilation portion 5 or a perforated portion with a predetermined longitudinal width. The ventilation portion 5 may either be formed as a perforated portion by providing plural through holes 6 directly in the upper portion of the windbreak fence 3 or be formed by horizontally mounting, thereto, thin and long perforated baffle plates separated from the windbreak wall. The windbreak fence 3 is formed from corrugated plates or sheets which are made of polyolefin, polyvinyl chloride, polycarbonate or the like and is transparent or semitransparent in order not to interrupt sunlight to the green houses 2 and, also, may be properly colored in order to pass, therethrough, large amounts of certain visible light rays for facilitating the growth of plants.

The baffle plates 7 are thin and long plate members provided with a plurality of through holes 8 over its entire surface or partially, and the respective baffle plates 7 are placed laterally and arranged vertically on the upper end of the windbreak fence 3 to provide large interstices in their entirety to provide a structure which allows strong winds to pass therethrough in the vertical direction and, also, prevents sunlight to the greenhouses 2 from being interrupted more than needed. Although the baffle plates 7 have a combination of plane placement of rectangular shapes and diagonal lines in FIG. 1, it is also possible to place them in a plane, in a parallel manner, in a lattice shape, a zigzag shape and the like. The baffle plates 7 are made of metal plates or veneer plates which are colored in a desired color or may be also made of transparent plastic plates provided with through holes.

In suggesting the greenhouse windbreak mechanism 1, typhoons were taken into account, as well as monsoons, as winds to be broken. Typhoons are tropical cyclones which are ascending air currents and, therefore, are imaged as blowing obliquely upwardly when they are viewed in a wide range, but, n local areas, they blow horizontally in parallel with the ground when the ground is a flatland, similarly to monsoons. Accordingly, if the plastic houses are surrounded by a high wall, the wall obstructs strong winds and changes winds around the wall to slight winds, but strong winds blow into the inside of the wall by getting around the wall at positions farther from the wall. Their tendency to blow thereinto by getting around is increased with increasing areas surrounded by the wall. If a forest is formed by tree planting inside of the wall, branches and leaves of trees interrupt winds, thereby alleviating their blowing into the inside of the wall, as a matter of course. Accordingly, baffle plates were mounted instead of tree planting at constant intervals, and experiments were conducted for determining whether or not the baffle plates had a windbreak effect.

(Experiments in a Typhoon Model)

Figure 2:
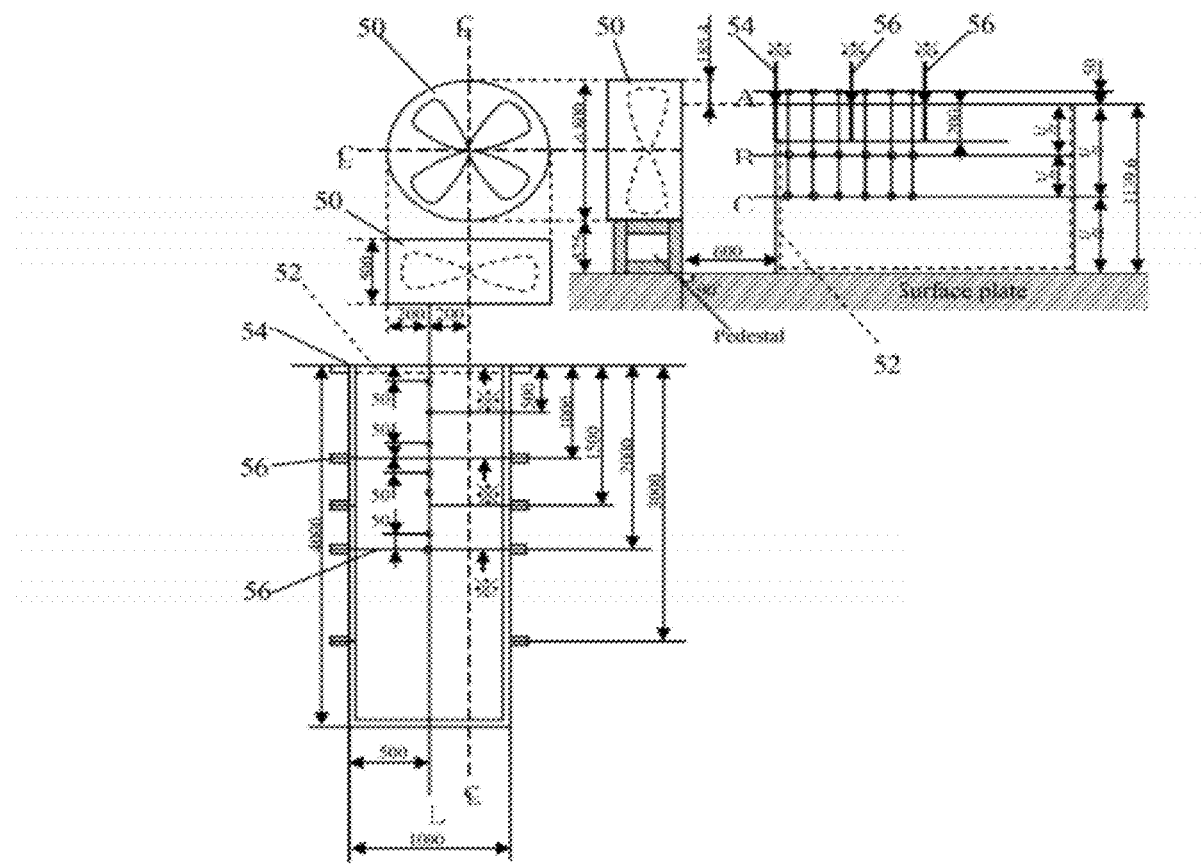
FIG. 2 is a side view and a plan view schematically illustrating a device for windbreak experiments which utilizes an axial fan.

In experiments, horizontal strong winds were generated by a commercially-available axial fan 50 (FIG. 2). FIG. 2 schematically illustrates the positions of the axial fan 50, perforated plates and baffle plates (see the marks of ⊗) in a side plane in the horizontal direction and, also, illustrates their positions in a plane in the longitudinal direction. In FIG. 2, in front of the axial fan 50 having a diameter of 800 mm, the perforated plates with a lateral width of 1000 mm were vertically erected at predetermined intervals, such that the frontmost perforated plate was in contact, at its lower end side, with the upper end side of a windbreak wall 52 (corresponding to the windbreak fence). This perforated plate was a holed portion 54 of the windbreak wall 52, and the perforated plates positioned therebehind corresponded to baffle plates 56 and 56. The tip end sides of the holed portion 54 and both the baffle plates 56 were put below the peripheral upper end of the fan by 185.4 mm, and measurements for the windbreak effect were conducted. The axial fan 50 generated lower wind forces at its center and periphery and, therefore, the holed portion 54 and the baffle plates 56 were placed such that they were deviated from the center of the axial fan 50, and their surfaces were parallel with the fan surface.

The aforementioned perforated iron plates had a thickness of 3 mm, a hole diameter of 10 mm and a hole pitch of 15 mm and corresponded to the holed portion 54 and the baffle plates 56. In order to determine how much the wind speed could be reduced with these perforated iron plates, the perforated iron plates with a lateral width of 600 mm and a longitudinal width of 1800 mm were vertically installed in parallel with one another in front of the axial fan 50 at 400 mm therefrom, and an anemometer was installed behind the perforated iron plates at 50 mm therefrom and, thus, measurements were conducted for the wind speeds before and after these perforated iron plates. As a result of the measurements, the wind speed was in the range of 5.23 to 4.36 m/s and the average was 4.80 m/s just behind the perforated iron plates, while the wind speed was 10.5 m/s just front of the perforated iron plates and, therefore, the average passed wind speed ratio was 45.71%. As a result thereof, it was revealed that the used perforated iron plates could reduce the wind speed to equal to or less than about half, in general.

FIG. 2 illustrates a case where the perforated portion 54 and the baffle plates 56 (see the marks of *) were mounted at intervals of 1000 mm, wherein the total number of them was 3. The perforated portion 54 and the baffle plates 56 had a longitudinal width of 100 mm (Table 1), 200 mm (Table 2) or 300 mm (Table 3), and their upper end sides were below the peripheral upper end of the axial fan 50 by 185.4 mm. In the height direction, a measurement point A was above the upper end side of the windbreak wall 52 by 50 mm, namely below the peripheral upper end of the axial fan 50 by 135.4 mm. A measurement point C was at a height equal to ½ that of the windbreak fence 52, and a measurement point B was at a height midway between those of the measurement points A and C. In Table 1, the lengths in the left field indicate horizontal distances from the windbreak wall 52, each indicating a measurement position for the wind speed. In the respective cases, measurements were conducted for determining how the wind speed of winds blowing into the inside of the baffle plates 56 changed.

The results of measurements for wind speeds with the device illustrated in FIG. 2 are illustrated in Tables 1 to 3 as follows. These results can be compared with the case of Table 4 regarding a device structure which includes only the windbreak wall 52 without being equipped with the perforated portion 54 and the baffle plates 56. The data was converted into speed reduction ratios (%), in order to enable clear comparison therebetween. The Speed Reduction Ratio (%)= (Measurement Value B or C/Measurement Value A)×100, wherein the speed-reduction-ratio conversion table for the left side of Table 1 is in the right side of Table 1, the speed-reduction-ratio conversion table for the left side of Table 2 is in the right side of Table 2, the speed-reduction-ratio conversion table for the left side of Table 3 is in the right side of Table 3, and the speed-reduction-ratio conversion table for the left side of Table 4 is in the right side of Table 4.

The Longitudinal Width of the Baffle Plates: 100 mm

TABLE 1

| Measured Wind-speed Value (m/s) | | | | Speed Reduction Ratio (%) | | |
| --- | --- | --- | --- | --- | --- | --- |
| | A | B | C | | B | C |
| 50 mm | 7.01 | 0.69 | 0.54 | 50 mm | 90.2 | 92.3 |
| 500 mm | 4.69 | 1.07 | 0.78 | 500 mm | 77.2 | 83.4 |
| 950 mm | 3.7 | 1.33 | 0.88 | 950 mm | 64.1 | 76.2 |
| 1050 mm | 3.63 | 1.27 | 0.83 | 1050 mm | 65 | 77.1 |
| 1500 mm | 3.11 | 1.14 | 0.72 | 1500 mm | 63.6 | 76.8 |
| 1950 mm | 1.94 | 0.94 | 0.66 | 1950 mm | 51.5 | 66 |

Remark
• The aforementioned values A, B and C were resulted from measurements along the center line L of wooden box.
· The aforementioned values indicate maximum instantaneous wind speeds during measurements at the respective measurement points.
※ The used iron plates had a thickness of 3 mm, a hole diameter of φ10 mm and a hole pitch of 15 mm.

The Longitudinal Width of the Baffle Plates: 200 mm

TABLE 2

| Measured Wind-speed Value (m/s) | | | | Speed Reduction Ratio (%) | | |
| --- | --- | --- | --- | --- | --- | --- |
| | A | B | C | | B | C |
| 50 mm | 6.99 | 0.74 | 0.59 | 50 mm | 89.4 | 91.6 |
| 500 mm | 4.62 | 1.32 | 0.82 | 500 mm | 71.4 | 82.3 |
| 950 mm | 3.65 | 1.48 | 0.94 | 950 mm | 59.5 | 74.2 |
| 1050 mm | 3.51 | 1.34 | 0.86 | 1050 mm | 61.8 | 75.5 |
| 1500 mm | 3.07 | 1.19 | 0.77 | 1500 mm | 61.1 | 74.9 |
| 1950 mm | 1.89 | 0.88 | 0.65 | 1950 mm | 53.4 | 65.6 |

Remark
• The aforementioned values A, B and C were resulted from measurements along the center line L of wooden box.
· The aforementioned values indicate maximum instantaneous wind speeds during measurements at the respective measurement points.
※ The used iron plates had a thickness of 3 mm, a hole diameter of φ10 mm and a hole pitch of 15 mm.

The Longitudinal Width of the Baffle Plates: 300 mm

TABLE 3

| Measured Wind-speed Value (m/s) | | | | | | |
| --- | --- | --- | --- | --- | --- | --- |
| | A | B | C | | B | C |
| 50 mm | 7.05 | 3.68 | 0.61 | 50 mm | 47.8 | 91.3 |
| 500 mm | 4.71 | 2.77 | 1.88 | 500 mm | 41.2 | 60.1 |
| 950 mm | 3.61 | 1.94 | 1.66 | 950 mm | 46.3 | 54 |
| 1050 mm | 3.49 | 0.92 | 1.62 | 1050 mm | 73.6 | 53.6 |
| 1500 mm | 3.09 | 0.86 | 1.24 | 1500 mm | 72.2 | 59.9 |
| 1950 mm | 1.91 | 0.67 | 1.03 | 1950 mm | 64.9 | 46.1 |

Remark
· The aforementioned values A, B and C were resulted from measurements along the center line L of wooden box.
· The aforementioned values indicate maximum instantaneous wind speeds during measurements at the respective measurement points.
※ The used iron plates had a thickness of 3 mm, a hole diameter of φ10 mm and a hole pitch of 15 mm.

TABLE 4

| Measured Wind-speed Value (m/s) | | | | Speed Reduction Ratio (%) | | |
| --- | --- | --- | --- | --- | --- | --- |
| | A | B | C | | B | C |
| 50 mm | 6.94 | 1.82 | 1.07 | 50 mm | 73.8 | 84.6 |
| 500 mm | 4.84 | 1.34 | 1.28 | 500 mm | 72.3 | 73.6 |
| 1000 mm | 3.84 | 1.78 | 1.7 | 1000 mm | 53.6 | 55.7 |
| 1500 mm | 3.41 | 1.67 | 1.58 | 1500 mm | 51 | 53.7 |
| 2000 mm | 2.11 | 1.57 | 1.49 | 2000 mm | 25.6 | 29.4 |
| 2500 mm | 1.89 | 1.28 | 1.11 | 2500 mm | 32.3 | 41.3 |
| 3000 mm | 1.68 | 1.25 | 0.98 | 3000 mm | 25.6 | 41.7 |
| 3500 mm | 1.23 | 1.21 | 0.96 | 3500 mm | 1.6 | 22 |

Remark
· The aforementioned values A, B and C were resulted from measurements along the center line L of wooden box.
· The aforementioned values indicate maximum instantaneous wind speeds during measurements at the respective measurement point.

In the case of the longitudinal width 100 mm in Table 1, winds passed through the perforated portion 54 had been reduced in speed from 7.01 m/s to 0.69 m/s at the measurement point B at a measurement position of 50 mm, and winds passed through the first baffle plate 56 had been reduced in speed from 3.63 m/s to 1.27 m/s at the measurement point B at a measurement position of 1050 mm. The baffle plates 56 with the longitudinal width 100 mm could reduce the wind speed at the portion at the measurement point B by smaller amounts than those of the baffle plates with the longitudinal width 200 mm. In the case of the baffle plates 56 with the longitudinal width 300 mm, the speed of winds passed through the perforated baffle plate at the measurement point B was only about half that of the winds which had not passed therethrough. This is because the height position of the measurement point B was placed above the lower end sides of the baffle plates 56 with the longitudinal width 300 mm and, therefore, winds passed through these baffle plates directly impinged thereon, which degraded the accuracy of the measurement values. Further, the results indicate that, at the measurement point B, the baffle plates 56 with the longitudinal width 100 mm had a larger effect of reducing the wind speed than that of the baffle plates 56 with the longitudinal width 200 mm. This is because the measurement point B was farther from the lower end sides of these baffle plates 56, not because they had a larger effect of reducing the wind speed.

By comparing Tables 1 to 3 with Table 4, it was revealed that the perforated portion 54 and the baffle plates 56 with the longitudinal widths of 100 mm, 200 mm and 300 mm could all have the effect of reducing the wind speed. In descending order of the speed reduction effect at the measurement point C farthest from the lower end sides of the perforated portion 54 and the baffle plates 56, the longitudinal widths 100 mm, 200 mm and 300 mm can be arranged in the mentioned order. Referring to Table 4, it was revealed that there was provided a larger effect of reducing the wind speed around the windbreak wall 52 for breaking winds, but large amounts of winds blew thereinto from the outside at positions farther from the windbreak wall. For example, at the measurement point B, at a distance of 3.5 m from the windbreak wall 52, the wind speed was substantially equal to that of the outside (the measurement point) A, and it can be expected that, at the measurement point C, similarly, at positions farther from the windbreak wall, the wind speed was equal to that at the measurement point B. Since the wind speed abruptly reduces around the perforated portion 54 and the baffle plates 56, in order to alleviate winds blowing thereinto from the outside, it is possible to put the baffle plates 56 closer to the windbreak wall including the perforated portion 54 and to reduce the intervals between the baffle plates 56 and, extremely, it is possible to make the intervals between the respective baffle plates 56 as close to zero as possible.

In FIG. 2, while the perforated portion 54 and the baffle plates 56 were installed at intervals of 1000 mm, experiments were conducted for a case where they were mounted at intervals of 1500 mm, starting from the windbreak wall 52. Table 5 which will be illustrated hereinafter represents the results of experiments for the case where the perforated portion 54 and the baffle plates 56 with a longitudinal width of 100 mm were installed at intervals of 1500 mm. The wind speed values in the left part of Table 5 were converted into speed reduction ratios (%) in the right part of Table 5. The calculation formula was the formula described in the paragraph 0019. Hereinafter, the same formula for the speed reduction ratio will be employed and, therefore, the description thereof will be omitted.

TABLE 5

| Measured Wind Speed Value (m/s) | | | | Speed Reduction Ratio (%) | | |
| --- | --- | --- | --- | --- | --- | --- |
| | A | B | C | | B | C |
| 50 mm | 7.04 | 0.67 | 0.56 | 50 mm | 90.5 | 92 |
| 500 mm | 4.63 | 1.02 | 0.76 | 500 mm | 78 | 83.6 |
| 1000 mm | 3.61 | 1.42 | 0.91 | 1000 mm | 60.7 | 74.8 |
| 1450 mm | 3.23 | 1.29 | 0.74 | 1450 mm | 60.1 | 77.1 |
| 1550 mm | 3.03 | 1.24 | 0.7 | 1550 mm | 59.1 | 76.9 |
| 2000 mm | 2.34 | 1.12 | 0.67 | 2000 mm | 52.1 | 71.4 |
| 2500 mm | 2.14 | 0.88 | 0.62 | 2500 mm | 58.9 | 71 |
| 2950 mm | 1.78 | 0.85 | 0.59 | 2950 mm | 52.2 | 66.9 |

In actual, the perforated portion 54 and the baffle plates 56 were varied in longitudinal width among 100 mm, 200 mm and 300 mm, similarly to in Tables 1 to 3 and, in the respective cases, determinations were made as to how the wind speed of winds blowing into the inside of the windbreak wall 52 changed. By comparing these results including Table 5 with Table 4, it was revealed that in the case of intervals of 1500 mm between the baffle plates, it was possible to provide the effect of reducing the wind speed in any of the cases where the perforated portion 54 and the baffle plates 56 had the longitudinal widths 100 mm, 200 mm and 300 mm. For the same reason as that for the case of intervals of 1000 mm between the baffle plates in Tables 1 to 3, the longitudinal width 300 mm could provide a smallest wind-speed reducing effect, while the longitudinal widths 100 mm and 200 mm could provide substantially equal wind-speed reducing effects.

Next, experiments were conducted for a case where they were mounted at intervals of 2000 mm and 3000 mm, starting from the windbreak wall 52. Table 6 which will be illustrated hereinafter illustrates the results of experiments for the case where the perforated portion 54 and the baffle plates 56 with a longitudinal width of 200 mm were installed at intervals of 2000 mm, while Table 7 which will be illustrated hereinafter illustrates the results of experiments for the case where the perforated portion 54 and the baffle plates 56 with a longitudinal width of 200 mm were installed at intervals of 3000 mm. In any of the cases, only one baffle plate 56 was used. The wind speed values in the left part of Table 6 were converted into speed reduction ratios (%) in the right part of Table 6, and the left part of Table 7 was similarly converted into the right part of Table 7.

TABLE 6

| Measured Wind Speed Value (m/s) | | | | Speed Reduction Ratio (%) | | |
| --- | --- | --- | --- | --- | --- | --- |
| | A | B | C | | B | C |
| 50 mm | 7.14 | 0.69 | 0.55 | 50 mm | 89.9 | 91.9 |
| 500 mm | 4.78 | 1.31 | 0.79 | 500 mm | 72.3 | 82.5 |
| 1000 mm | 3.59 | 1.5 | 0.98 | 1000 mm | 60.1 | 72.1 |
| 1500 mm | 3.36 | 1.36 | 0.87 | 1450 mm | 61.4 | 74.2 |
| 1950 mm | 2.38 | 1.22 | 0.74 | 1550 mm | 60 | 74.3 |
| 2050 mm | 2.18 | 1.11 | 0.67 | 2000 mm | 59.3 | 68.8 |
| 2500 mm | 1.96 | 0.84 | 0.6 | 2500 mm | 61.8 | 70.5 |
| 3000 mm | 1.8 | 0.72 | 0.52 | 2950 mm | 61.9 | 68.5 |
| 3500 mm | 1.27 | 0.58 | 0.41 | | | |

TABLE 7

| Measured Wind Speed Value (m/s) | | | | Speed Reduction Ratio (%) | | |
| --- | --- | --- | --- | --- | --- | --- |
| | A | B | C | | B | C |
| 50 mm | 7.08 | 0.67 | 0.53 | 50 mm | 48 | 90.6 |
| 500 mm | 4.7 | 1.29 | 0.84 | 500 mm | 39.6 | 58.4 |
| 1000 mm | 3.76 | 1.54 | 1.01 | 1000 mm | 45.7 | 53.7 |
| 1500 mm | 3.37 | 1.37 | 0.89 | 1450 mm | 45.4 | 59.1 |
| 2000 mm | 2.32 | 1.26 | 0.77 | 1550 mm | 71.7 | 59.2 |
| 2500 mm | 1.98 | 1.18 | 0.68 | 2000 mm | 68.4 | 48.4 |
| 2950 mm | 1.77 | 1.1 | 0.57 | 2500 mm | 68.6 | 51.1 |
| 3050 mm | 1.74 | 1.03 | 0.51 | 2950 mm | 70.5 | 55.5 |
| 3500 mm | 1.34 | 0.76 | 0.44 | | | |

In actual, the perforated portion 54 and the baffle plates 56 were varied in longitudinal width among 100 mm, 200 mm and 300 mm, similarly to in Tables 1 to 3 and, in the respective cases, determinations were made as to how the wind speed of winds blowing into the inside of the windbreak wall 52 changed. By comparing the results in the right parts of Table 5, Table 6 and Table 7 with the right part of Table 4, it was revealed that, in the cases of intervals of 2000 mm and intervals of 3000 mm between the baffle plates, it was possible to provide the effect of reducing the wind speed in any of the cases where the perforated portion 54 and the baffle plates 56 had the longitudinal widths 100 mm, 200 mm and 300 mm. For the same reason as that for the case of intervals of 1000 mm between the baffle plates in Tables 1 to 3, the longitudinal width 300 mm could provide a smallest wind-speed reducing effect, while the longitudinal widths 100 mm and 200 mm could provide substantially equal wind-speed reducing effects.

In contemplating the results of the experiments regarding the perforated portion 54 and the baffle plates 56, the results of the measurements in Table 4 regarding the case where only the windbreak wall 52 was installed were cited as references. Referring to Table 4, based on the ratio between the measurement points A and B (which is referred to as a speed reduction ratio, 100−(B/A)×100), the measurement positions at which the speed reduction ratio was 50% or less were at 1500 mm or less, which were distances from the windbreak wall which could change winds at a wind speed of 50 m/s to winds at 25 m/s or less due to the speed reduction ratio 50%. The measurement positions at which the speed reduction ratio was 60%, which could change winds at a wind speed of 50 m/s to winds at 20 m/s, were at 500 mm or 1000 mm.

(Effective Intervals Between the Baffle Plates)

On the other hand, when the perforated portion 54 was formed, and the baffle plates 56 were installed, as can be clearly seen from Tables 1 and 2 and Tables 5 to 7, in the case where their longitudinal widths were 100 mm or 200 mm, and in the cases of all the intervals, at all the measurement positions, there were provided larger speed reduction ratios than those of the results of measurements in Table 4 regarding the case where only the windbreak wall 52 existed. In the case of the intervals 2000 mm and 3000 mm between the baffle plates, the speed reduction ratio could not reach 50% at the measurement point B in many cases, but the speed reduction ratio was equal to or more than 50% at all the measurement positions at the measurement point C.

As illustrated in Tables 1 to 3, when the perforated portion 54 and the baffle plates 56 are installed, in the case where their longitudinal widths are 100 mm or 200 mm, provided that the intervals between the baffle plates are equal to or less than 1500 mm, it is possible to structure inexpensive greenhouses which have a high windbreak effect at both the measurement points B and C (see the right parts of Table 1, Table 2 and Table 5). Further, when the intervals between the baffle plates are in the range of 2000 to 3000 mm, it is possible to structure inexpensive plastic greenhouses which have a high windbreak effect at the measurement point C (see the right parts of Table 6 and Table 7).

Referring to Tables 1 to 3 and 5 to 7, at the measurement point B at a horizontal position of 50 mm from the windbreak wall 52, the speed reduction ratio was highest in the case where the perforated portion 54 and the baffle plates 56 had the longitudinal widths 100 mm and 200 mm, while it was smallest when their longitudinal width was 300 mm. This was because, in the case of the longitudinal width 300 mm, the measurement point B was at a higher vertical position than the lower end sides of the perforated portion 54 and the baffle plates 56 and, therefore, winds passed through the through holes in the perforated portion 54 and the baffle plates 56 directly impinged on the measurement point B. In the case where the perforated portion 54 had the longitudinal widths 100 mm and 200 mm, at the measurement point B at a horizontal position of 50 mm from the windbreak wall 52, the speed reduction ratio was higher than in the case where only the windbreak wall 52 existed. This was because, in the case where the perforated portion 54 had the longitudinal width 100 mm or 200 mm, similarly to in the case where only the windbreak wall 52 existed, winds tried to blow thereinto in such a way as to be entangled therein, but at the same time these winds were blown away by winds passed through the through holes in the perforated portion 54, so that the winds were prevented from blowing into the inside of the windbreak wall. In this case, the reason why a wind speed was generated at the measurement point at a distance of 50 mm from the windbreak wall 52 was because of winds entangled in the winds which had blown through the through holes in the perforated portion 54 having the longitudinal width 100 mm or 200 mm.

In conclusion, by forming the perforated portion 54 at the upper end portion of the windbreak wall 52 as illustrated in FIG. 2, it is possible to reduce the wind speeds of winds entangled into the portion in the rear of the windbreak wall 52. In this case, it is necessary to satisfy the condition that the speeds of winds passed through the perforated portion 54 should be larger than the speeds of winds to be entangled therein. With increasing hole ratio of the perforated portion 54, the speeds of winds passed therethrough are increased. However, if their wind speeds are excessively larger, the amount of entanglement of winds passed through the through holes is increased, but, in spite thereof, the speeds of entangled winds can be reduced in comparison with the case where only the windbreak wall 52 exists.

The right part of Table 8 which will be illustrated hereinafter is regarding a case where two baffle plates with no perforation and with a longitudinal width of 200 mm were installed at intervals of 1000 mm, in addition to a windbreak wall 52 having no perforated portion. The baffle plates were simply plate members with no through hole and, further, there existed the windbreak wall 52 having no perforated portion. The measured wind speed values in the right part of Table 8 are closer to the measured values in the right part of Table 4 regarding the case where no baffle plate was installed, than the measured values in the right part of Table 2 regarding the corresponding perforated baffle plates. Referring to the right part of Table 8, the baffle plates with no perforation had an obviously inferior speed reducing ability in comparison with that of the perforated baffle plates. By comparing it with the right part of Table 4 regarding only the windbreak wall 52, it is revealed that, even when the baffle plates with no perforation and with the longitudinal width 100 mm or 200 mm were installed, this case was substantially the same as the case where only the windbreak wall 52 existed, and there was provided substantially no speed reducing ability. The wind speed values in the left part of Table 8 were converted into speed reduction ratios (%) in the right part of Table 8.

The Longitudinal Width of the Baffle Plates: 200 mm

TABLE 8

| Measured Wind Speed Value (m/s) | | | | Speed Reduction Ratio (%) | | |
| --- | --- | --- | --- | --- | --- | --- |
| | A | B | C | | B | C |
| 50 mm | 6.91 | 1.74 | 0.97 | 50 mm | 74.8 | 86 |
| 500 mm | 4.77 | 1.4 | 1.25 | 500 mm | 70.6 | 73.8 |
| 950 mm | 3.61 | 1.6 | 1.5 | 950 mm | 55.7 | 58.4 |
| 1050 mm | 3.36 | 1.48 | 1.43 | 1050 mm | 56 | 57.4 |
| 1500 mm | 3.22 | 1.31 | 1.4 | 1500 mm | 59.3 | 56.5 |
| 1950 mm | 1.91 | 1.41 | 1.29 | 1950 mm | 26.2 | 32.5 |

Table 9 illustrates measured wind speed values in a case where two baffle plates with no perforation and with a longitudinal width of 200 mm were installed at intervals of 1500 mm starting from the windbreak 52, Table 10 illustrates measured wind speed values in a case where one such baffle plate was installed at an interval of 2000 mm from the windbreak wall 52, and Table 11 illustrates measured wind speed values in a case where one such baffle plate was installed at an interval of 3000 mm from the windbreak wall 52. These baffle plates were simply plate members with no through hole and, further, there existed the windbreak wall 52 with no perforated portion. The results of the measurements using the baffle plates with no perforation at the intervals of 1500 mm (Table 9) and the interval of 2000 mm (Table 10) were similar to those of the intervals of 1000 mm, and the speed reduction ratios resulted therefrom were obviously inferior to those of the perforated baffle plates and, thus, these baffle plates with no perforation had substantially no speed reducing ability. Further, even when the baffle plates with no perforation have longitudinal widths of 100 mm and 300 mm, it is impossible to reduce the speed, similarly to in the case of those with the longitudinal width 200 mm (Table 8). As a result, it has been revealed that the baffle plates with no perforation have no speed reducing effect. The wind speed values in the left part of Table 9 were converted into speed reduction ratios (%) in the right part of Table 9, and the left part of Table 10 was similarly converted into the right part of Table 10. Further, the left part of Table 11 was converted into the right part of Table 11.

The Longitudinal Width of the Baffle Plates: 200 mm

TABLE 9

| | Measured Wind Speed Value (m/s) | | | Speed Reduction Ratio (%) | |
|---|---|---|---|---|---|
| | A | B | C | B | C |
| 50 mm | 6.99 | 1.8 | 1.01 | 74.2 | 85.6 |
| 500 mm | 4.63 | 1.35 | 1.24 | 70.8 | 73.2 |
| 1000 mm | 3.55 | 1.7 | 1.54 | 52.1 | 56.6 |
| 1450 mm | 3.22 | 1.59 | 1.46 | 50.6 | 54.7 |
| 1550 mm | 2.98 | 1.38 | 1.4 | 53.7 | 53 |
| 2000 mm | 2.34 | 1.29 | 1.31 | 44.9 | 44 |
| 2500 mm | 2.09 | 1.3 | 1.15 | 37.8 | 45 |
| 2950 mm | 1.77 | 1.27 | 0.95 | 28.2 | 46.3 |

The Longitudinal Width of the Baffle Plates: 200 mm

TABLE 10

| | Measured Wind Speed Value (m/s) | | | Speed Reduction Ratio (%) | |
|---|---|---|---|---|---|
| | A | B | C | B | C |
| 50 mm | 7.17 | 1.79 | 1.02 | 75 | 85.8 |
| 500 mm | 4.83 | 1.33 | 1.26 | 72.5 | 73.9 |
| 1000 mm | 3.6 | 1.72 | 1.61 | 52.2 | 55.3 |
| 1500 mm | 3.3 | 1.63 | 1.54 | 50.6 | 53.3 |
| 1950 mm | 2.47 | 1.51 | 1.46 | 38.9 | 40.9 |
| 2050 mm | 2.21 | 1.39 | 1.43 | 37.1 | 35.3 |
| 2500 mm | 1.98 | 1.27 | 1.15 | 35.9 | 41.9 |
| 3000 mm | 1.8 | 1.24 | 1.03 | 31.1 | 42.8 |
| 3500 mm | 1.31 | 1.18 | 0.95 | 9.9 | 27.5 |

The Longitudinal Width of the Baffle Plates: 200 mm

TABLE 11

| | Measured Wind Speed Value (m/s) | | | Speed Reduction Ratio (%) | |
|---|---|---|---|---|---|
| | A | B | C | B | C |
| 50 mm | 6.95 | 1.81 | 1.04 | 74 | 85 |
| 500 mm | 4.65 | 1.35 | 1.29 | 71 | 72.3 |
| 1000 mm | 3.68 | 1.74 | 1.67 | 52.7 | 54.6 |

TABLE 11-continued

| | Measured Wind Speed Value (m/s) | | | Speed Reduction Ratio (%) | |
|---|---|---|---|---|---|
| | A | B | C | B | C |
| 1500 mm | 3.33 | 1.68 | 1.57 | 49.5 | 52.9 |
| 2000 mm | 2.21 | 1.6 | 1.48 | 27.6 | 33 |
| 2500 mm | 1.9 | 1.31 | 1.13 | 31.1 | 40.5 |
| 2950 mm | 1.71 | 1.27 | 1.05 | 25.7 | 38.6 |
| 3050 mm | 1.66 | 1.11 | 0.97 | 33.1 | 58.4 |
| 3500 mm | 1.23 | 0.84 | 0.89 | 31.7 | 27.6 |

(Experiments Regarding the Baffle Plates with Longitudinal Width having an Effect of Breaking Winds Blowing from Above)

In FIG. 2, the measurement point B corresponds to ¾ the height of the windbreak wall 52, and the measurement point C corresponds to ½ the height of the windbreak wall 52. In assuming that the external wind speed is 50 m/s, if greenhouses are constructed such that their height is ¾ (the measurement point B) the height of the windbreak wall 52 with any of the perforated portion 54 and the baffle plates 56 having longitudinal widths of 100 mm, 200 mm and 300 mm, this induces portions at which the speed reduction ratio (see paragraph 0033) can not reach 50%, which necessitates materials with higher strengths, thereby making the greenhouses expensive. On the other hand, if greenhouses are constructed such that their height is half (the measurement point C) the height of the windbreak wall 52, provided that the perforated portion 54 and the baffle plates 56 have a longitudinal width of 200 mm and are at intervals of 3000 mm or less or they have a longitudinal width of 100 mm and are at intervals of about 1500 mm or less, the speed reduction ratio exceeds 60% at all portions, which enables construction of inexpensive greenhouses using materials with relatively lower strengths. In assuming that the external wind speed is 40 m/s, when the perforated portion 54 and the baffle plates 56 have a longitudinal width of 100 mm and are at intervals of 3000 mm or less, and when the greenhouses have a height equal to half that of the windbreak wall 52, the speed reduction ratio exceeds 50% at all portions, which enables construction of inexpensive greenhouses using materials with relatively lower strengths. Further, when the greenhouses have a height equal to ¾ that of the windbreak wall 52, provided that the baffle plates have a longitudinal width of 200 mm and are at intervals of 1500 mm or less, it is possible to construct inexpensive greenhouses.

In assuming that the external wind speed is 50 m/s, if greenhouses are constructed such that their height is ¾ the height of the windbreak wall 52, it is impossible to provide sufficient advantages in constructing inexpensive greenhouses, in conclusion. In order to overcome this, the wind-entanglement preventing effect at the measurement position of 50 mm, which has been described in the paragraph 0036, should be utilized. Further, referring to Table 1 and Table 2, the perforated portion 54 and the baffle plates 56 having the longitudinal width 200 mm had a larger speed reducing effect than that of the perforated portion 54 and the baffle plates 56 having the longitudinal width of 100 mm. In this regard, when there was a smaller distance from the height position of the measurement point B to the lower end sides of the perforated portion 54 and the baffle plates 56, there were more disadvantages in speed reduction measurements and, in this regard, obviously, the longitudinal width 200 mm was more disadvantageous than the longitudinal width 100 mm. In spite of this fact, the longitudinal width 200 mm could provide a larger speed reducing effect. This indicates that, in general, the perforated portion 54 and baffle plates 56 had a larger speed reducing ability as their longitudinal width was increased. In the case of the longitudinal width 300 mm, the height positions of the measurement points were immediately behind the baffle plates and, therefore, it is impossible to make comparisons regarding this.

Table 12 and Table 13 illustrate measured wind speed values in a case where a perforated portion 54 with a longitudinal width of 100 mm was installed, in order to prevent winds from being entangled in the windbreak wall 52. Further, Table 12 is regarding a case where two baffle plates 56 with a longitudinal width of 300 mm were mounted with an interval of 1500 mm interposed therebetween, and Table 13 is regarding a case where a single baffle plate 56 with a longitudinal width of 300 mm was mounted with an interval of 2000 mm interposed therebetween, in order to reduce the speeds of winds being blown thereinto due to the diffusion and spread of winds blowing thereabove. The wind speed values in the left part of Table 12 were converted into speed reduction ratios (%) in the right part of Table 12, and the left part of Table 13 was similarly converted into the right part of Table 13.

TABLE 12

| Measured Wind Speed Value (m/s) | | | | Speed Reduction Ratio (%) | | |
| --- | --- | --- | --- | --- | --- | --- |
|  | A | B | C |  | B | C |
| 50 mm | 7.02 | 0.68 | 0.58 | 50 mm | 90.3 | 91.7 |
| 500 mm | 4.66 | 1.01 | 0.71 | 500 mm | 78.3 | 84.8 |
| 1000 mm | 3.52 | 1.44 | 0.92 | 1000 mm | 59.1 | 73.9 |
| 1450 mm | 3.19 | 1.15 | 0.78 | 1450 mm | 57.7 | 75.5 |
| 1550 mm | 2.95 | 0.69 | 0.7 | 1550 mm | 76.6 | 76.3 |
| 2000 mm | 2.31 | 0.61 | 0.65 | 2000 mm | 73.6 | 71.9 |
| 2500 mm | 2.06 | 0.53 | 0.61 | 2500 mm | 74.3 | 70.4 |
| 2950 mm | 1.74 | 0.46 | 0.58 | 2950 mm | 73.6 | 66.7 |

TABLE 13

| Measured Wind Speed Value (m/s) | | | | Speed Reduction Ratio (%) | | |
| --- | --- | --- | --- | --- | --- | --- |
|  | A | B | C |  | B | C |
| 50 mm | 7.14 | 0.69 | 0.55 | 50 mm | 89.9 | 91.9 |
| 500 mm | 4.78 | 1.31 | 0.79 | 500 mm | 72.3 | 82.5 |
| 1000 mm | 3.59 | 1.5 | 0.98 | 1000 mm | 60.1 | 72.1 |
| 1500 mm | 3.36 | 1.36 | 0.87 | 1450 mm | 61.4 | 74.2 |
| 1950 mm | 2.38 | 1.22 | 0.74 | 1550 mm | 60 | 74.3 |
| 2050 mm | 2.18 | 1.11 | 0.67 | 2000 mm | 59.3 | 68.8 |
| 2500 mm | 1.96 | 0.84 | 0.6 | 2500 mm | 61.8 | 70.5 |
| 3000 mm | 1.8 | 0.72 | 0.52 | 2950 mm | 61.9 | 68.5 |
| 3500 mm | 1.27 | 0.58 | 0.41 |  |  |  |

Referring to the right parts of Table 12 and Table 13, it can be estimated that, as the interval between the baffle plates 56 is increased and, also, the distance therefrom to the windbreak wall 52 is increased, winds are diffused and spread over a larger width, and, therefore, the longitudinal width of the baffle plates 56 should be increased, in order to prevent winds blowing from above. Regarding the right parts of Table 12 and Table 13, the measurement point B was positioned immediately behind the lower end sides of the baffle plates 56 with the longitudinal width 300 mm, which makes it impossible to make comparisons and considerations regarding them. By making comparisons therebetween with respect to the measurement point C, it is revealed that the speed reducing effect was made larger, when the interval between the baffle plates 56 was smaller. When the interval between the installation positions of the baffle plates 56 was varied while the longitudinal width of the baffle plates 56 was maintained at the same value, the speed reducing effect was larger when the interval was smaller. This proves that the aforementioned estimation is correct. By calculating the speed reduction ratios from the measured values B and C with respect to the measured value A and making comparisons therebetween, it is possible to clarify the difference.

Comparisons will be made between the right part of Table 12 and the right part of Table 4 regarding the data of the case where only the windbreak wall 52 was installed and the right part of Table 5 regarding the data of the case where the perforated portion 54 and the baffle plates 56 with a longitudinal width of 100 mm were installed at intervals of 1500 mm. Table 5 and Table 12 both exhibit, in their right parts, larger speed reducing abilities than that exhibited in the right part of Table 4 regarding the case where only the windbreak wall 52 was employed. By making comparisons between the right parts of Table 5 and Table 12, it is revealed that, within the section in the range of 50 to 1450 mm, at the measurement point B, the conditions of the experiments regarding the right parts of Table 5 and Table 12 were the same and, therefore, both the data are close to each other and are substantially equal to each other. At a measurement position of 1550 mm, at the measurement point B, the right part of Table 5 is regarding the baffle plates 56 with the longitudinal width 100 mm, while the right part of Table 12 is regarding the longitudinal width 300 mm. The baffle plates 56 with the longitudinal width 300 mm could improve the speed reduction ratio, in spite of the disadvantageous condition that the measurement point B was immediately behind the baffle plates 56. Within the section in the range of 2000 to 2950 mm, at the measurement point B, similarly, Table 12 regarding the baffle plates 56 with the longitudinal width 300 mm exhibits, in its right part, larger speed reduction ratios than those exhibited in the right part of Table 5. On the other hand, in the right parts of Table 5 and Table 12, the data at all the measurement positions in the section in the range of 50 to 2950 mm at the measurement point C are close to one another and are substantially equal to one another.

Comparisons will be made between the right part of Table 13 and the right part of Table 4 and data of a case where the perforated portion 54 and the baffle plates 56 with a longitudinal width of 100 mm were installed at intervals of 2000 mm (not illustrated in a table). The right part of Table 13 and the data of the case where the perforated portion 54 and the baffle plates 56 with the longitudinal width 100 mm were installed at intervals of 2000 mm exhibit larger speed reduction abilities than those exhibited in the right part of Table 4. By making comparisons between the right part of Table 13 and the data of the case where the perforated portion 54 and the baffle plates 56 with the longitudinal width 100 mm were installed at intervals of 2000 mm, it is revealed that, within the section in the range of 50 to 1950 mm, at the measurement point B, the conditions of the experiments regarding both the cases were the same and, therefore, both the data are close to each other and are substantially equal to each other. By making comparisons between the right part of Table 13 regarding the baffle plates 56 with the longitudinal width 300 mm and the data of the case where the baffle plates 56 with the longitudinal width 100 mm were installed at intervals of 2000 mm, it is revealed that, at a certain position of 2050 mm, at the measurement point B, the baffle plates 56 with the longitudinal width 300 mm could provide a largely-improved speed reduction ratio in the right part of Table 13 and, within the section of 2500 to 3500 mm, at the measurement point B, similarly, the baffle plates 56 with the longitudinal width 300 mm could provide larger speed reduction ratios, in spite of the disadvantageous condition that the measurement point B was immediately behind the baffle plates. On the other hand, in the right part of Table 13 and in the data of the case where the perforated portion 54 and the baffle plates 56 with the longitudinal width 100 mm were installed at intervals of 2000 mm, at all the measurement positions in the section in the range of 50 to 3500 mm, at the measurement point C, both the data are close to each other and are substantially equal to each other.

By making comparisons between the right side of Table 12 regarding the baffle plates 56 at an interval of 1500 mm and the right side of Table 13 regarding the baffle plate 56 at an interval of 2000 mm, it is revealed that, in the case where the interval between the perforated portion 54 and the baffle plates 56 was 1500 mm (corresponding to distance x in FIG. 4) in the right part of Table 12, the speed reduction ratio was 57.7%, which corresponds to a wind speed of 21.2 m/s with respect to an external wind speed of 50 m/s. On the other hand, in the case where the interval between the perforated portion 54 and the baffle plate 56 was 2000 mm (corresponding to the distance x in FIG. 4) in the right part of Table 13, the speed reduction ratio was 51.4%, which corresponds to a wind speed of 24.3 m/s with respect to an external wind speed is 50 m/s. They are both very strong winds. However, by setting the distance x from windbreak wall 52 to the baffle plates (FIG. 4) to be slightly smaller than 1500 mm, it is possible to reduce even the wind speed 50 m/s to 18 to 19 m/s or less, which indicates that it is possible to construct inexpensive greenhouses.

Consideration will be given to the intervals between the baffle plates 56 (corresponding to the distances x' in FIG. 4). Regarding the right part of Table 12, the perforated portion 54 in the windbreak wall 52 had a longitudinal width of 100 mm and, therefore, winds were blown into the fence in amounts smaller than those of the cases of the longitudinal widths 200 mm and 300 mm as in the right parts of Table 2, Table 3, Table 6 and Table 7. Therefore, by making comparisons the distances x' in consideration of this fact, it can be seen that the right part of Table 12 exhibits a largest speed reduction ability. In the right part of Table 13 regarding the case where the interval therebetween was 2000 mm, the amounts of winds blown from above were added thereto due to the interval of 2000 mm and, therefore, the results were inferior to those in the right part of Table 12, but were slightly improved over the cases other than the right part of Table 12.

By making comparisons of the right sides of Tables 12 and 13 with the cases where the baffle plates 56 had a longitudinal width of 100 mm as in the right parts of Tables 1 and 5, it is revealed that, even though the same amount of wind was blown into the windbreak wall 52, the baffle plates 56 with the longitudinal width 300 mm could have an effect of breaking winds being diffused and blown from above which was incomparably different from that of the baffle plates 56 with the longitudinal width 100 mm, and Tables 12 and 13 exhibit, in their right parts, larger speed reducing abilities. These results reveals that, by mounting the entanglement-preventing perforated portion 54 to the windbreak wall 52 and employing the baffle plates 56 with a larger longitudinal width than that of the perforated portion as in the right parts of Tables 12 and 13, it is possible to improve the speed reducing ability at the measurement point B.

Figure 3:
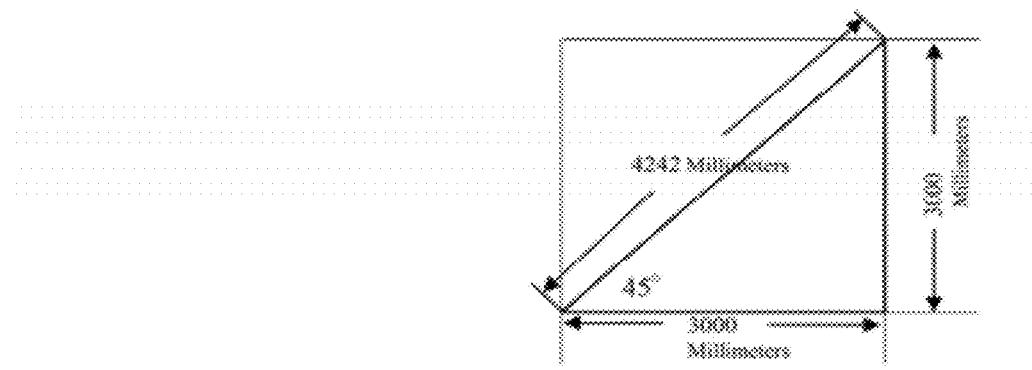
FIG. 3 is a schematic explanation view of a case where baffle plates were installed at intervals of 3000 mm in consideration of the change of the direction of winds.

By making the longitudinal width of the baffle plates 56 larger than the longitudinal width of the entanglement-preventing perforated portion 54 in the windbreak wall 52 as described above, it is possible to improve the speed reduction ability. However, in view of the growth of crops, it is not preferable to make the distance x from the windbreak wall 52 to the baffle plates slightly smaller than 1500 mm and to make the distances x' between the baffle plates equal to 1500 mm, since many baffle plates are placed above the cultivation greenhouses, thereby interrupting sunlight. It is necessary that the interval between the perforated portion and the baffle plates and the intervals between the baffle plates are equal to or more than 3000 mm, and, in order to reduce the internal wind speed to 18 to 19 m/s when the external wind speed is 50 m/s, it is necessary to make the intervals between the baffle plates equal to 4242 mm. This is because, in the case of installing the baffle plates 56 at intervals of 3000 mm as in FIG. 3, the intervals therebetween become 4242 mm (3000× $\sqrt{2}$) at a maximum, depending on the direction of wind.

Consideration will be made as to whether or not it is possible to make the speed reduction ratio equal to or more than 64% with intervals of 4242 mm between baffle plates, by selecting the longitudinal width of the baffle plates 56 and the intervals therebetween. In this case, it can be estimated that there are two paths along which external winds can intrude into the inside of the windbreak wall. One of them is a path along which they intrude in such a way as to entangle the upper end portion of the windbreak wall. This has been already resolved in the aforementioned "Regarding Effective Intervals between the Baffle Plates". The second one of them is a path along which winds blowing thereabove can diffuse and spread into the inside of the fence to blow thereinto, as illustrated in FIG. 4. In the right part of Table 12, when the interval between the perforated portion 54 and the baffle plates 56 was 1500 mm, within the section in the range of 1550 to 2950, at the measurement point B, the wind speed corresponded to 13.2 m/s with respect to an external wind speed of 50 m/s. If the interval between the perforated portion 54 and the baffle plates 56 is set to 2000 mm as in the right part of Table 13, winds blow thereinto at 18.6 m/s when the external wind speed is 50 m/s, within the section in the range of 2050 to 3500, at the measurement point B. Accordingly, it has been revealed that, in actual, the intervals x' (FIG. 4) can be made equal to about 1500 mm, although it is necessary that the interval x (FIG. 4) be slightly smaller than 1500 mm.

Experiments should be conducted for determining the value [mm] of the longitudinal width of the baffle plates 56 necessary for making the speed reduction ratio equal to or more than 64%, in the case where the intervals x' are 4242 mm. At the same time, since the measurement point B was positioned immediately behind the lower end sides of the baffle plates, the measurement point B should be changed to be below the upper end of the windbreak wall 52 by 450 mm. Next, regarding the interval x, if this interval is 1500 mm, windstorms at 21.2 m/s are blown thereinto when the external wind speed is 50 m/s and, if the interval is 2000 mm, this induces windstorms at 24.3 m/s. There is also a need for experiments for means for increasing the speed reduction ratio to 64% or more, in this case. As such means, it is possible to estimate four means as follows.

1. The height of the greenhouses to be constructed inside the windbreak wall 52 is made smaller.
2. In the case where the interval between the windbreak wall and only the baffle plate 56 closest to the windbreak wall 52 is made smaller than 1500 mm, the intervals between the baffle plates are set to be an appropriate interval.
3. The longitudinal width of the perforated portion 54 formed in the windbreak wall 52 is made smaller than 100 mm.
4. The perforation ratio in the baffle plates 56 is made smaller, in order to alleviate winds blowing therethrough.

Figure 4:
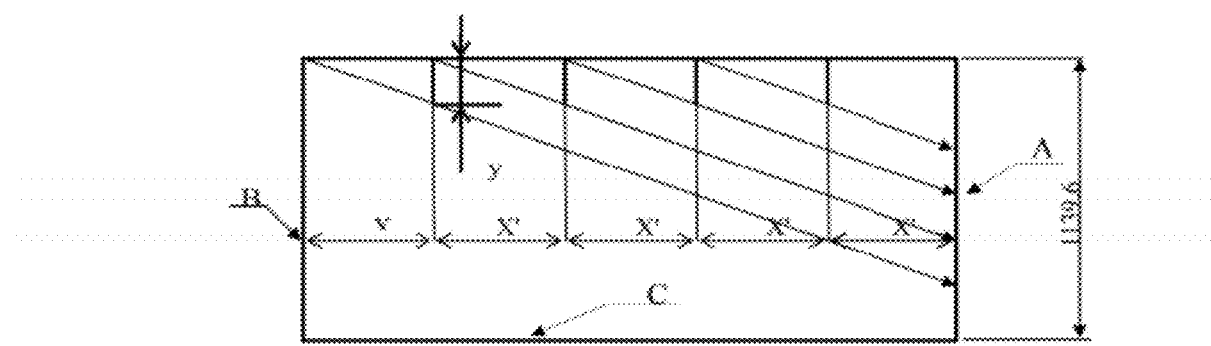
FIG. 4 is a schematic explanation view illustrating the positional relationship between a perforated portion and baffle plates within a windbreak fence.

(Appropriate Intervals as the Intervals x and x' in FIG. 4 when the Perforated Portion 54 has a Longitudinal Width of 100 mm)

When the longitudinal width of the perforated portion 54 in the windbreak wall 52 was set to 100 mm, it was determined whether or not it is proper to set the interval x in FIG. 4 to 1200 mm. Further, when the longitudinal width of the baffle plates 56 (corresponding to distance y in FIG. 4) was varied among 300 mm, 400 mm and 500 mm, an appropriate value of the intervals x' in FIG. 4 was determined. In this case, when the distance y was 300 mm and 400 mm, the measurement point B was changed to be below the upper end of the windbreak wall 52 by 450 mm, and the measurement point B will be designated as "B'" in tables. When the distance y was 500 mm, measurements were performed only at the measurement point C.

Tables 14 to 16 illustrate, in their right parts, the results of measurements for wind speeds, in the case where the longitudinal width of the perforated portion 54 was set to 100 mm and, also, the interval x was set to 1200 mm and, in this case, the longitudinal width of the baffle plates 56 (the perforated iron plates) was varied among 300 mm (Table 14), 400 mm (right part of Table 15) and 500 mm (right part of Table 16). Regarding the right parts of Tables 14 and 15, the measurement point B was at 450 mm from the upper end side of the windbreak wall 52, while no measurements at the measurement point B were conducted regarding the right part of Table 16. The wind speed values in the left part of Table 14 were converted into speed reduction ratios (%) in the right part of Table 14, and the left part of Table 15 was similarly converted into the right part of Table 15. Further, the left part of Table 16 was converted into the right part of Table 16.

TABLE 14

| Measured Wind Speed Value (m/s) | | | | Speed Reduction Ratio (%) | | |
|---|---|---|---|---|---|---|
| | A | B' | C | | B' | C |
| 50 mm | 7.14 | 0.66 | 0.61 | 50 mm | 90.8 | 91.5 |
| 500 mm | 4.72 | 0.82 | 0.73 | 500 mm | 82.6 | 84.5 |
| 1150 mm | 3.61 | 1.09 | 0.93 | 1150 mm | 69.8 | 74.2 |
| 1250 mm | 3.52 | 1.01 | 0.88 | 1250 mm | 71.3 | 75 |
| 1500 mm | 3.28 | 0.96 | 0.84 | 1500 mm | 70.7 | 74.4 |
| 2000 mm | 2.2 | 0.86 | 0.79 | 2000 mm | 60.9 | 64.1 |
| 2500 mm | 1.96 | 0.81 | 0.74 | 2500 mm | 58.7 | 62.2 |
| 3000 mm | 1.77 | 0.71 | 0.65 | 3000 mm | 59.9 | 63.3 |
| 3500 mm | 1.39 | 0.86 | 0.71 | 3500 mm | 38.1 | 48.9 |
| 4000 mm | 1.19 | 0.77 | 0.68 | 4000 mm | 35.3 | 42.9 |

TABLE 15

| Measured Wind Speed Value (m/s) | | | | Speed Reduction Ratio (%) | | |
|---|---|---|---|---|---|---|
| | A | B' | C | | B' | C |
| 50 mm | 7.22 | 0.68 | 0.6 | 50 mm | 90.6 | 91.7 |
| 500 mm | 4.8 | 0.85 | 0.71 | 500 mm | 82.3 | 85.2 |
| 1150 mm | 3.64 | 1.07 | 0.95 | 1150 mm | 70.6 | 73.9 |
| 1250 mm | 3.51 | 0.94 | 0.85 | 1250 mm | 73.2 | 75.8 |
| 1500 mm | 3.3 | 0.84 | 0.79 | 1500 mm | 74.5 | 76.1 |
| 2000 mm | 2.19 | 0.75 | 0.72 | 2000 mm | 65.8 | 67.1 |
| 2500 mm | 1.99 | 0.69 | 0.65 | 2500 mm | 65.3 | 67.3 |
| 3000 mm | 1.83 | 0.62 | 0.6 | 3000 mm | 66.1 | 67.2 |
| 3500 mm | 1.4 | 0.89 | 0.67 | 3500 mm | 36.4 | 52.1 |
| 4000 mm | 1.22 | 0.8 | 0.65 | 4000 mm | 34.4 | 46.7 |

TABLE 16

| Measured Wind Speed Value (m/s) | | | Speed Reduction Ratio (%) | |
|---|---|---|---|---|
| | A | B' | | C |
| 50 mm | 7.18 | 0.57 | 50 mm | 92.1 |
| 500 mm | 4.76 | 0.69 | 500 mm | 85.5 |
| 1150 mm | 3.59 | 0.92 | 1150 mm | 74.4 |
| 1250 mm | 3.54 | 0.81 | 1250 mm | 77.1 |
| 1500 mm | 3.33 | 0.73 | 1500 mm | 78.1 |
| 2000 mm | 2.24 | 0.69 | 2000 mm | 69.2 |
| 2500 mm | 2.01 | 0.61 | 2500 mm | 69.7 |
| 3000 mm | 1.86 | 0.56 | 3000 mm | 69.9 |
| 3500 mm | 1.42 | 0.7 | 3500 mm | 50.7 |
| 4000 mm | 1.24 | 0.64 | 4000 mm | 48.4 |

As can be clearly seen from the right part of Table 12, when the interval x was 1500 mm, at the measurement point B, at a measurement position of 1450 mm, the wind speed corresponded to a strong wind at 21.15 m/s with respect to an external wind speed of 50 m/s. On the other hand, as in the right part of Table 14, when the interval x was set to 1200 mm, at the measurement point B, at a measurement position of 1150 mm, the wind speed corresponded to 15.1 m/s. Tables 14 to 16 reveal, at their right parts, that there was provided the speed reducing effect up to a measurement position of 3000 mm, but this effect was abruptly decreased at larger distances therethan, and the speed reduction effect was increased with increasing longitudinal width of the baffle plates 56 (the perforated iron plates). Further, it was revealed that winds were blown from above at the portions at 1800 to 2300 mm from the baffle plates, and this could not be prevented even through the longitudinal width was increased. Further, regarding the right parts of Tables 14 and 15, the measurement point B was set to be below the upper end by 450 mm, and the interval x was set to 1200 mm, while regarding the right parts of Tables 12 and 13, the measurement point B was set to be below the upper end by 284.9 mm, and the interval x in FIG. 4 was set to 1500 mm and 2000 mm for performing the determinations. This makes it impossible to make comparisons therebetween simply.

In conclusion, it has been revealed that, in the case of the perforated baffle plates, it is appropriate to set the interval x in FIG. 4 to 1200 mm. Further, up to a measurement position of 3000 mm, namely up to a distance of 1800 mm from the baffle plates, there can be provided the speed reduction effect, and this effect is abruptly reduced at a measurement position of 3500 mm, regardless of the longitudinal width of the baffle plates. In this regard, it is not appropriate to set the intervals x' to within the range of 1800 to 2300 mm. This is because, in the right part of Table 14, at a measurement position of 3000 mm, at the measurement point B, strong winds at 20.05 m/s are blown thereinto, when the external wind speed is 50 m/s.

It has been revealed that, at distances of 1800 to 2300 mm from the baffle plates, the speed reduction effect is significantly reduced, regardless of the longitudinal width of the baffle plates.

On the other hand, Tables 14 to 16 reveal, at their right parts, that the speed reduction effect is increased with increasing longitudinal width of the perforated baffle plates. Based on the right parts of Tables 14 to 16, in the case of reducing the internal wind speed to more than 10 m/s when the external wind speed is 50 m/s, this case corresponds to 14.65 m/s at the measurement point B at a measurement position of 1500 mm in the case of the baffle plates with the longitudinal width 300 mm, further corresponds to 16.95 m/s at a measurement position of 3000 mm in the case of the longitudinal width 400 mm, and further corresponds to 15.05 m/s at the measurement point C a measurement position of 3000 mm in the case of the longitudinal width 500 mm. As a result, the intervals x' in FIG. 4 should be 300 mm (1500−1200=300) in the case of the baffle plates with the longitudinal width 300 mm and should be 1800 mm (3000−1200=1800) in the case of the baffle plates with the longitudinal widths 400 mm and 500 mm. However, if the longitudinal width of the baffle plates is set to 500 mm, this will increase the area which interrupts sunlight above the greenhouses, thereby inducing a disadvantage in growing plants. This reveals that an appropriate longitudinal width of the baffle plates is 400 mm.

From the results of the experiments in the right parts of Tables 14 to 16, it is possible to provide answers to the aforementioned method 2 (Paragraph 0057). Specifically, when the interval between the windbreak wall and the baffle plates was set to 1200 mm, the wind speed corresponded to an internal wind speed of 15.1 m/s with respect to an external wind speed of 50 m/s, at the measurement point B at 1150 mm from the windbreak wall. This reveals that an appropriate interval from the windbreak wall is 1200 mm. Further, regarding the intervals between the baffle plates, when the external wind speed is 50 m/s, in the case of a longitudinal width of 300 mm, windstorms at 30.95 m/s occur, at the measurement point B, at 2300 mm from the baffle plates, further in the case of a longitudinal width of 400 mm, the wind speed corresponds to 31.8 m/s at the measurement point B, and in the case of a longitudinal width of 500 mm, the wind speed corresponds to 24.85 m/s at the measurement point C, both of which are windstorms. If the longitudinal width of the baffle plates is increased to infinity, the speed reduction ratio can be increased, but sunlight is interrupted, which is undesirable in growing plants, and, further, the space for the greenhouses to be constructed inside is reduced. Accordingly, it is impossible to increase their longitudinal width to infinity. In this regard, it is desired that the intervals x' in FIG. 4 are set to 1800 mm in the case of the baffle plates with the longitudinal width 400 mm. However, in the case where they are 1800 mm, the diagonal lines have a length of 2545.2 mm and, in consideration of this fact, an appropriate value thereof is 1272.98 mm.

(Whether or not it is Appropriate to Set the Longitudinal Width of the perforated Portion to 100 mm or Less)

Tables 17 to 21 which will be illustrated hereinafter illustrate, at their right parts, the results of measurements for wind speeds, when the longitudinal width of the perforated portion 54 in the windbreak wall was varied among 100, 80, 50, 30 and 10 mm. By making comparisons among the right parts of Tables 17 to 21, it is revealed that the longitudinal width 100 mm could offer a largest speed reduction effect. Regarding the longitudinal widths 100 mm and 200 mm, comparisons can be made between the right parts of Tables 1 and 2 only with respect to the section up to a measurement position of 950 mm, and these results reveal that the longitudinal width 100 mm could exhibit a larger speed reduction effect than 200 mm. By making comparisons with respect to the measurement point C, regarding the right parts of Tables 1 to 3, within the section up to a measurement position of 1000 mm, the speed reduction effect was decreased with increasing longitudinal width, in the order of 100 mm, 200 mm and 300 mm. In conclusion, when the perforated portion 54 has a longitudinal width of about 100 mm, it is possible to offer a largest speed reduction effect. The wind speed values in the left parts of Tables 17, 18, 19, 20 and 21 were converted into speed reduction ratios (%) in the right parts of Tables 17, 18, 19, 20 and 21, respectively.

The Longitudinal Width of the Perforated Portion: 100 mm

TABLE 17

| Measured Wind Speed Value (m/s) | | | | Speed Reduction Ratio (%) | |
|---|---|---|---|---|---|
| | A | B | C | B | C |
| 50 mm | 7.15 | 0.76 | 0.63 | 50 mm | 89.4 | 91.2 |
| 500 mm | 4.73 | 1.04 | 0.73 | 500 mm | 78.0 | 84.6 |
| 1000 mm | 3.63 | 1.34 | 0.98 | 1000 mm | 63.1 | 73.0 |
| 1500 mm | 3.31 | 1.28 | 0.90 | 1500 mm | 61.3 | 72.8 |
| 2000 mm | 2.18 | 1.21 | 0.81 | 2000 mm | 44.5 | 62.8 |
| 2500 mm | 1.94 | 1.09 | 0.69 | 2500 mm | 43.8 | 64.4 |

The Longitudinal Width of the Perforated Portion: 80 mm

TABLE 18

| Measured Wind Speed Value (m/s) | | | | Speed Reduction Ratio (%) | |
|---|---|---|---|---|---|
| | A | B | C | B | C |
| 50 mm | 7.18 | 0.85 | 0.75 | 50 mm | 88.1 | 89.6 |
| 500 mm | 4.72 | 1.07 | 0.84 | 500 mm | 77.3 | 82.2 |
| 1000 mm | 3.66 | 1.40 | 1.19 | 1000 mm | 61.7 | 67.5 |
| 1500 mm | 3.29 | 1.34 | 1.08 | 1500 mm | 59.3 | 67.2 |
| 2000 mm | 2.21 | 1.25 | 0.98 | 2000 mm | 43.4 | 55.7 |
| 2500 mm | 1.96 | 1.13 | 0.84 | 2500 mm | 42.3 | 57.1 |

The Longitudinal Width of the Perforated Portion: 50 mm

TABLE 19

| Measured Wind Speed Value (m/s) | | | | Speed Reduction Ratio (%) | |
|---|---|---|---|---|---|
| | A | B | C | B | C |
| 50 mm | 7.11 | 0.95 | 0.87 | 50 mm | 86.6 | 87.8 |
| 500 mm | 4.76 | 1.13 | 0.93 | 500 mm | 76.3 | 80.5 |
| 1000 mm | 3.68 | 1.49 | 1.31 | 1000 mm | 59.5 | 64.4 |
| 1500 mm | 3.34 | 1.42 | 1.19 | 1500 mm | 57.5 | 64.4 |
| 2000 mm | 2.19 | 1.28 | 1.11 | 2000 mm | 41.6 | 49.3 |
| 2500 mm | 1.99 | 1.17 | 0.97 | 2500 mm | 41.2 | 51.3 |

The Longitudinal Width of the Perforated Portion: 30 mm

TABLE 20

| Measured Wind Speed Value (m/s) | | | | Speed Reduction Ratio (%) | |
|---|---|---|---|---|---|
| | A | B | C | B | C |
| 50 mm | 7.17 | 1.25 | 0.94 | 50 mm | 82.6 | 86.9 |
| 500 mm | 4.80 | 1.21 | 1.05 | 500 mm | 74.8 | 78.1 |
| 1000 mm | 3.61 | 1.55 | 1.49 | 1000 mm | 57.1 | 58.7 |
| 1500 mm | 3.36 | 1.46 | 1.32 | 1500 mm | 56.5 | 60.7 |
| 2000 mm | 2.16 | 1.34 | 1.25 | 2000 mm | 38.0 | 42.1 |
| 2500 mm | 1.93 | 1.21 | 1.04 | 2500 mm | 37.3 | 46.1 |

The Longitudinal Width of the Perforated Portion: 10 mm

TABLE 21

| Measured Wind Speed Value (m/s) | | | | Speed Reduction Ratio (%) | |
|---|---|---|---|---|---|
| | A | B | C | B | C |
| 50 mm | 7.20 | 1.57 | 1.03 | 50 mm | 78.2 | 85.7 |
| 500 mm | 4.71 | 1.29 | 1.14 | 500 mm | 72.6 | 75.8 |
| 1000 mm | 3.60 | 1.62 | 1.54 | 1000 mm | 55.0 | 57.2 |
| 1500 mm | 3.29 | 1.51 | 1.41 | 1500 mm | 54.1 | 57.1 |
| 2000 mm | 2.11 | 1.44 | 1.33 | 2000 mm | 31.8 | 37.0 |
| 2500 mm | 1.89 | 1.24 | 1.12 | 2500 mm | 34.4 | 40.7 |

(Whether or Not it is Appropriate to Reduce the Perforation Ratio in the Baffle Plates 56 for Alleviating Winds Blowing Therethrough)

Figure 5:
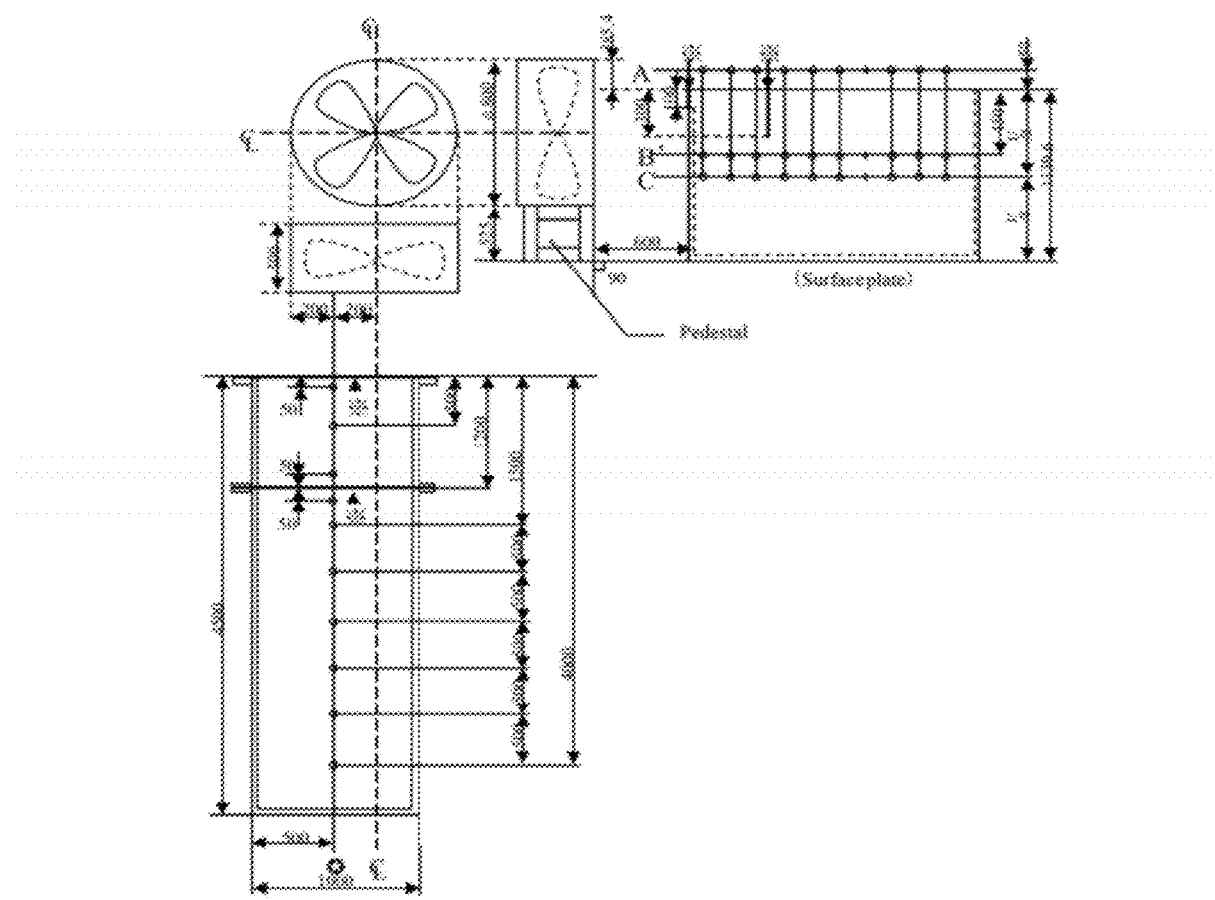
FIG. 5 is a side view and a plan view schematically illustrating a device for windbreak experiments similar to that in FIG. 2.
Figure 6:
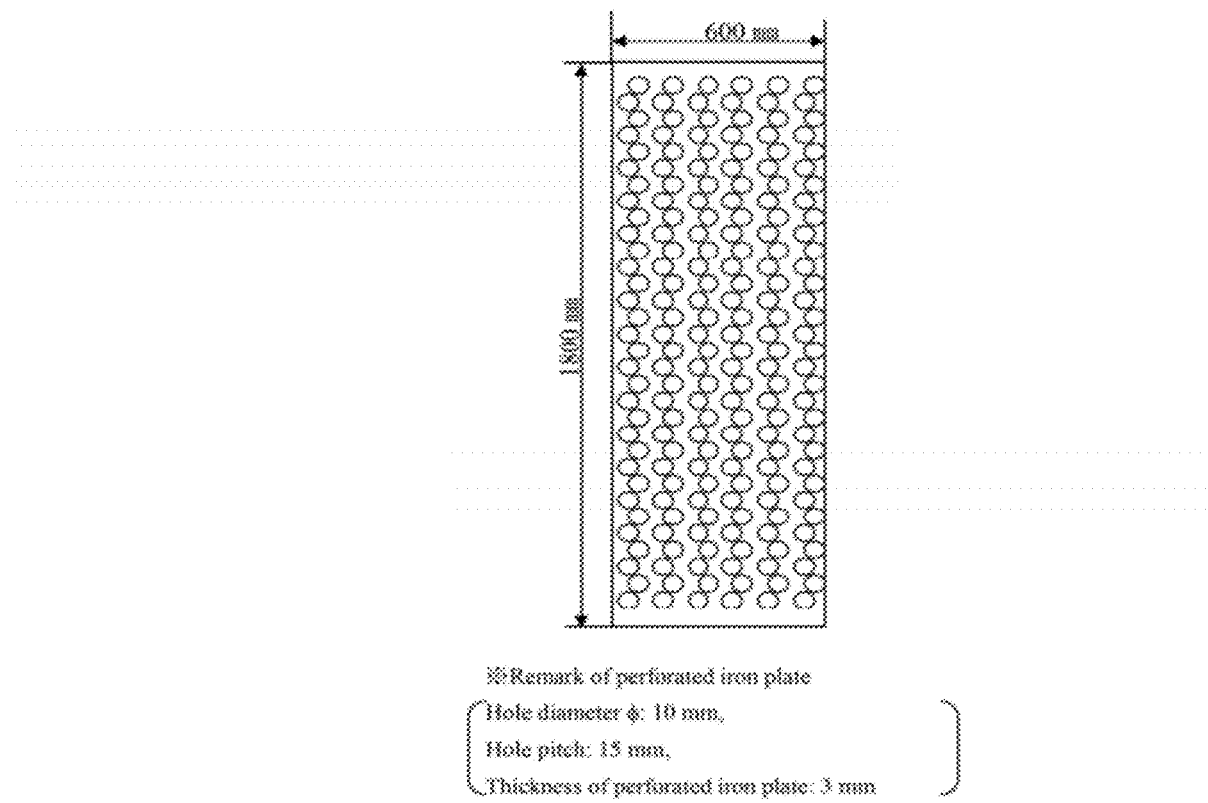
FIG. 6 is a partial plan view illustrating an example of a perforated baffle plate.
Figure 7:
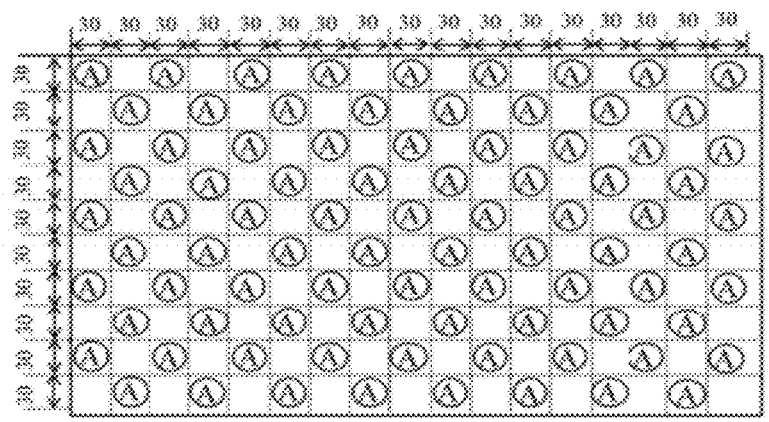
FIG. 7 is a partial plan view illustrating another example of the perforated baffle plate.
Figure 8:
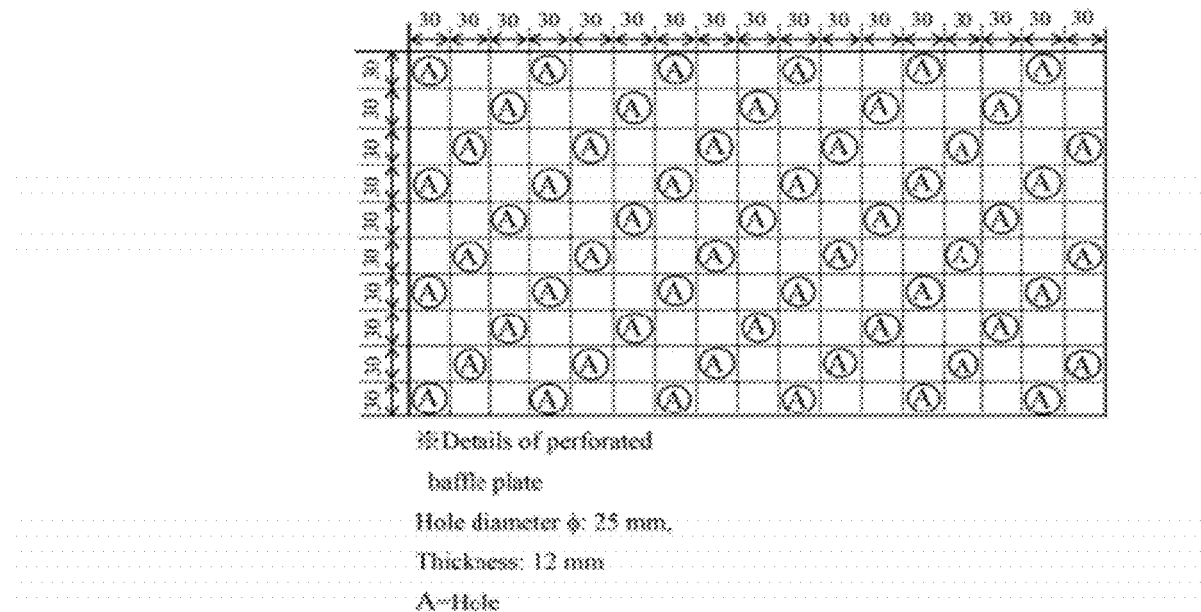
FIG. 8 is a partial plan view illustrating still another example of the perforated baffle plate.
Figure 9:
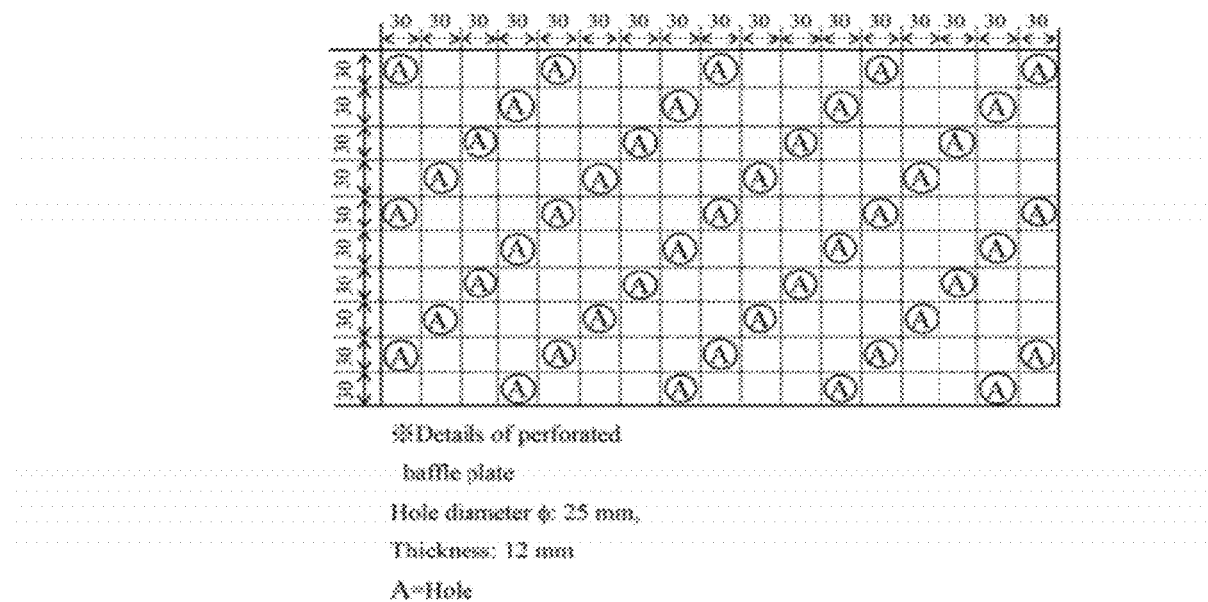
FIG. 9 is a partial plan view illustrating yet another example of the perforated baffle plate.
Figure 25:
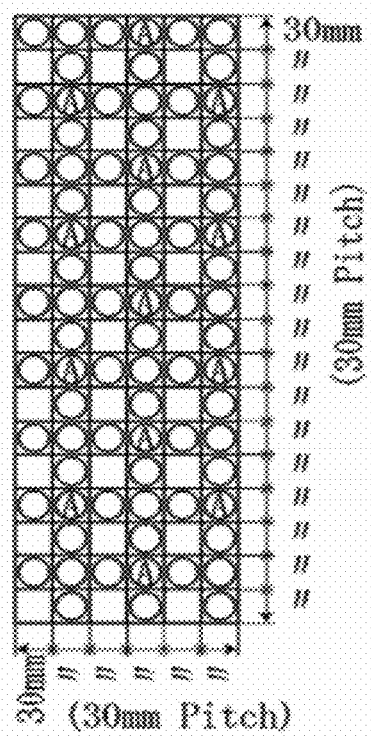
FIG. 25 is a partial plan view illustrating another example of the perforated baffle plate.

Measurements for average wind speed values (m/s) and average passed wind speed ratios (%) were conducted using baffle plates having surfaces illustrated in FIGS. 6, 7, 8 and 9 and having different perforation ratios. The average wind speed values are values resulted from simply averaging wind speeds measured at a downwind position at 200 mm from the perforated baffle plates. The calculations were conducted as follows: the average passed wind speed ratio (%)={(the average wind speed value)/(the speed value of wind immediately before passing through the perforated baffle plate in the upwind side)}×100. FIG. 25 illustrates the results. Further, measurements of wind speeds were conducted with an experiment device illustrated in FIG. 5, using the baffle plates with the different perforation ratios. Table 22 illustrates the results of the baffle plate in FIG. 7 (with a perforation ratio of 27.27%), Table 23 illustrates the results of the baffle plate in FIG. 8 (with a perforation ratio of 18.18%), and Table 24 illustrates the results of the baffle plate in FIG. 9 (with a perforation ratio of 14.14%). From these results of measurements, the speed reduction ratios were calculated, and the internal wind speeds in the case of a wind speed of 50 m/s outside the windbreak wall were calculated. Table 25 illustrates the results. From these experiments, it is possible to determine whether or not it is appropriate to set the interval x in FIG. 4 to 1200 mm even when the perforation ratio, the hole diameter, the hole arrangement and the average wind speed ratio are varied, while it was appropriate to set the interval x in FIG. 4 to 1200 mm when using a baffle plate as a perforated iron plate in FIG. 6 (with a perforation ratio of 40.28%).

TABLE 22

| Measured Wind Speed Value (m/s) | | | | Speed Reduction Ratio (%) | | |
|---|---|---|---|---|---|---|
| | A | B' | C | | B' | C |
| 50 mm | 7.21 | 0.62 | 0.54 | 50 mm | 91.4 | 92.5 |
| 500 mm | 4.79 | 0.76 | 0.69 | 500 mm | 84.1 | 85.6 |
| 1150 mm | 3.58 | 0.92 | 0.86 | 1150 mm | 74.3 | 76.0 |
| 1250 mm | 3.53 | 0.90 | 0.82 | 1250 mm | 74.5 | 76.8 |
| 1500 mm | 3.24 | 0.83 | 0.78 | 1500 mm | 74.4 | 75.9 |
| 2000 mm | 2.21 | 0.80 | 0.74 | 2000 mm | 63.8 | 66.5 |
| 2500 mm | 2.02 | 0.76 | 0.68 | 2500 mm | 62.4 | 66.3 |
| 3000 mm | 1.79 | 0.64 | 0.59 | 3000 mm | 64.2 | 67.0 |
| 3500 mm | 1.37 | 0.84 | 0.69 | 3500 mm | 38.7 | 49.6 |
| 4000 mm | 1.23 | 0.75 | 0.63 | 4000 mm | 39.0 | 48.8 |

TABLE 23

| Measured Wind Speed Value (m/s) | | | | Speed Reduction Ratio (%) | | |
|---|---|---|---|---|---|---|
| | A | B' | C | | B' | C |
| 50 mm | 7.19 | 0.81 | 0.70 | 50 mm | 88.7 | 90.3 |
| 500 mm | 4.76 | 0.91 | 0.84 | 500 mm | 80.9 | 82.4 |
| 1150 mm | 3.65 | 1.22 | 1.08 | 1150 mm | 66.6 | 70.4 |
| 1250 mm | 3.52 | 1.14 | 1.02 | 1250 mm | 67.6 | 71.0 |
| 1500 mm | 3.28 | 1.03 | 0.96 | 1500 mm | 68.6 | 70.7 |
| 2000 mm | 2.22 | 0.94 | 0.92 | 2000 mm | 57.7 | 58.6 |
| 2500 mm | 2.03 | 0.88 | 0.82 | 2500 mm | 56.7 | 59.6 |
| 3000 mm | 1.81 | 0.83 | 0.76 | 3000 mm | 54.1 | 58.0 |
| 3500 mm | 1.40 | 0.90 | 0.70 | 3500 mm | 35.7 | 50.0 |
| 4000 mm | 1.19 | 0.72 | 0.60 | 4000 mm | 39.5 | 49.6 |

TABLE 24

| Measured Wind Speed Value (m/s) | | | | Speed Reduction Ratio (%) | | |
|---|---|---|---|---|---|---|
| | A | B' | C | | B' | C |
| 50 mm | 7.16 | 0.90 | 0.80 | 50 mm | 87.4 | 88.8 |
| 500 mm | 4.73 | 1.04 | 0.89 | 500 mm | 78.0 | 81.2 |
| 1150 mm | 3.62 | 1.36 | 1.24 | 1150 mm | 62.4 | 65.7 |
| 1250 mm | 3.50 | 1.30 | 1.19 | 1250 mm | 62.9 | 66.0 |
| 1500 mm | 3.27 | 1.22 | 1.11 | 1500 mm | 62.7 | 66.1 |
| 2000 mm | 2.19 | 1.13 | 1.04 | 2000 mm | 48.4 | 52.5 |
| 2500 mm | 1.98 | 1.02 | 0.99 | 2500 mm | 48.5 | 50.0 |
| 3000 mm | 1.84 | 0.97 | 0.88 | 3000 mm | 47.3 | 52.2 |
| 3500 mm | 1.38 | 0.89 | 0.71 | 3500 mm | 35.5 | 48.6 |
| 4000 mm | 1.18 | 0.74 | 0.61 | 4000 mm | 37.3 | 48.3 |

The following Table 25 illustrates speed reduction ratios at a measurement position of 1150 mm and internal wind speeds when there was a windstorm at 50 m/s outside, in association with the average wind speed values resulted from the respective baffle plates. The perforation ratios were calculated by performing actual measurements on the respective baffle plates. The internal wind speeds were calculated from the respective speed reduction ratios. The wind speed values in the left part of Table 22 were converted into speed reduction ratios (%) in the right part of Table 22, and the wind speed values in the left part of Table 23 were converted into speed reduction ratios (%) in the right part of Table 23. Further, the left part of Table 24 was similarly converted into the right part of Table 24. Since there is no data measured at positions of 1300 mm or more, it is unclear whether or not the baffle plates were installed at an appropriate position, but it can be seen that at least the measurement position 1150 mm was effective. On the other hand, regarding the problem as to whether the speed reduction ratio can be improved by reducing the perforation ratio for alleviating winds blowing therethrough, Table 25 shows that the speed reduction ratio was increased with increasing average wind speed value. This fact will be described later, and a local maximum value exists. This makes it impossible to make the determination only from Table 25.

TABLE 25

| | See Table 22 Perforated wood plate (veneer or plywood) | See Table 14 Perforated Iron Plate | See Table 23 Perforated wood plate (veneer or plywood) | See Table 24 Perforated wood plate (veneer or plywood) |
|---|---|---|---|---|
| Perforation Ratio (%) | 27.27% | 40.28% | 18.18% | 14.14% |
| Average Wind Speed Value (m/s) | 2.55 | 2.34 | 2.33 | 2.03 |
| Average Passed Wind Speed Ratio (%) | 27.10 | 24.95 | 24.89 | 21.66 |
| Speed Reduction | 74.30% | 69.80% | 66.60% | 62.40% |

TABLE 25-continued

|  | See Table 22 Perforated wood plate (veneer or plywood) | See Table 14 Perforated Iron Plate | See Table 23 Perforated wood plate (veneer or plywood) | See Table 24 Perforated wood plate (veneer or plywood) |
| --- | --- | --- | --- | --- |
| Ratio (%) Internal Wind Speed (m/s) | 12.85 m/s | 15.1 m/s | 16.7 m/s | 18.8 m/s |

Next, it is determined whether or not winds were blown from above at a measurement position of 2300 mm, regarding the perforated baffle plates. Referring to Tables 22 to 24, there was abruptly change in difference of speed reduction ratio between the measurement positions 3000 mm and 3500 mm. The reason thereof is as follows. The wind speed was mildly increased up to the measurement position 3000 mm. However, it is indicated that an external windstorm was abruptly diffused and blown into the inside of the windbreak wall 52 at the measurement position 3500 mm. In other words, it is revealed that, in the intervals x' in FIG. 4, winds were blown from above around a position at 2300 mm from the baffle plate in the upwind side. In the case of the right part of Table 4 regarding the case where only the windbreak wall was used, winds were blown at a measurement position of 2000 mm.

As to whether or not the speed reduction ratio changes with the change of the average wind speed value, it has been revealed that it changes therewith as exhibited in the aforementioned Table 25. This change occurs such that the speed reduction ratio increases with increasing average wind speed value. However, if the average wind speed value is unlimitedly increased, this will induce a state similar to that in the case where no baffle plates exist. That is, if the average wind speed value is increased, it becomes closer to the value in Table 4, while if the average wind speed value is decreased, it becomes closer to the value in the case of the baffle plate with no perforation. This reveals that there is a maximum average wind speed value which maximizes the speed reduction ratio. Hereinafter, there will be described the reason why the average wind speed value is cited as a criterion for limitation of numerical values, instead of citing the perforation ratio as a criterion therefor. Referring to Table 25, the perforated iron plate had a largest perforation ratio value of 40.28%. However, the perforated wood plate with a perforation ratio of 27.27% could offer a larger speed reduction ratio (%). Thus, it has been revealed that the speed reduction ratio (%) is not proportional to the perforation ratio. Next, there will be described the problem of the citation of the average wind speed value as the criterion. The measurements in the paragraphs 0017 and 0074 are different from each other, only in that they result in values measured at a downwind position at 50 mm from the perforated baffle plates and values measured at a downwind position at 200 mm therefrom, respectively. The measurements conducted under these measurement conditions resulted in 4.80 m/s at 50 mm and 2.34 m/s at 200 mm. For the aforementioned reason, it is important to satisfy the condition about the distance [mm] from the perforated baffle plates in the downwind side. Accordingly, in the present specification and the claims, the average wind speed values indicate values measured at a position at a distance of 200 mm from the perforated baffle plates in the downwind side.

Figure 24:
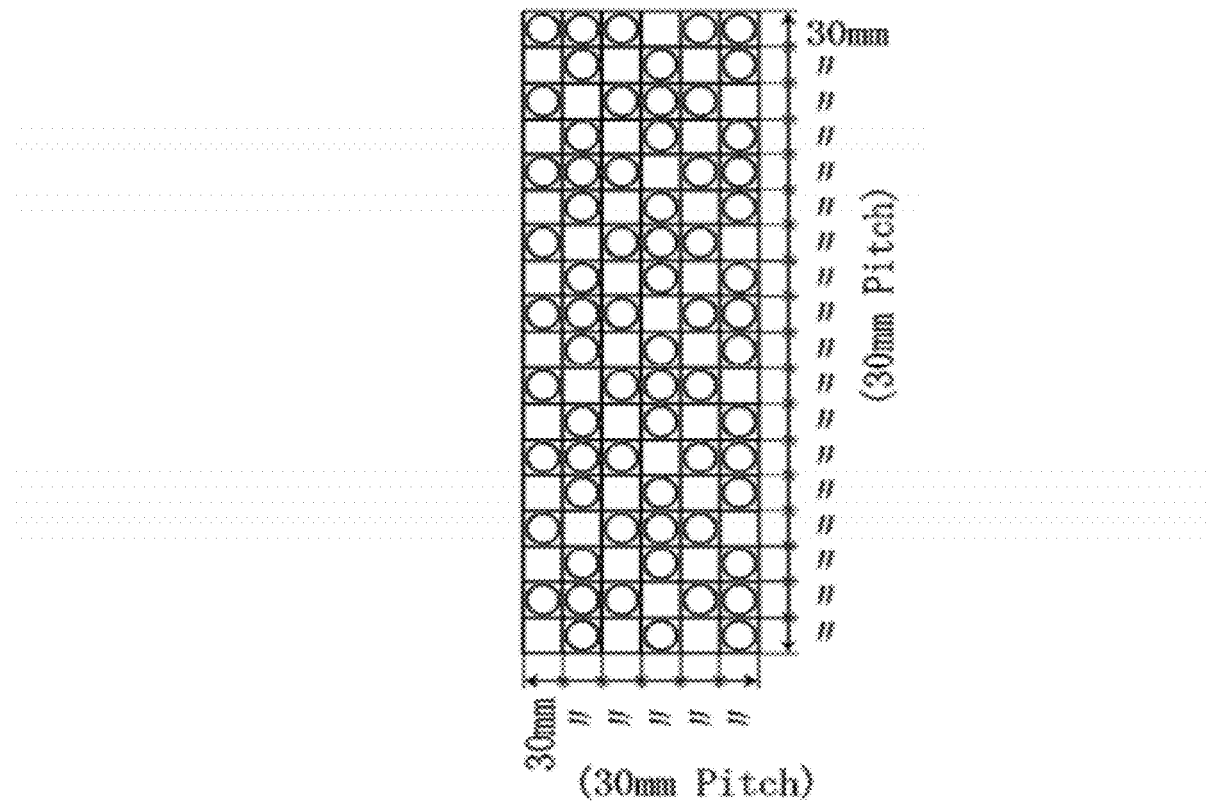
FIG. 24 is a partial plan view illustrating an example of the perforated baffle plate.
Figure 26:
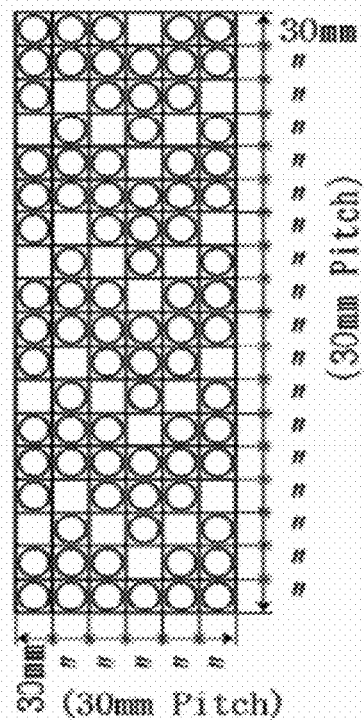
FIG. 26 is a partial plan view illustrating still another example of the perforated baffle plate.
Figure 27:
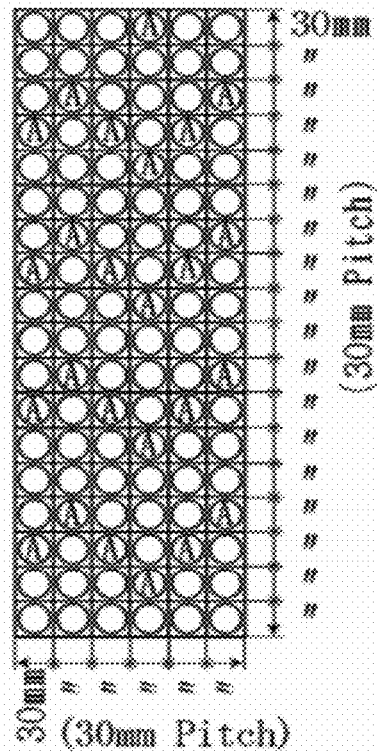
FIG. 27 is a partial plan view illustrating yet another example of the perforated baffle plate.
Figure 28:
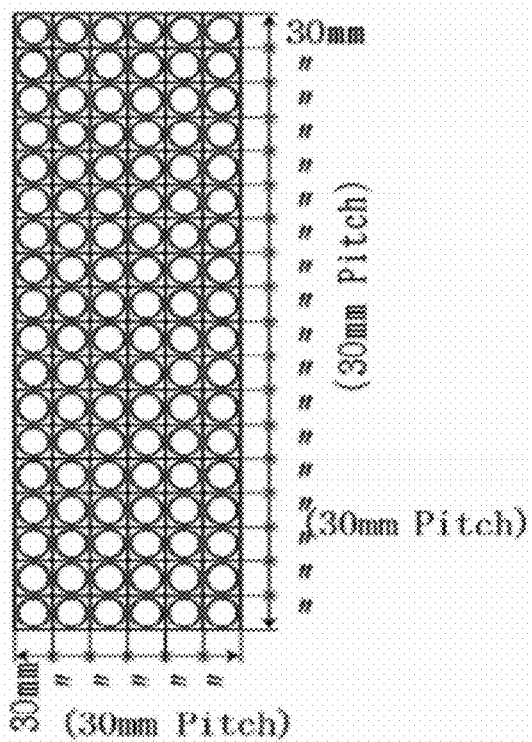
FIG. 28 is a partial plan view illustrating yet another example of the perforated baffle plate.

In conclusion, with respect to the interval x and the intervals x' in FIG. 4, the speed reduction effect is increased with increasing average wind speed value realized by the baffle plates, from 2.33 m/s to 2.55 m/s through 2.34 m/s. This reveals that it is appropriate to set the interval x in FIG. 4 to 1200 mm, and the average wind speed value affects the speed reduction effect, regardless of the perforation ratio, the hole diameter, the hole arrangement in the baffle plates and the like. It has been revealed that there is a maximum average wind speed value which maximizes the speed reduction value. As data which identifies this maximum value, Table 25 is effective, but is insufficient. In order to identify the maximum speed reduction value, the data in Table 25 was supplemented. Average wind speed values (m/s) and average passed wind speed ratios (%) were identified according to the method described in the paragraph 0074, using baffle plates having surfaces illustrated in FIGS. 24, 25, 26, 27 and 28 and having different perforation ratios, and Table 36 illustrates the results. Further, measurements for wind speeds were conducted with the experiment device illustrated in FIG. 5, using these baffle plates with the different perforation ratios. As these results, Table 31 illustrates values measured with the baffle plate in FIG. 24, Table 32 illustrates values measured with the baffle plate in FIG. 25, Table 33 illustrates values measured with the baffle plate in FIG. 26, Table 34 illustrates values measured with the baffle plate in FIG. 27, and Table 35 illustrates values measured with the baffle plate in FIG. 28. The wind speed values in the left parts of Tables 31, 32, 33, 34 and 35 were converted into speed reduction ratios (%) in the right parts of Tables 31, 32, 33, 34 and 35, respectively. From these results of measurements, the speed reduction ratios were calculated, and the internal wind speeds in the case of a wind speed of 50 m/s outside the wind break wall were calculated. Table 36 illustrates the results. Referring to Tables 25 and 36, the speed reduction ratio (74.3%) had a maximum value when the average wind speed value was 2.55 m/s.

Further, at the portion at 450 to 570 mm from the upper end of the windbreak wall, winds are blown thereinto from above at upwind portions at about 2300 mm from the baffle plate, regardless of the perforation ratio, the hole diameter in the baffle plates, the length of the longitudinal width and the average wind speed value, with reference to Tables 22 to 24. However, referring to Tables 14 to 16, it is appropriate that the intervals x' in FIG. 4 are 1800 mm in the case where the baffle plates has a longitudinal width of 400 mm, based on the aforementioned results of experiments.

In summarizing the aforementioned conclusions, the condition for realizing an optimum speed reduction effect is that the average wind speed value should be 2.55 m/s (see Table 25), in the case where the interval x in FIG. 4 is 1200 mm and the intervals x' are 1800 mm and, further, the perforated portion 54 has a longitudinal width of 100 mm. Even with the intervals x', when the average wind speed value is 2.55 m/s (see Tables 25 and 36), the larger the longitudinal width of the baffle plates, the better. However, in consideration of sunlight for growing plants, the larger the longitudinal width of the baffle plates, the more disadvantageous. Even when the baffle plates have a longitudinal width of 100 mm, there is provided a speed reduction effect, but the intervals between the baffle plates and the interval between them and the windbreak wall should be decreased with decreasing longitudinal width.

Accordingly, it is necessary only to appropriately and selectively determine the longitudinal width of the baffle plates. Hereinafter, experiments will be conducted in assuming that an appropriate longitudinal width is 400 mm.

Figure 10:
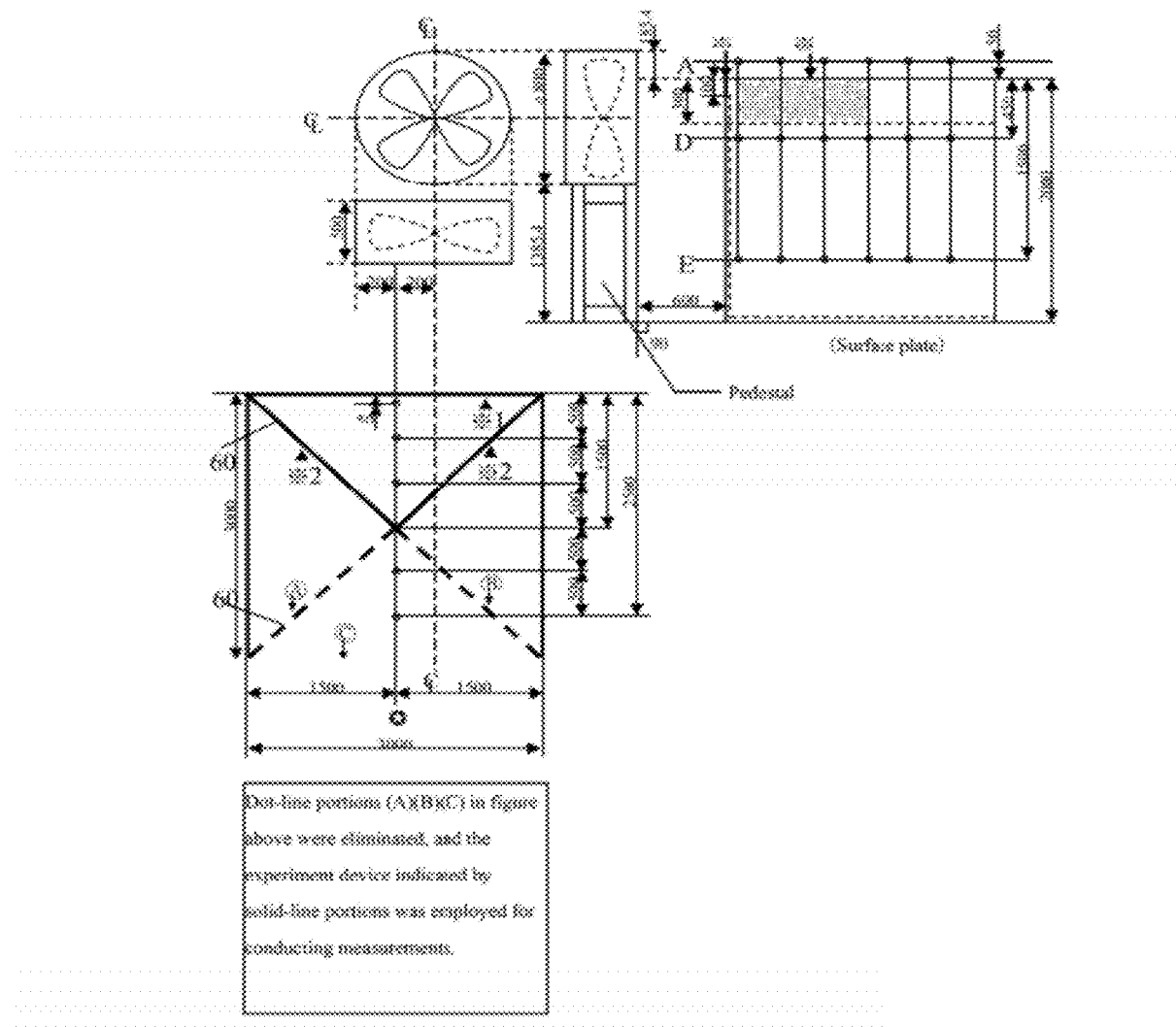
FIG. 10 is a view illustrating a device for windbreak experiments including baffle plates placed along diagonal lines, similarly to FIG. 2.
Figure 11:
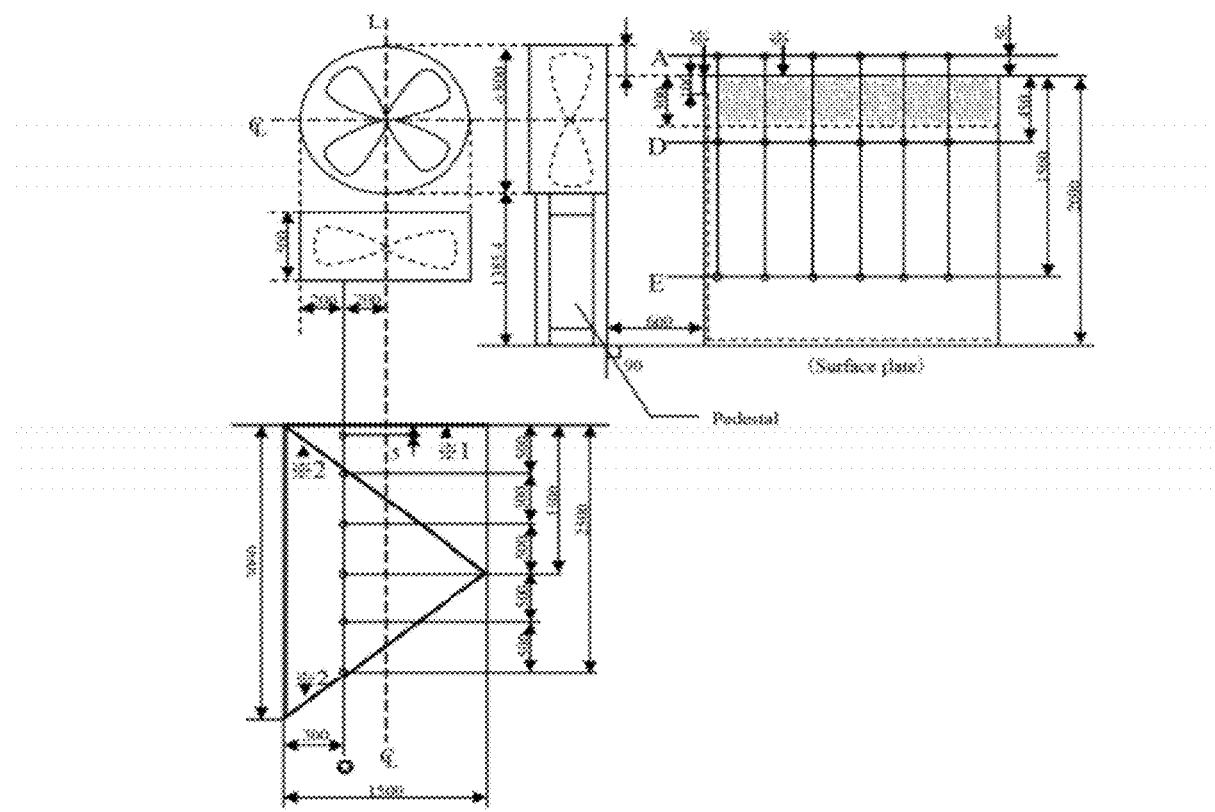
FIG. 11 is a view illustrating another device for windbreak experiments including baffle plates placed along diagonal lines, similarly to FIG. 2.

Regarding the optical environment in the wall inside portion surrounded by the windbreak wall under the aforementioned conditions, the baffle plates with a longitudinal width of 400 mm are mounted at intervals of 1800 mm, which interrupts sunlight, thereby resulting in poor sunshine. In order to increase the sunshine, the placement of the baffle plates in a plane was changed, further, the longitudinal width of the baffle plates was set to 300 mm as illustrated in FIG. 10 and FIG. 11, the baffle plates including the windbreak wall were installed in a rectangular plane at intervals of 3000 mm, additional baffle plates 60 and 60 were mounted along their diagonal lines, and six measurement positions were set for a measurement point D in FIG. 10 and FIG. 11. Further, since the speed reduction ability was insufficient in the structure based on the aforementioned respective conclusions, measurements were conducted at a position below the upper end portion of the windbreak wall by 1.5 m (measurement point E).

Table 26 which will be illustrated hereinafter illustrates wind speeds measured at the measurement points D and E in FIG. 10, and Table 27 which will be illustrated hereinafter illustrates wind speeds measured at the measurement points D and E in FIG. 11, and the speed reduction ratios at the measurement points D and E were calculated from these values. Referring to the right parts of Tables 26 and 27, even at the portion which exhibited a smallest speed reduction effect, out of all the 24 measurement points for the measurement points D and E, it is possible to reduce the speed of a windstorm at a wind speed of 50 m/s to 11.45 m/s, and at the measurement point E, the wind speed corresponds to 9.25 m/s. As described above, it has been revealed that it is possible to provide a sufficient effect when the interval of the baffle plates is 3000 mm. Thus, in order to further increase the sunshine, they were installed at intervals of 4000 mm similarly to in FIG. 10, and additional baffle plates were installed along their diagonal lines. The wind speed values in the left part of Table 26 were converted into speed reduction ratios (%) in the right part of Table 26, and the wind speed values in the left part of Table 27 were converted into speed reduction ratios (%) in the right part of Table 27.

TABLE 26

| Measured Wind Speed Value (m/s) | | | | Speed Reduction Ratio (%) | |
| --- | --- | --- | --- | --- | --- |
| | | | | D | E |
| | A | D | E | Below by 450 mm | Below by 1500 mm |
| 50 mm | 7.15 | 0.61 | 0.28 | 50 mm | | 96.1 |
| 500 mm | 4.79 | 0.73 | 0.24 | 500 mm | 84.8 | 95 |
| 1000 mm | 3.62 | 0.83 | 0.31 | 1000 mm | 77.1 | 91.4 |
| 1500 mm | 3.36 | 0.75 | 0.49 | 1500 mm | 77.7 | 85.4 |
| 2000 mm | 2.22 | 0.59 | 0.41 | 2000 mm | 73.4 | 81.5 |
| 2500 mm | 1.98 | 0.49 | 0.36 | 2500 mm | 75.3 | 81.8 |

TABLE 27

| Measured Wind Speed Value (m/s) | | | | Speed Reduction Ratio (%) | |
| --- | --- | --- | --- | --- | --- |
| | | | | D | E |
| | A | D | E | Below by 450 | Below by 1500 mm |
| 50 mm | 7.18 | 0.56 | 0.27 | 50 mm | 92.2 | 96.2 |
| 500 mm | 4.81 | 0.48 | 0.21 | 500 mm | 90.0 | 95.6 |
| 1000 mm | 3.64 | 0.52 | 0.17 | 1000 mm | 85.7 | 95.3 |
| 1500 mm | 3.38 | 0.45 | 0.28 | 1500 mm | 86.7 | 91.7 |
| 2000 mm | 2.25 | 0.43 | 0.24 | 2000 mm | 80.9 | 89.3 |
| 2500 mm | 2.01 | 0.40 | 0.18 | 2500 mm | 80.1 | 91.0 |

Table 28 which will be illustrated hereinafter illustrates wind speeds measured at the measurement points D and E in the case of intervals of 4000 mm similarly to in FIG. 10, Table 29 which will be illustrated hereinafter illustrates wind speeds measured at the measurement points D and E in the case of intervals of 4000 mm similarly to in FIG. 11, and, from these values, the speed reduction ratios at the measurement points D and E were calculated. Referring to Tables 28 and 29, at the portion which exhibited a smallest speed reduction effect, out of all the 16 measurement points for the measurement point E, it is possible to change windstorms at a wind speed of 50 m/s to 13.15 m/s, and a wind speed corresponds to 10.52 m/s with respect to a wind speed of 40 m/s. This wind speed does not correspond to a windstorm, but is not a small wind speed, and 13.15 m/s belongs to a group of strong winds. Accordingly, in the case of employing a structure as illustrated in FIG. 10 and FIG. 11 using perforated baffle plates as in FIG. 7, assuming that windstorms to be broken is at 50 m/s, there is a limit on the intervals between the baffle plates at about 4000 mm, in the case where there is a height difference of 1.5 m between the windbreak wall and the greenhouses constructed inside, regarding the intervals between the baffle plates expect the additional baffle plates 60 installed along the diagonal lines, and regarding the interval between the baffle plates and the windbreak wall. The wind speed values in the left part of Table 28 were converted into speed reduction ratios (%) in the right part of Table 28, and the wind speed values in the left part of Table 29 was converted into speed reduction ratios (%) in the right part of Table 29.

TABLE 28

| Measured Wind Speed Value (m/s) | | | | | Speed Reduction Ratio (%) | |
| --- | --- | --- | --- | --- | --- | --- |
| | A | D | E | | D Below by 450 mm | E Below by 1500 mm |
| 50 mm | 7.14 | 0.63 | 0.27 | 50 mm | 91.2 | 96.2 |
| 500 mm | 4.76 | 0.75 | 0.22 | 500 mm | 84.2 | 95.4 |
| 1000 mm | 3.63 | 0.87 | 0.35 | 1000 mm | 76.0 | 90.4 |
| 1500 mm | 3.31 | 0.73 | 0.47 | 1500 mm | 77.9 | 85.8 |
| 2000 mm | 2.20 | 0.61 | 0.42 | 2000 mm | 72.3 | 80.9 |
| 2500 mm | 1.97 | 0.49 | 0.35 | 2500 mm | 75.1 | 82.2 |
| 3000 mm | 1.78 | 0.37 | 0.29 | 3000 mm | 79.2 | 83.7 |
| 3500 mm | 1.37 | 0.46 | 0.36 | 3500 mm | 66.4 | 73.7 |

TABLE 29

| Measured Wind Speed Value (m/s) | | | | | Speed Reduction Ratio (%) | |
| --- | --- | --- | --- | --- | --- | --- |
| | A | D | E | | D Below by 450 mm | E Below by 1500 mm |
| 50 mm | 7.16 | 0.57 | 0.28 | 50 mm | 92.0 | 96.1 |
| 500 mm | 4.79 | 0.54 | 0.22 | 500 mm | 88.7 | 95.4 |
| 1000 mm | 3.61 | 0.68 | 0.19 | 1000 mm | 81.2 | 94.7 |
| 1500 mm | 3.34 | 0.63 | 0.46 | 1500 mm | 81.1 | 86.2 |
| 2000 mm | 2.23 | 0.58 | 0.40 | 2000 mm | 74.0 | 82.1 |
| 2500 mm | 1.99 | 0.54 | 0.36 | 2500 mm | 72.9 | 81.9 |
| 3000 mm | 1.81 | 0.47 | 0.32 | 3000 mm | 74.0 | 82.3 |
| 3500 mm | 1.35 | 0.42 | 0.27 | 3500 mm | 68.9 | 80.0 |

Figure 12:
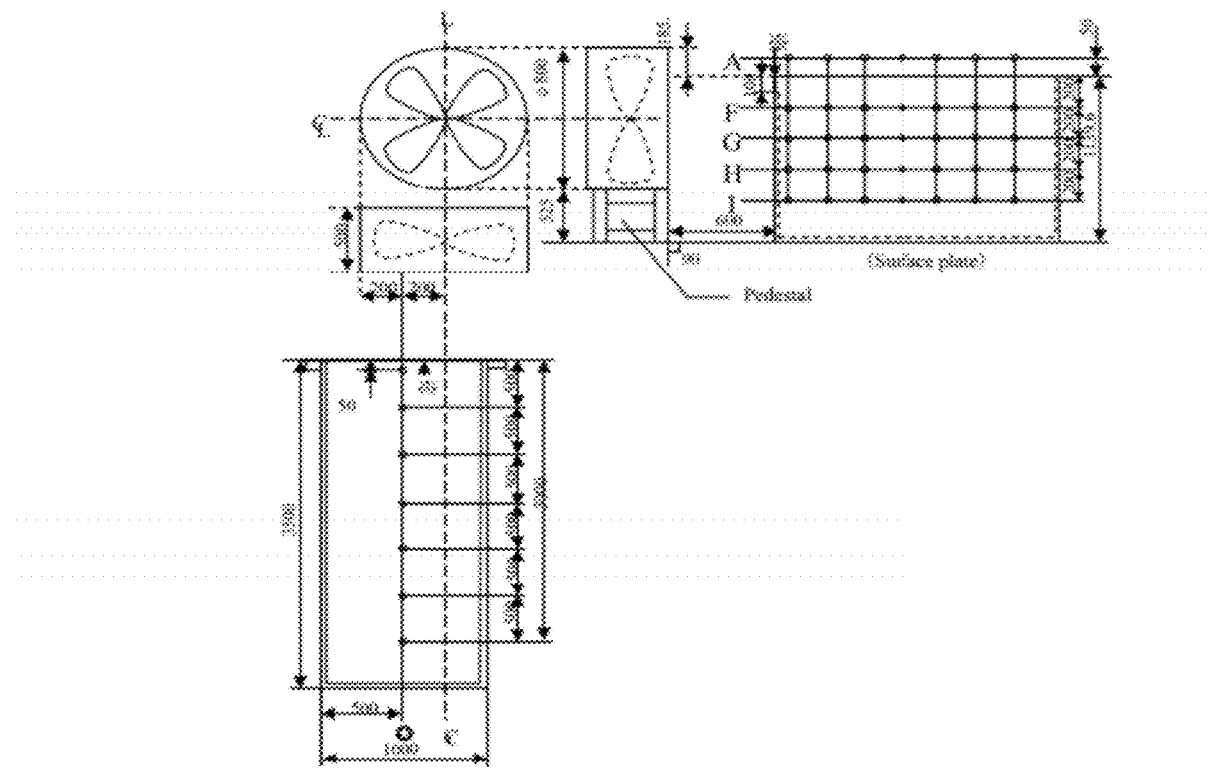
FIG. 12 is a view illustrating a device for windbreak experiments including measurements points set at positions below the upper end portion of the windbreak wall by 200 mm, 400 mm, 600 mm and 800 mm, similarly to FIG. 2.

Based on the wind-speed data in Tables 26 to 29, it is revealed that it is possible to increase the interval between the windbreak wall and the baffle plates and the intervals between the baffle plates, as the height of the inside greenhouses surrounded by the windbreak wall is made smaller than that of the windbreak wall. In order to confirm this tendency, measurement points were set at positions below the upper end portion of the windbreak wall by 200 mm, 400 mm, 600 mm and 800 mm, as illustrated in FIG. 12, and the speed reduction ratios (Table 30) were calculated for the measurement points F, G, H and I with respect to the measurement point A in Table 30.

Referring to the data of the speed reduction ratios in Table 30, there is clearly exhibited a tendency similar to the aforementioned conclusions (see the paragraph 0064). All the values measured at the positions below the upper end of the windbreak wall by 200 mm, 400 mm, 600 mm and 800 mm exhibit reduction of the speed reduction effect, in the range of 1500 mm to 2000 mm. The aforementioned conclusion describes the phenomenon that the speed reduction effect decreases at portions at distances of 1800 to 2300 mm from the baffle plates. The conclusion about the perforated portion in the windbreak wall describes the phenomenon that the speed reduction effect decreases at portions at distances of 1500 to 2000 mm from the perforated portion 54, unlike that about the baffle plates. This phenomenon appears in all the experiment data resulted from varying the longitudinal width of the perforated portion 54 among 100 mm, 200 mm, 300 mm, 80 mm, 50 mm, 30 mm and 10 mm. This speed reduction effect is increased at positions closer to the upper end of the windbreak wall and is decreased at positions farther from the upper end of the windbreak wall in the downward direction.

TABLE 30

| | Speed Reduction Ratio (%) | | | |
| --- | --- | --- | --- | --- |
| | F Below by 200 mm | G Below by 400 mm | H Below by 600 mm | I Below by 800 mm |
| 50 mm | 84.9 | 90.1 | 91.9 | 94.0 |
| 500 mm | 74.1 | 80.0 | 85.7 | 89.1 |
| 1000 mm | 62.0 | 66.7 | 76.0 | 79.5 |
| 1500 mm | 61.1 | 66.0 | 75.6 | 80.7 |
| 2000 mm | 45.7 | 54.3 | 66.5 | 73.8 |
| 2500 mm | 46.2 | 54.3 | 69.0 | 76.1 |
| 3000 mm | 48.0 | 54.2 | 70.4 | 78.8 |

TABLE 31

| Measured Wind Speed Value (m/s) | | | | | Speed Reduction Ratio (%) | |
| --- | --- | --- | --- | --- | --- | --- |
| | | | | | B' | C |
| | A | B' | C | | Below by 450 mm | Below by 569.8 mm |
| 50 mm | 7.19 | 0.71 | 0.66 | 50 mm | 90.1 | 90.8 |
| 500 mm | 4.71 | 0.83 | 0.72 | 500 mm | 82.4 | 84.7 |
| 1150 mm | 3.57 | 1.10 | 1.02 | 1150 mm | 69.2 | 71.4 |
| 1250 mm | 3.52 | 1.05 | 0.96 | 1250 mm | 70.2 | 72.7 |
| 1500 mm | 3.26 | 0.98 | 0.89 | 1500 mm | 69.9 | 72.7 |
| 2000 mm | 2.22 | 0.90 | 0.82 | 2000 mm | 59.5 | 63.1 |
| 2500 mm | 1.97 | 0.84 | 0.77 | 2500 mm | 57.4 | 60.9 |
| 3000 mm | 1.75 | 0.73 | 0.66 | 3000 mm | 58.3 | 62.3 |
| 3500 mm | 1.37 | 0.87 | 0.72 | 3500 mm | 36.5 | 47.4 |
| 4000 mm | 1.18 | 0.76 | 0.68 | 4000 mm | 35.6 | 42.4 |

TABLE 32

| Measured Wind Speed Value (m/s) | | | | | Speed Reduction Ratio (%) | |
| --- | --- | --- | --- | --- | --- | --- |
| | | | | | B' | C |
| | A | B' | C | | Below by 450 mm | Below by 569.8 mm |
| 50 mm | 7.17 | 0.78 | 0.71 | 50 mm | 89.1 | 90.1 |
| 500 mm | 4.75 | 0.89 | 0.80 | 500 mm | 81.3 | 83.2 |
| 1150 mm | 3.59 | 1.16 | 1.11 | 1150 mm | 67.1 | 69.1 |
| 1250 mm | 3.53 | 1.12 | 1.04 | 1250 mm | 68.3 | 70.5 |
| 1500 mm | 3.33 | 1.06 | 0.95 | 1500 mm | 68.2 | 71.5 |
| 2000 mm | 2.18 | 0.98 | 0.90 | 2000 mm | 55.0 | 58.7 |
| 2500 mm | 1.96 | 0.92 | 0.84 | 2500 mm | 53.1 | 57.1 |
| 3000 mm | 1.77 | 0.82 | 0.79 | 3000 mm | 53.7 | 55.4 |
| 3500 mm | 1.36 | 0.89 | 0.83 | 3500 mm | 34.6 | 39.0 |
| 4000 mm | 1.19 | 0.78 | 0.70 | 4000 mm | 34.5 | 41.2 |

TABLE 33

| Measured Wind Speed Value (m/s) | | | | | Speed Reduction Ratio (%) | |
| --- | --- | --- | --- | --- | --- | --- |
| | | | | | B' | C |
| | A | B' | C | | Below by 450 mm | Below by 569.8 mm |
| 50 mm | 7.20 | 0.79 | 0.73 | 50 mm | 89.0 | 89.9 |
| 500 mm | 4.77 | 0.90 | 0.81 | 500 mm | 81.1 | 83.0 |

TABLE 33-continued

| Measured Wind Speed Value (m/s) | | | | Speed Reduction Ratio (%) | |
|---|---|---|---|---|---|
| | A | B' | C | B' Below by 450 mm | C Below by 569.8 mm |
| 1150 mm | 3.62 | 1.18 | 1.14 | 1150 mm 67.4 | 68.5 |
| 1250 mm | 3.54 | 1.14 | 1.05 | 1250 mm 67.8 | 70.3 |
| 1500 mm | 3.32 | 1.06 | 0.94 | 1500 mm 68.1 | 71.7 |
| 2000 mm | 2.20 | 1.00 | 0.90 | 2000 mm 54.5 | 59.1 |
| 2500 mm | 2.01 | 0.94 | 0.85 | 2500 mm 53.2 | 57.7 |
| 3000 mm | 1.76 | 0.82 | 0.78 | 3000 mm 53.4 | 55.7 |
| 3500 mm | 1.35 | 0.88 | 0.83 | 3500 mm 34.8 | 38.5 |
| 4000 mm | 1.21 | 0.80 | 0.71 | 4000 mm 33.9 | 41.3 |

TABLE 34

| Measured Wind Speed Value (m/s) | | | | Speed Reduction Ratio (%) | |
|---|---|---|---|---|---|
| | A | B' | C | B' Below by 450 mm | C Below by 569.8 mm |
| 50 mm | 7.18 | 0.97 | 0.91 | 50 mm 86.5 | 87.3 |
| 500 mm | 4.74 | 1.15 | 1.04 | 500 mm 75.7 | 78.1 |
| 1150 mm | 3.60 | 1.43 | 1.36 | 1150 mm 60.3 | 62.2 |
| 1250 mm | 3.51 | 1.38 | 1.30 | 1250 mm 60.7 | 63.0 |
| 1500 mm | 3.29 | 1.33 | 1.24 | 1500 mm 59.6 | 62.3 |
| 2000 mm | 2.17 | 1.27 | 1.18 | 2000 mm 41.5 | 45.6 |
| 2500 mm | 1.99 | 1.19 | 1.12 | 2500 mm 40.2 | 43.7 |
| 3000 mm | 1.78 | 1.10 | 1.08 | 3000 mm 38.2 | 39.3 |
| 3500 mm | 1.34 | 0.95 | 0.89 | 3500 mm 29.1 | 33.6 |
| 4000 mm | 1.17 | 0.87 | 0.80 | 4000 mm 25.6 | 31.6 |

TABLE 35

| Measured Wind Speed Value (m/s) | | | | Speed Reduction Ratio (%) | |
|---|---|---|---|---|---|
| | A | B' | C | B' Below by 450 mm | C Below by 569.8 mm |
| 50 mm | 7.16 | 1.01 | 0.95 | 50 mm 85.9 | 86.7 |
| 500 mm | 4.79 | 1.21 | 1.12 | 500 mm 74.7 | 76.6 |
| 1150 mm | 3.63 | 1.49 | 1.42 | 1150 mm 59.0 | 60.9 |
| 1250 mm | 3.54 | 1.45 | 1.36 | 1250 mm 59.0 | 61.6 |
| 1500 mm | 3.32 | 1.38 | 1.29 | 1500 mm 58.4 | 61.1 |
| 2000 mm | 2.19 | 1.31 | 1.22 | 2000 mm 40.2 | 44.3 |
| 2500 mm | 2.03 | 1.24 | 1.15 | 2500 mm 38.9 | 43.3 |
| 3000 mm | 1.80 | 1.13 | 1.11 | 3000 mm 37.2 | 38.3 |
| 3500 mm | 1.39 | 0.97 | 0.93 | 3500 mm 30.2 | 33.1 |
| 4000 mm | 1.22 | 0.90 | 0.82 | 4000 mm 26.2 | 32.8 |

TABLE 36

| | See Table 35 Perforated Wood Plate (Veneer or Plywood) | See Table 34 Perforated Wood Plate (Veneer or Plywood) | See Table 33 Perforated Wood Plate (Veneer or Plywood) | See Table 32 Perforated Wood Plate (Veneer or Plywood) | See Table 31 Perforated Wood Plate (Veneer or Plywood) |
|---|---|---|---|---|---|
| Perforation Ratio (%) | 54.54% | 50.25% | 40.91% | 38.90% | 34.09% |
| Average Wind Speed Value (m/s) | 3.93 | 3.79 | 3.19 | 2.99 | 2.74 |
| Average Passed Wind Speed Ratio (%) | 41.68 | 40.36 | 33.90 | 31.81 | 29.09 |
| Speed Reduction Ratio (%) | 59.00% | 60.30% | 69.40% | 67.70% | 69.20% |
| Internal Wind Speed (m/s) | 20.5 m/s | 19.9 m/s | 15.3 m/s | 16.2 m/s | 15.4 m/s |

The speed reduction ratios realized by the baffle plates are determined by the average wind speed values of strong winds, regardless of the shape and the diameter of the holes provided in the baffle plates and the way of the arrangement thereof. It has been revealed that the average wind speed value which maximizes the speed reduction ratio falls within the range of 2.3 to 3.0 m/s and is about 2.55 m/s.

Figure 13:
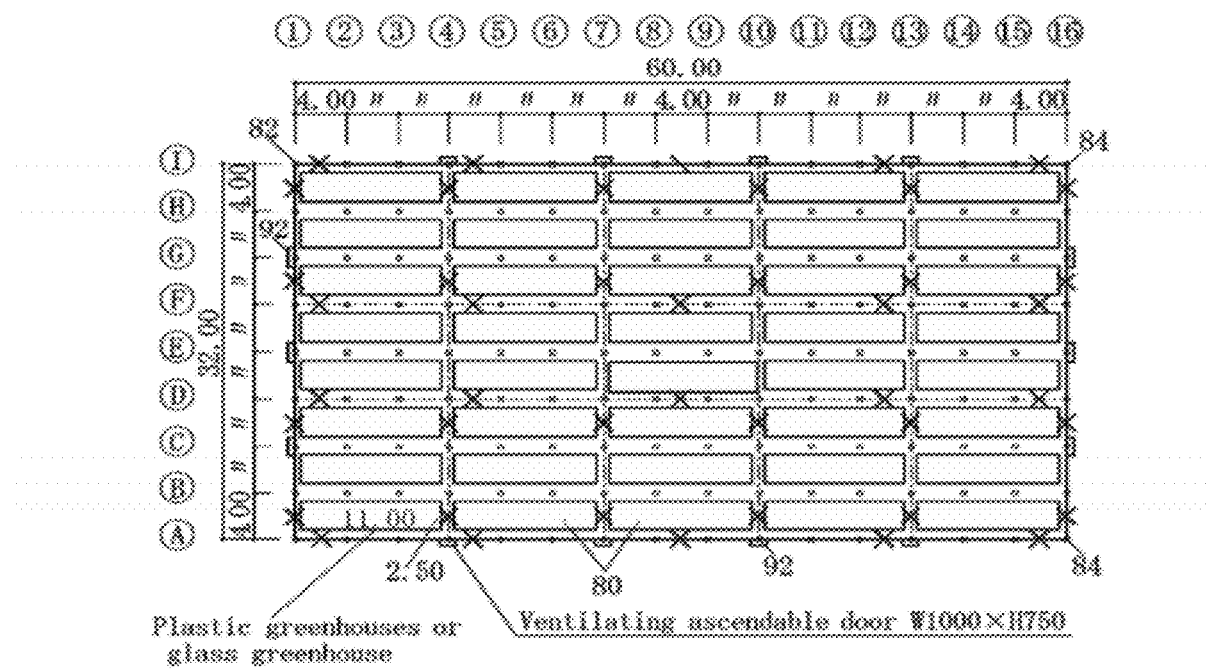
FIG. 13 is a schematic explanation view illustrating a state where forty cultivation greenhouses are surrounded by a windbreak fence in the greenhouse windbreak mechanism according to the present invention.
Figure 14:
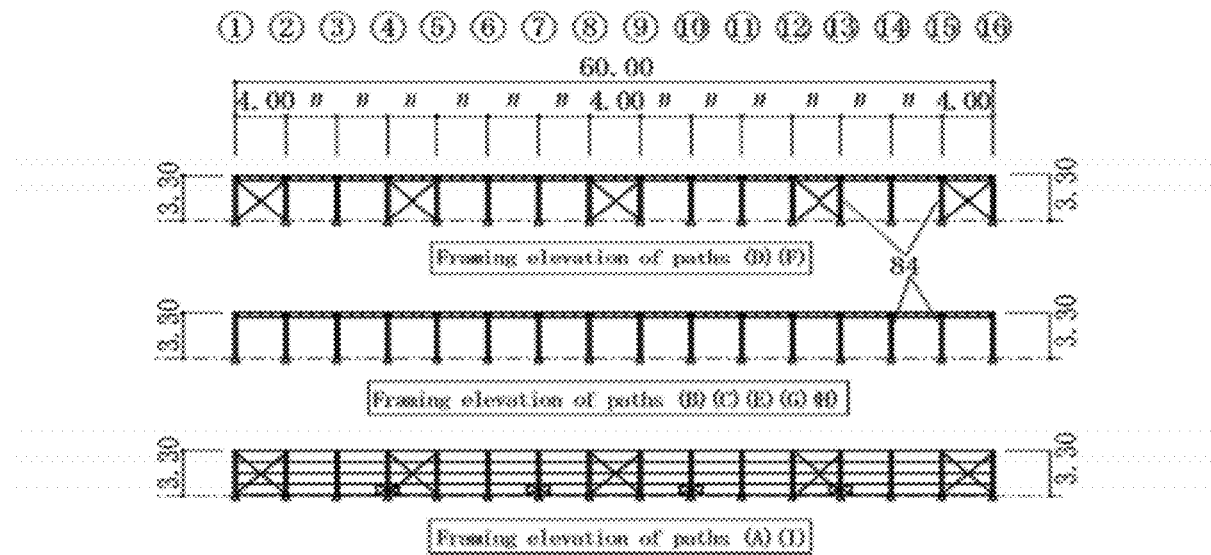
FIG. 14 is a framing elevation of each row of poles in the greenhouse windbreak mechanism in FIG. 13, in the longitudinal direction.
Figure 15:
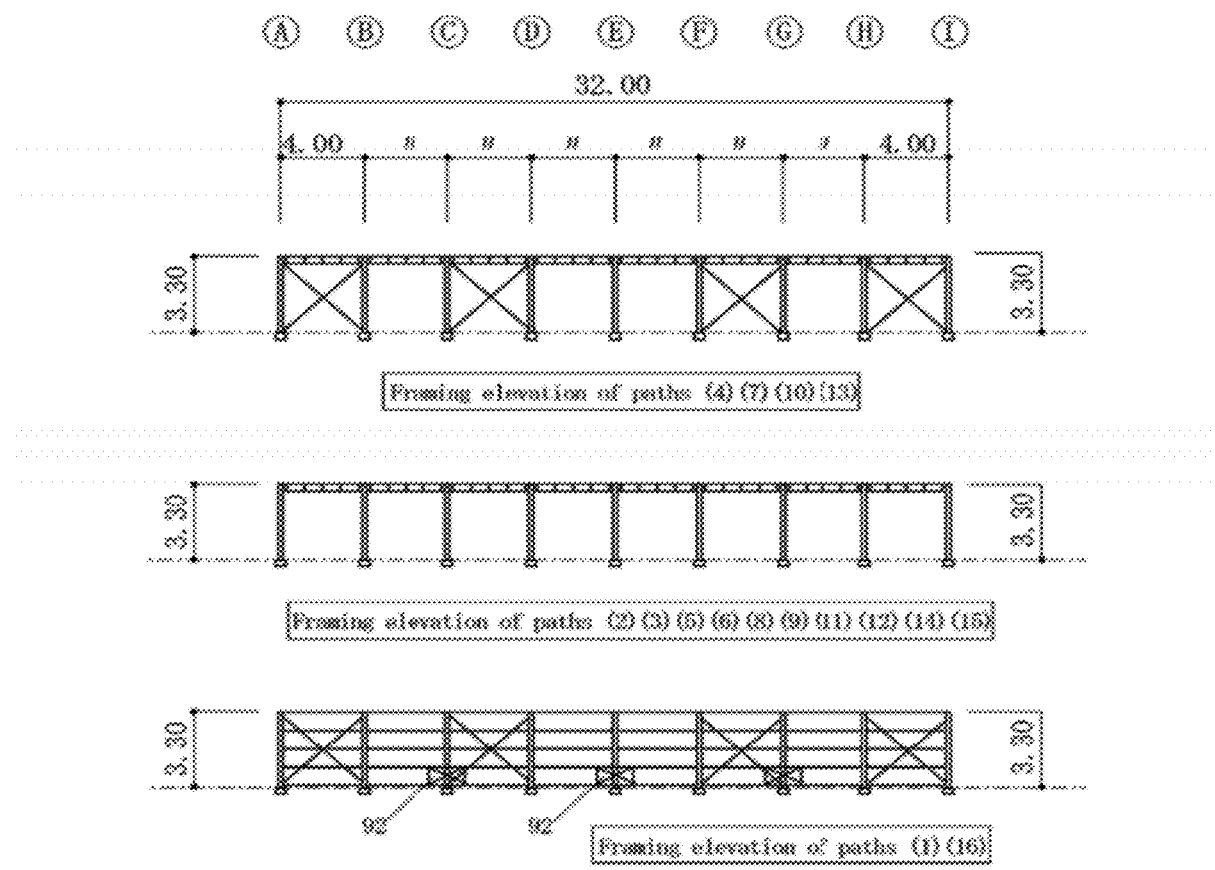
FIG. 15 is a framing elevation of each row of poles in the greenhouse windbreak mechanism in FIG. 13, in the lateral direction.

Next, the present invention will be described based on examples, but the present invention is not limited to the examples. FIG. 13 is a schematic explanation view illustrating a state where forty plastic greenhouses 80 or glass greenhouses are surrounded by a windbreak fence 82. FIG. 14 and FIG. 15 are framing elevations of each row of poles 84, wherein the windbreak fence 82 has a height of 3.3 mm. Referring to detailed views in FIG. 20 and FIG. 21, there are an iron plate with a thickness of 4.5 mm and a baffle plate 86 with a height of 130 mm (corresponding to the perforated portion) thereon, and therefore the windbreak fence 82 has a height of 3434.5 mm. The baffle plate 86 with the height 130 mm is mounted to a steel having a lipped-slot shape with sizes of 60×30×1.6 and, therefore, the slot-shaped steel closes perforations in the baffle plate, at its portion having the size 30 mm. Accordingly, the effective longitudinal width of the baffle plate 86 is 100 mm.

Figure 16:
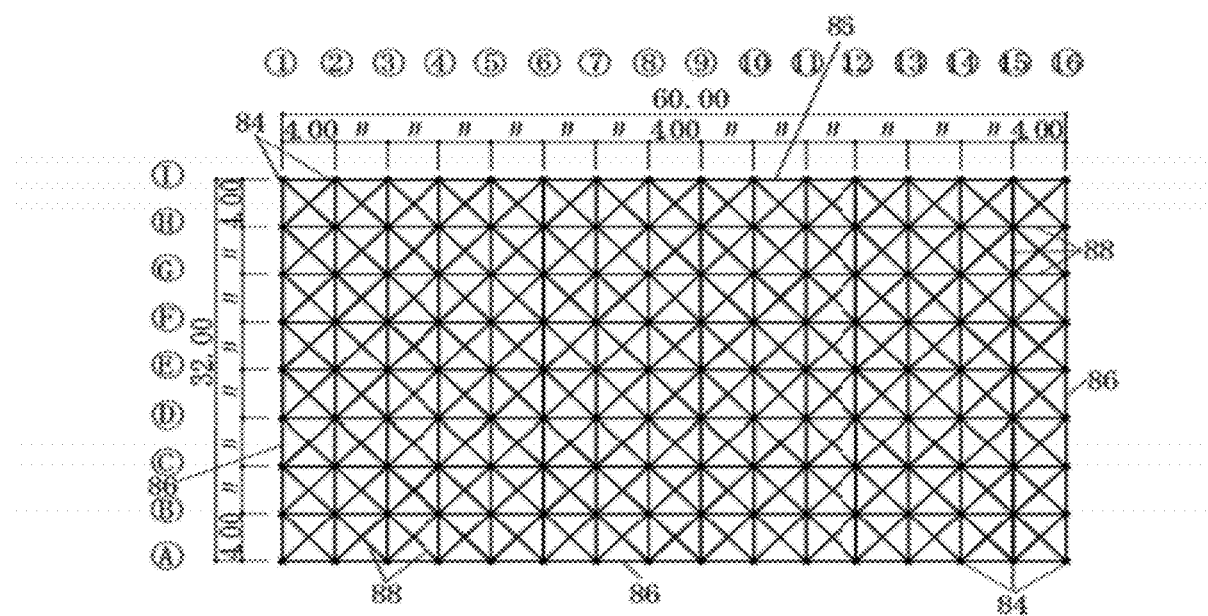
FIG. 16 is a view of the placement of the baffle plates in the greenhouse windbreak mechanism in FIG. 13, including the directions of the diagonal lines.
Figure 17:
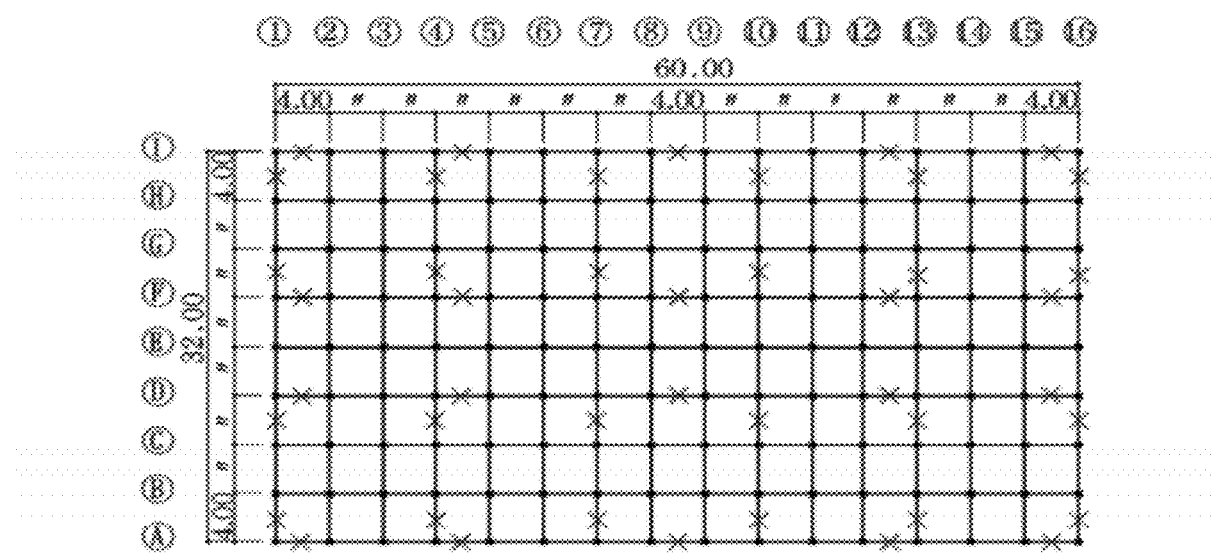
FIG. 17 is a view of the placement of braces for providing required strength to the windbreak fence in the greenhouse windbreak mechanism in FIG. 13.
Figure 18:
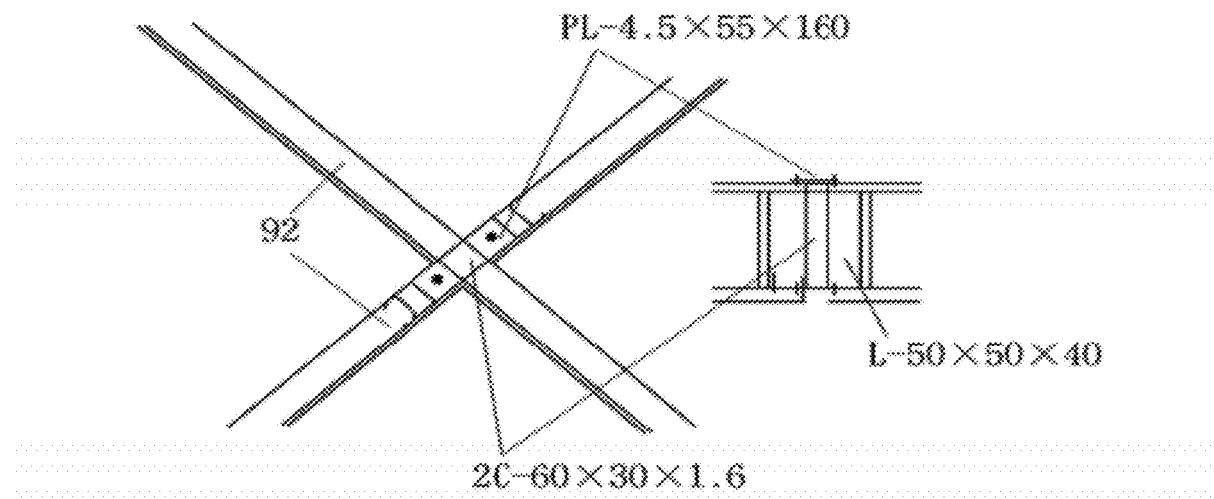
FIG. 18 is a detailed view of the mounting of the baffle plates in the directions of the diagonal lines.
Figure 19:
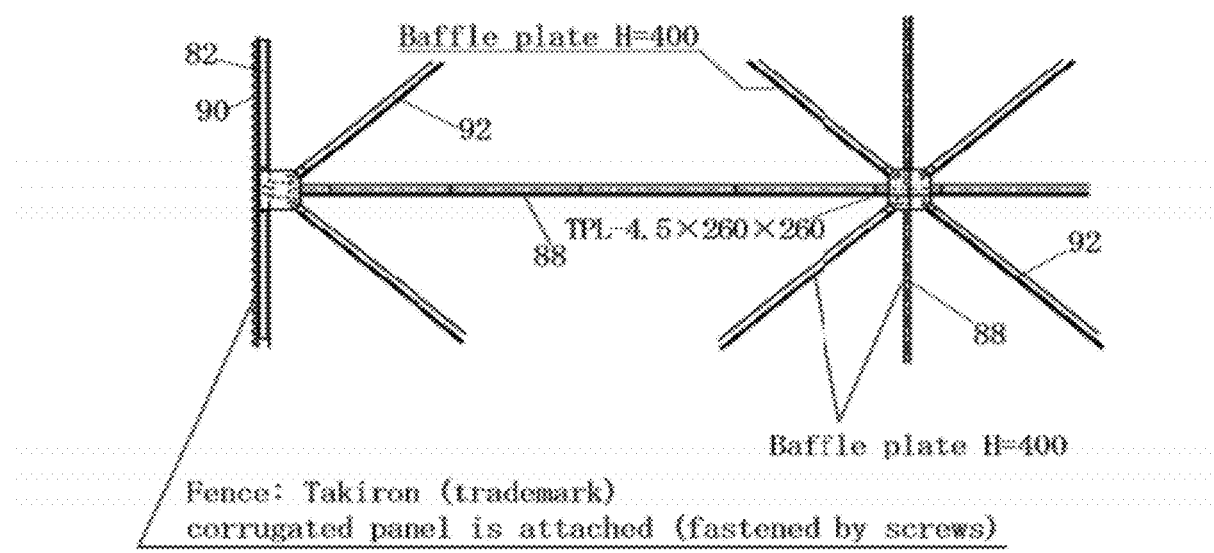
FIG. 19 is a partial plan view illustrating the mounting of the baffle plates to one another and the mounting of the baffle plates to the windbreak fence.
Figure 20:
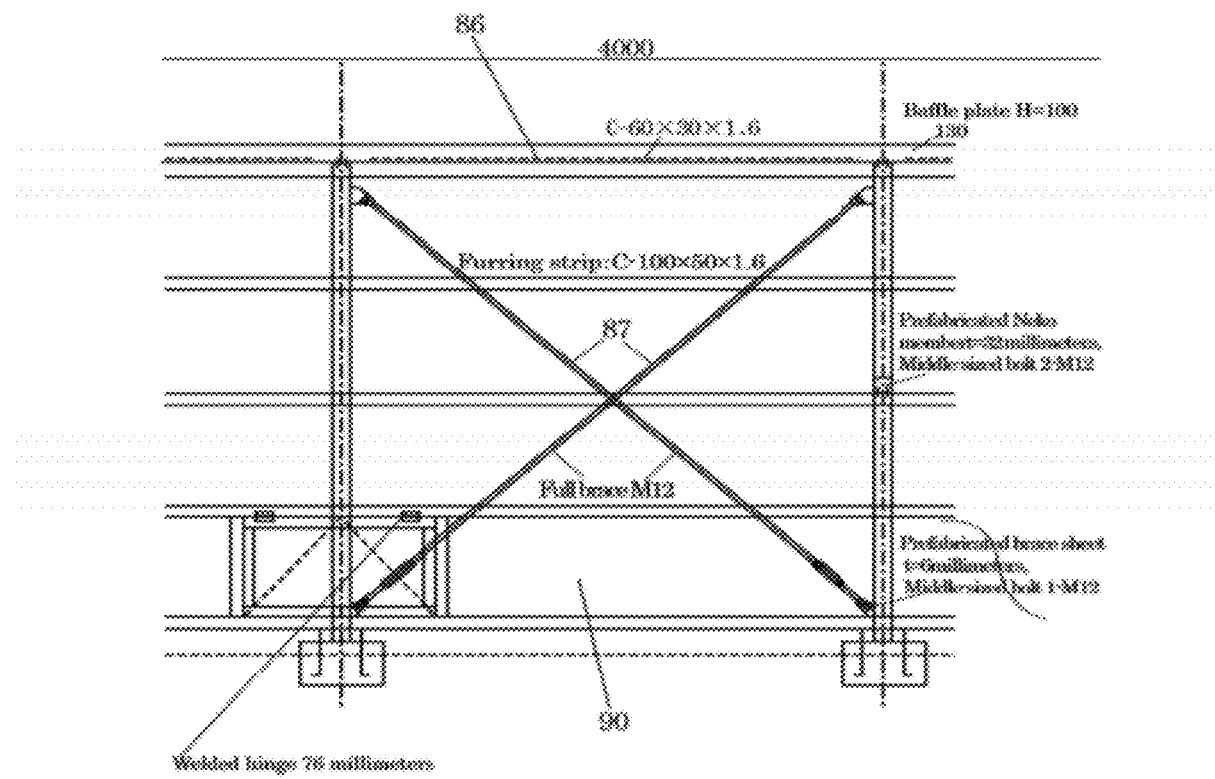
FIG. 20 is a partial side view illustrating the windbreak fence and the poles in an enlarging manner.
Figure 21:
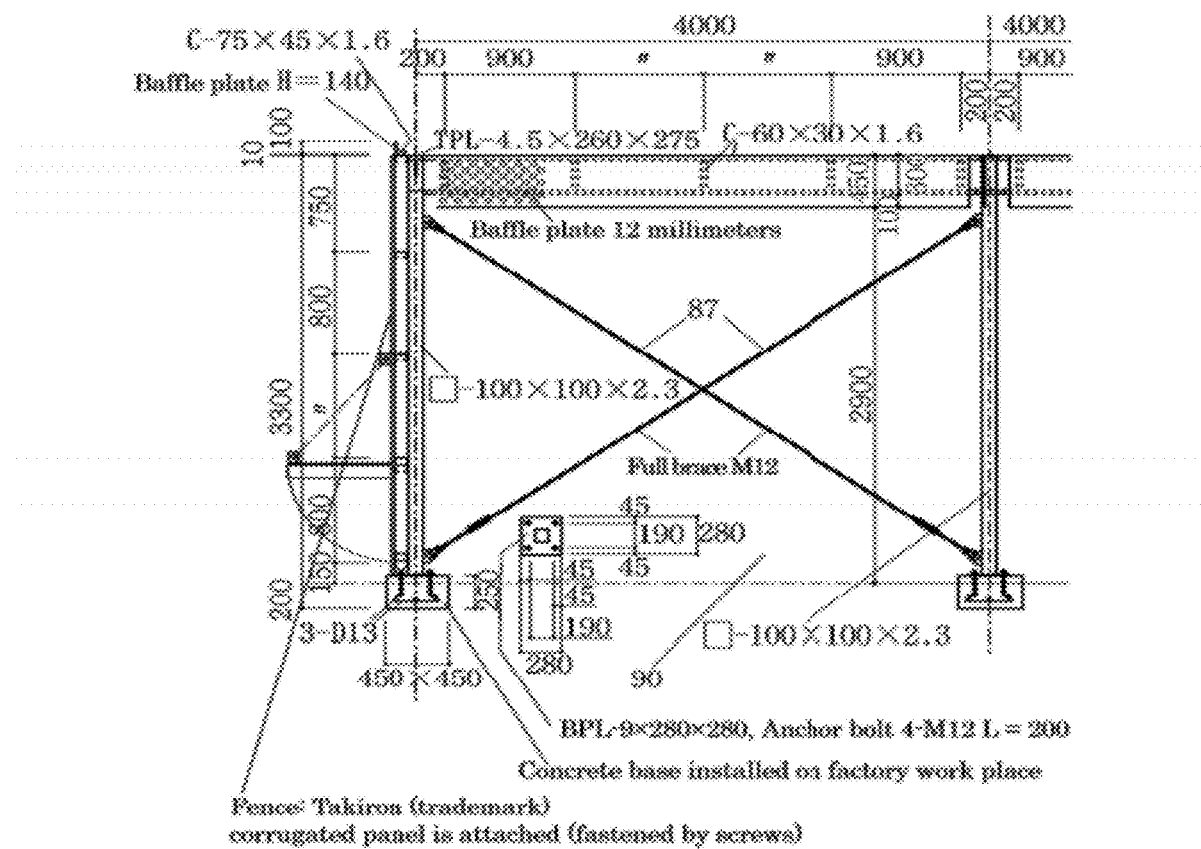
FIG. 21 is a partial side view illustrating the other portions than the windbreak fence and the poles in an enlarging manner.

As illustrated in FIG. 13, a plurality of greenhouses 80 are constructed within the windbreak fence 82, and the greenhouses have a height of 2 mm, although not illustrated. Accordingly, there is an interval of 1434.5 mm from the top portions of the greenhouses 80 to the top portion of the windbreak fence 82. As illustrated in FIG. 20 and FIG. 21, in the windbreak fence 82, there are placed wall braces 87 necessary for causing it to withstand a wind speed of 50 m/s. FIG. 17 illustrates a view of the placement thereof. FIG. 16 illustrates the portions at which baffle plates 88 are mounted, and FIG. 18 and FIG. 19 illustrate details of the mounting thereof.

The small quadrate mark in FIG. 16 indicate poles 84, and all the solid line portions other than the poles indicate the baffle plates 88. This windbreak fence 82 has a polyvinyl chloride corrugated panel 90 attached thereto. This corrugated panel is colored, by coating, in a transparent color or a color which reflects red light and far-red light in order to enable pesticide-free cultivation.

Such transparent polyvinyl chloride corrugated panels 90 are generally used as materials of roofs and walls of factories and warehouses, in order to introduce light therethrough. Accordingly, in order to improve ventilation, ventilating ascendable doors 92 (see FIG. 13) are mounted. The respective greenhouses 80 are regularly arranged, as illustrated in FIG. 13, to create paths for passing air therethrough, and the ventilating doors are mounted at the opposite ends of these paths. The baffle plates 88 illustrated in FIG. 16 are placed and mounted in 4-m squares. In this state, windstorms are diffused and blown thereinto from above. Particularly, when winds blow in the directions of the diagonal lines illustrated in FIG. 22, they become 5.656 m, due to the value 4 m. This substantially nulls the speed reduction ability.

Figure 22:
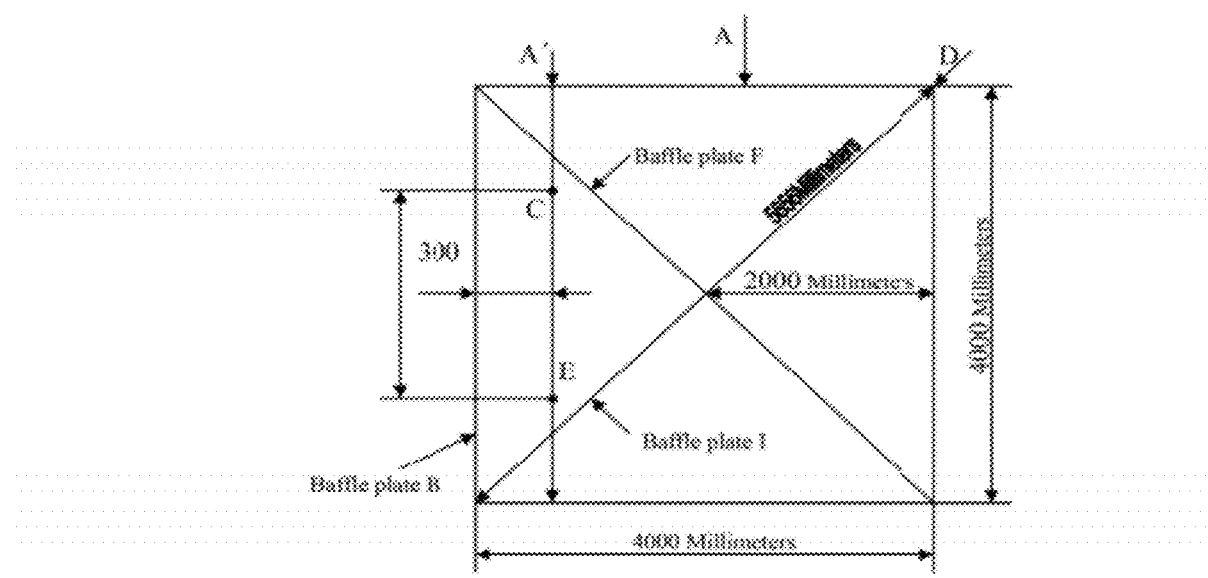
FIG. 22 is an explanation view illustrating blows of winds in the greenhouse windbreak mechanism.

On the contrary, as illustrated in FIG. 16, the baffle plates 88 are installed along the diagonal lines of the respective squares and, therefore, in the case of winds in the direction A in FIG. 22, the maximum interval is 2000 mm and, in the direction D, the maximum interval is 2828 mm. Referring to the right part of Table 28, the wind speed at the measurement position 2000 mm is {(100−72.3)/100}×50=13.85 m/s, and a windstorm at 50 m/s can be reduced in wind speed to 13.85 m/s. Furthermore, this value is a value at a position below the top portion of the windbreak fence 82 by 450 mm, but the present example regards the position below the top portion by 1434.5 mm, and the wind speed at the measurement position 2000 mm will be reduced to a wind speed close to {(100−80.9)/100}×50=9.55 m/s.

In the case of winds in the direction A' in FIG. 22, the wind speed is {(100−74)/100}×50=13 m/s, at a position below the top portion by 450 mm, with reference to Table 29A. Further, at a position therebelow by 1.5 m, a wind speed of 50 m/s is changed to {(100−82.3)/100}×50=8.85 m/s. In order to determine the interval from a baffle plate F in FIG. 22 to a measurement point E (a measurement point spaced apart by 3500 mm from the perforated portion 54), FIG. 23 was created based on dimensions around the baffle plate F. Since x equals to 500-300 and therefore is 200 mm, and a baffle plate B is parallel to the straight line A'-E, there is a right triangle shape. Accordingly, y is also 200 mm, and the interval from the baffle plate F to the measurement point E is 3200 mm. A straight line G is drawn in parallel with the baffle plate B, and a line orthogonal to the baffle plate B is drawn from a point K, so that Z equals to 150. Accordingly, the interval between the measurement point E and the baffle plate F at a position spaced apart by 150 m from the baffle plate B in parallel to the baffle plate B in FIG. 22 is 3000+200+150=3350 mm. This means that, since there is an interval of 3200 mm between the baffle plate and the measurement point 3500 mm in the right part of Table 29, the interval is increased by 150 mm since the measurement point is further spaced apart by 150 mm from the measurement point in the right part of Table 29. Referring to the right parts of Tables 28 and 29, it can be seen that the increase of about 150 mm induces no large changes.

It can be seen that, in the case of installing the baffle plates at intervals of 4 m, the intervals 4 m appear only near the baffle plates B. However, this interval is larger than that of the aforementioned experiments, only by 4000−3200=800 mm at a maximum. Furthermore, these areas are near the baffle plates B. Since it has been revealed, from the aforementioned measurement experiments, that the baffle plate 86 (the perforated portion) mounted to the windbreak fence 82 and the internal baffle plates 88 have different speed reduction abilities, it is necessary to make considerations in such a way as to distinguish therebetween. Specifically, referring to the right parts of Tables 26 to 29, even if the interval is increased by about 1 m, the baffle plates inside the windbreak fence (the right parts of Tables 26 and 28) are in areas at distances of 2000 mm or more from the windbreak fence 82 and, regarding the right parts of Tables 29 and 27, they are in areas at distances of 500 mm or more from the windbreak fence, both of which are not problematic values. Next, in the area from the windbreak fence 82 to the baffle plates 88, the maximum interval is 1500 mm and 2000 mm, and regarding the right part of Table 27, the maximum interval is 3000 mm, all of which are not problematic.

Figure 23:
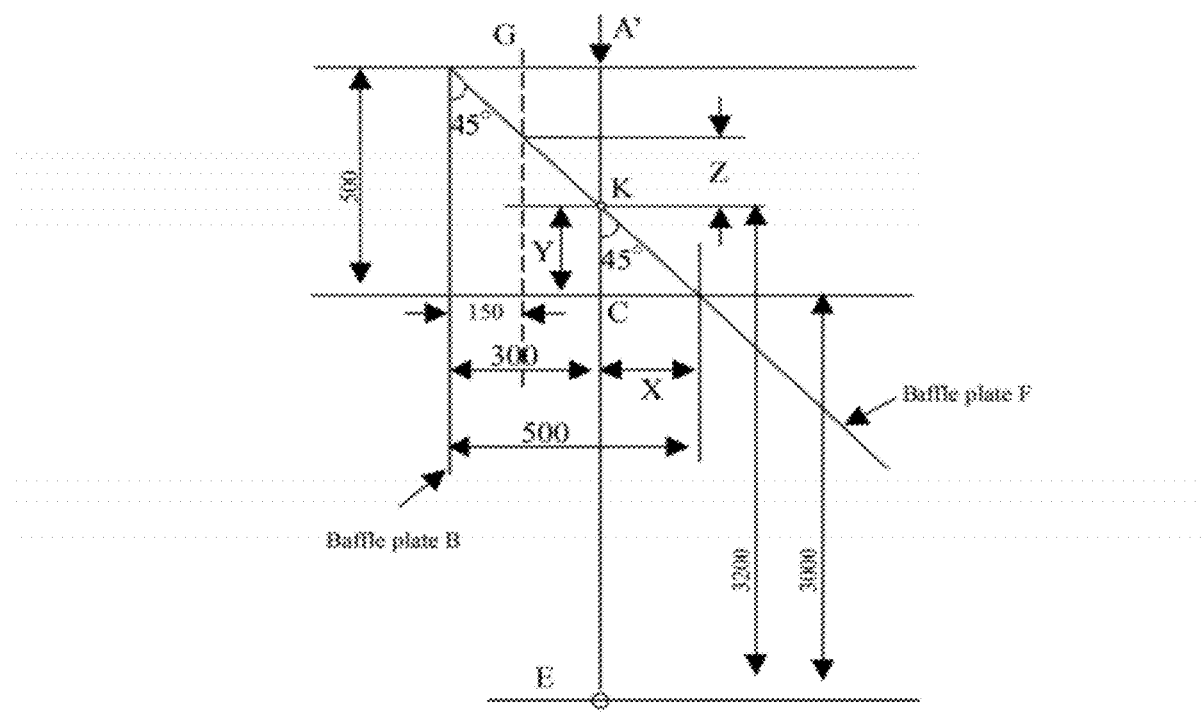
FIG. 23 is an explanation view for measurement of the wind speeds of blowing winds.

The problematic portions are portions near the baffle plates B in FIG. 22 and FIG. 23 in which the intervals 4 m appear in FIG. 22. No measurements were conducted in these portions, but in the area between the windbreak fence and the baffle plates, the area in the range of 50 to 2000 mm in the right part of Table 28 corresponds to the aforementioned problematic portions. Referring to the right part of Table 28, if the interval is increased by 800 mm (4000−3200=800), this will induce a difference between 50 mm and 1000 mm (0.8%), a difference between 500 mm and 1500 mm (9.6%), and a difference between 1000 mm and 2000 mm (9.5%), and the speed reduction ratio will be reduced by amounts corresponding thereto. Due to the reduction by these amounts, in the case of a wind speed of 50 m/s, the portion of the wind speed which will not be reduced is (9.6/100)×50=4.8 m/s. Accordingly, in calculation, this will result in a wind speed of 13.65 m/s (=8.85+4.8).

In the case of the internal baffle plates 88, the area in the range of 500 to 3500 mm regarding the right part of Table 29 corresponds to the aforementioned problematic portions. A difference between 500 and 1500 mm (9.2%), a difference between 1000 and 2000 mm (12.6%), a difference between 1500 and 2500 mm (4.3%), a difference between 2000 and 3000 mm (−0.2%), and a difference between 2500 and 3500 mm (1.9%) will be induced. Out of these speed reduction ratios, the difference between 2000 mm and 3000 mm has a negative value. This is caused by the baffle plates installed in an x shape along the diagonal lines, and the same phenomenon occurred in the aforementioned experiments. Since the speed reduction ratio will be reduced by these amounts, the wind speed will be increased by 6.3 m/s (=(12.6/100)×50), and therefore the wind speed will become 15.15 m/s (=8.85+ 6.3).

A wind speed of 15.15 m/s indicates strong winds, but it is possible to install sufficiently-inexpensive greenhouses, in such a way as to only interrupt winds with this degree of strength. Furthermore, this wind speed occurs only at portions spaced apart by about 10 to 30 mm from the baffle plates, and these are only in the range of 20 to 60 mm at the opposite sides of the baffle plates. Therefore, there is a significantly low possibility that windstorms at a wind speed of 50 m/s blow just at this angle. If the direction A' in FIG. 22 is obliquely inclined by only a small amount, this decreases the distance by which winds which blow between the baffle plates F and I in FIG. 22 travel. In the present example, 4-m squares are employed between the baffle plates in consideration of these facts, but in the event of the occurrence of problems after the construction, it is possible to take countermeasures thereagainst, such as changing the longitudinal width of the baffle plates to 450 or 500 mm or increasing the height of the windbreak fence for increasing the interval between the greenhouse top portions and the windbreak-fence top portion.

Non-Patent literature 1 describes spectral balances for main photoreactions of plants, as follows, in pages 78 and 79.

"FIG. 33 illustrates a spectrum for a main photo reaction of plants. This illustrates relative values of effects per unit energy. Plants basically grow by photosynthesis [8], and the other important photoreactions include photomorphogenesis. This includes low fluence rate-response [10] and [11] and high fluence rate-response [9], which induce quality changes in plants, such as seed germination, flower bud differentiation, efflorescence, evolution of cotyledons, chlorophyll synthesis, and intercalary elongation, through actions of pigments called phytochrome. Under strong light, chlorophyll synthesis has a tendency to be facilitated by blue light while being obstructed by red light. Red light offers a largest effect in photosynthesis, while blue light is necessary for normal morphogenesis in leaves. In other words, red light in the range of about 640 to 690 nm and blue light in the range of 420 to 470 nm are effective. It has been revealed, from experiments for growth with varying spectral distributions, that it is desirable to employ a composition of red light and blue light in a preferable balance, in order to grow plants sanely. The ratio between these two spectral is referred to as an R/B ratio, and it is likely that the value thereof is preferably in the range of 1 to 10, in general.

Recently, there has been found that far infrared light (FR) centered at 730 nm shown at the right end of FIG. 33 has a prominent intercalary elongation effect and, also, there has been revealed that the red-to-far-infrared ratio R/FR has a nonnegligible effect on growth. In general, the elongation is facilitated in the case of R/FR<1, and there is a tendency to cause dwarfing in the opposite case. Visible light cannot easily pass through clusters of plants, which increases the ratio of far infrared light, thereby making R/FR smaller than 1. Plants could adapt to this condition. Accordingly, far infrared light has the function of facilitating the elongation and growth of plants. Most of photomorphogenesis is facilitated by red light, but is reversibly obstructed by far infrared light."

Assuming that spectral radiances in the wavelength range of 615 to 680 nm which have a red light effect on photomorphogenesis is red light R, spectral radiances in the blue light wavelength range of 420 to 470 nm for strong light reactions in photomorphogenesis is blue light B, and spectral radiances in the wavelength range of 700 to 750 nm which have a far infrared light effect on photomorphogenesis is far infrared light FR, sunlight is attenuated by reflection so that it changes such that the R/B ratio increases and also changes such that the R/FR ratio decreases. Hereinafter, the ratios of red light R to blue light B and far infrared light FR will be referred to as photo ratios. The changes of the photo ratios are induced by the physical phenomenon that light with longer wavelengths has higher energy. Specifically, light (B) has a shortest wavelength, and light (R) and light (FR) have longer wavelengths in ascending order of (R) and (FR), and, therefore, light (B) has lowest energy, light (R) has second highest energy and light (FR) has highest energy. When sunlight is inserted into clusters of plants, it impinges on branches and leaves of trees because the light (FR) has the highest energy, which increases the R/B ratio since (B) attenuates more largely than (R) while decreasing the R/FR ratio since (R) attenuates more largely than (FR).

It has also been found from experiments that, for C3 plants, there are places most suitable for their respective species, within clusters of plants, namely there are photo ratios most suitable therefor. In consideration of the fact that C3 plants have different photosynthesis-rate saturation light intensities for their respective species and, also, the fact that sunlight has different illuminances at the entrance and the back of the clusters of plants, it is suggested that there are places most suitable for the respective species of C3 plants within the clusters of plants. Shade plants, out of C3 plants, naturally grow in shades, while semi-shade plants, out of C3 plants, naturally grow in places in which there is mixture of sunny places and shades resulted from sunshine streaming through leaves. Progenitors of crops, out of C3 plants, expect shade plants and semi-shade plants, have naturally grown in sunny places resulted from sunshine streaming through leaves. Humans have cultivated them in bare grounds and repeatedly performed breed improvements thereon to create crops C3 plants expect shade plants and semi-shade plants. Accordingly, photo environments which enable pesticide-free cultivation for crops of C3 plants, expect shade plants and semi-shade plants, are environments having photo ratios having spectra of sunny places resulted from sunshine streaming through leaves, rather than shades and bare grounds.

This can be clearly seen from the fact that, when panax ginsengs, which are shade plants, are planted in bare grounds, they fade and, also, the fact that when Japanese horseradishes are planted in bare grounds, they fade. If C3 plants, except shade plants and semi-shade plants, are introduced into bare grounds from sunny places resulted from sunshine streaming through leaves, this will cause them to fall ill or cause them to be eaten by destructive insects. In other words, in order to prevent their fading or prevent ills and destructive insects, it is necessary only to return them to places in respective photo environments within clusters of plants, which can be called their hometowns.

The house windbreak mechanism according to the present invention is constituted by a plurality of baffle plates, poles and the like, which causes sunlight to impinge thereon. In other words, it is possible to provide photo environments close to clusters of plants.

Experiment (1)

1. Objects of Experiments

Red light (R) has a wavelength range 615 to 680 nm, which is coincident to functional wavelengths for photosynthesis. Red paint of the red light (R) is sprayed to plastic greenhouse for coloring them until their transmittance reaches 50 to 70%, in order to confirm that the growth rate of plants is affected by the fact that the ratio of functional wavelengths for photosynthesis in the cultivation space is larger than that in bare grounds and by the fact that the balance among red light (R), blue light (B) and far infrared light (FR) for photomorphogenesis has been changed to improve the vitality of plants.

2. Places for Experiments

Shinonome Town, Kochi City, Kochi Prefecture

3. Implementation Term

Jan. 11, 2008 to Mar. 27, 2008

4. Cultivation Condition

Figure 30:
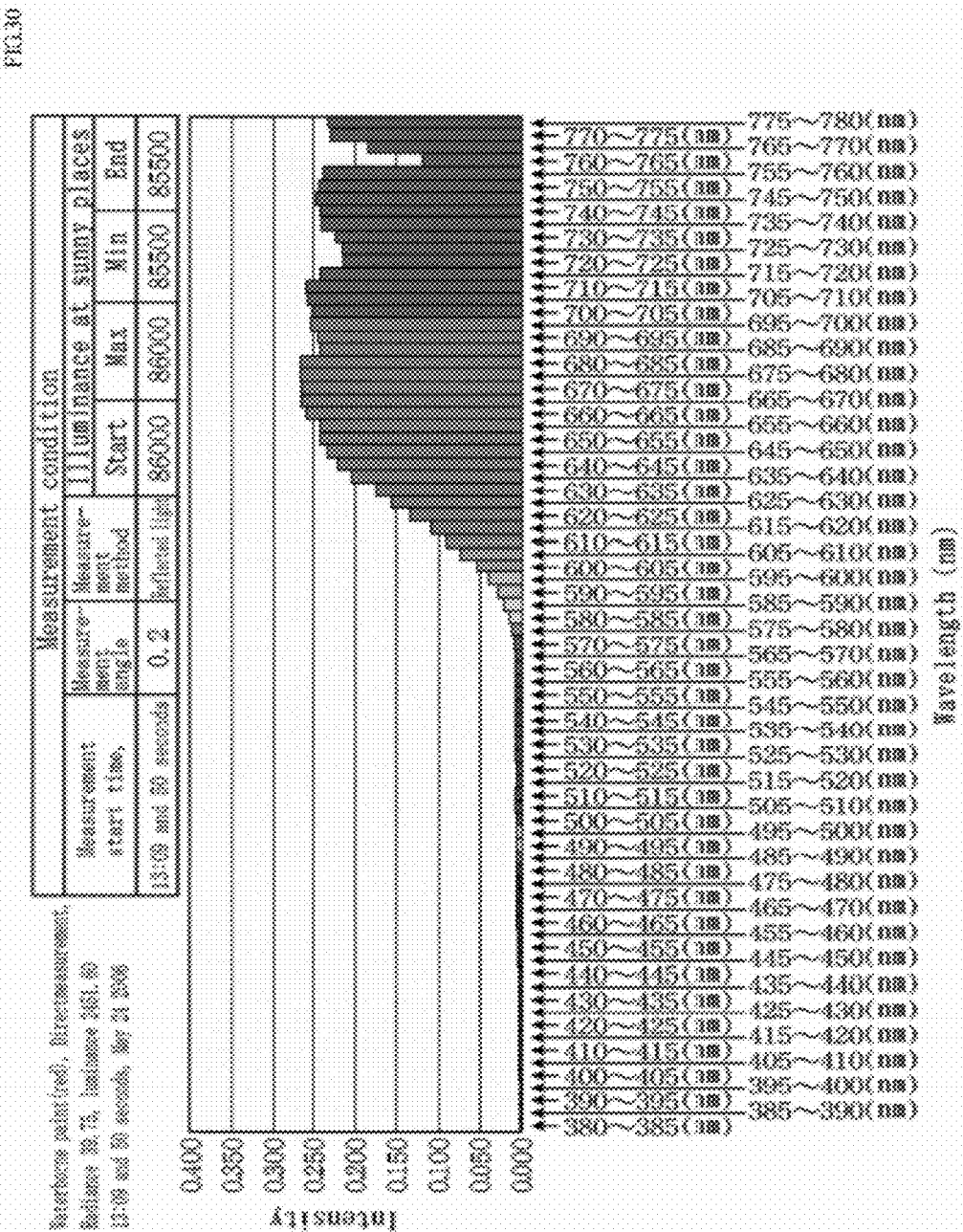
FIG. 30 is a spectrum of red-color waterborne paint.

Greenhouse G-a: see FIG. 29. Waterborne paint (having a red color, see FIG. 30, and being of a spray type) was sprayed to a vinyl with a thickness of 0.05 mm which was made of polyethylene until its average transmittance reached 46.4% to create the greenhouse, and, further, two boxes was made of foam polystyrene with a length of 770 mm, a width of 250 mm and a height of 350 mm were installed in the greenhouse.

Greenhouse G-b: see FIG. 29. Waterborne paint (having a red color, see FIG. 30, and being a spray type) was sprayed to a vinyl with a thickness of 0.05 mm which was made of polyethylene until its average transmittance reached 67.9% to create the greenhouse and, further, two boxes was made of foam polystyrene with a length of 770 mm, a width of 250 mm and a height of 350 mm were installed in the greenhouse.

Greenhouse G-c: A white-light fluorescent lamp was mounted to the greenhouse G-b, and the vinyl had a red color with an average transmittance of 66.7%. The white-light fluorescent lamp was lighted during a time period in the morning from AM 5:40 to AM 8:30 and a time period in the evening from PM 4:40 to PM 6:30.

Greenhouse G-d: see FIG. 29. No red vinyl (reference numeral 12) was employed. Instead thereof, the greenhouse employed a vinyl with a tint pink color. The vinyl greenhouse was constituted by the tint-pink vinyl surrounding its ceiling and periphery in order to prevent sunlight from being inserted therein, and, further, two boxes was made of foam polystyrene with a length of 770 mm, a width of 250 mm and a height of 350 mm were installed in the vinyl greenhouse. See the spectrum of the color of the tint-pink vinyl in FIG. 31.

In order to warm up the aforementioned greenhouses G-a, G-b, G-c and G-d, electric heaters were installed in the plastic greenhouses constituted by the vinyl surrounding their ceilings and peripheries.

Greenhouse [8]: A normal plastic greenhouse installed at a position far from the red greenhouses and red reflective plates. See FIG. 32. Two boxes was made of foam polystyrene with a length of 770 mm, a width of 250 mm and a height of 350 mm were installed therein. The plastic greenhouse was constituted by a vinyl surrounding its ceiling and periphery, in order to prevent sunlight from being inserted therein. An electric heater was installed in the plastic greenhouse, in order to warm it up.

5. Photo Environment

The greenhouse [8] was a normal plastic greenhouse in which an electric heater was installed for warming it up. The greenhouses G-a, G-b, G-c and G-d were installed within a normal plastic greenhouse. Accordingly, sunlight was passed through the normal vinyl, then was passed through the vinyl subjected to spraying of the red paint and, then, entered the cultivation spaces. Table 37 illustrates the average transmittances under the aforementioned conditions. Measurements were conducted at three positions (A), (B) and (C) in the cultivation spaces.

TABLE 37

| | | | Feb. 15 2008 (Friday) [sunny] | | | | | | |
|---|---|---|---|---|---|---|---|---|---|
| Measurement Place | Measurement Time | Illuminance at Bare Ground (lx) | Illuminance inside Greenhouse (lx) | | | Transmittance (%) | | | Average Transmittance |
| | | | (A) | (B) | (D | (A) | (B) | (C) | |
| Greenhouse G-a | 11:26 | 69,800 | 24,700 | 25,200 | 29,100 | 35.4 | 36.1 | 41.7 | 37.70% |
| Greenhouse G-b | 11:29 | 70,200 | 35,700 | 38,400 | 37,200 | 50.9 | 54.7 | 53.0 | 52.90% |
| Greenhouse G-c | 11:34 | 71,000 | 35,100 | 38,600 | 40,600 | 49.4 | 54.4 | 57.2 | 53.70% |
| Greenhouse G-d | 11:36 | 71,300 | 52,500 | 49,100 | 53,100 | 73.6 | 68.9 | 74.5 | 72.30% |
| Greenhouse G- [8] | 11:39 | 71,900 | 62,600 | 63,700 | 61,300 | 87.1 | 88.6 | 85.3 | 87.00% |

6. Operation Procedures

Supply of water in an amount of 2 liters once everyday

Measurements of the temperatures within the greenhouses at AM 8:25, AM 10:10, PM 1:00 and PM 3:10

7. Cultivated Plants

Spinach, sunny lettuce and radish greens

8. Record of Cultivation

On Jan. 11 2008, seeds of spinach, radish greens and sunny lettuce were sown in the greenhouses G-a, G-b, G-c and G-d and the greenhouse [8].

On January 15, germination of spinach, radish greens and sunny lettuce was observed in the greenhouses G-a, G-b, G-c. Germination of radish greens and sunny lettuce had occurred in the greenhouse G-d. No germination had occurred in the greenhouse [8].

On January 18, germination of seeds of all the species sown in all the greenhouses had occurred, but the numbers of buds in the greenhouses G-a, G-b and G-c were larger than that in the greenhouse [8]. This could be seen at first glance. The difference was determined to be large, without counting.

On March 6, the radish greens and the spinach were ingathered.

On March 27, the sunny lettuce was ingathered.

9. Results of Experiments

TABLE 38

| Cultivation Greenhouse | Radish Green (including Roots) | Spinach (including Roots) | Sunny Lettuce (including Roots) | Sunny Lettuce (except Roots) |
|---|---|---|---|---|
| Greenhouse G-a | 98 g | 92 g | 196 g | 184 g |
| Greenhouse G-b | 126 g | 106 g | 210 g | 190 g |
| Greenhouse G-c | 92 g | 140 g | 128 g | 112 g |
| Greenhouse G-d | 160 g | 90 g | 214 g | 202 g |
| Greenhouse G-[8] | 74 g | 70 g | 122 g | 108 g |

The following table illustrates the summation of comparisons in growth rate with the normal greenhouse cultivation.

TABLE 39

| Cultivation Greenhouse | Radish Green (including Roots) | Spinach (including Roots) | Sunny Lettuce (including Roots) |
|---|---|---|---|
| Greenhouse G-a | 1.3 times | 1.3 times | 1.6 times |
| Greenhouse G-b | 1.7 times | 1.5 times | 1.7 times |
| Greenhouse G-c | 1.2 times | 2.0 times | 1.05 times |
| Greenhouse G-d | 2.2 times | 1.3 times | 1.8 times |

The aforementioned experiments resulted in the fact that all the greenhouses could realize larger growth rates than that of the normal greenhouse, although the growth rates of the respective types of vegetables were slightly different from one another. This is because the greenhouses subjected to spraying of the red paint had different average transmittances, but satisfied the required photosynthesis-rate saturation light intensity. Accordingly, they were under the same condition regarding the factor of the light intensity, but, regarding the light quality, as can be seen by referring to FIG. 33, the peak wavelength range of the red light effect for photomorphogenesis was overlapped with the peak wavelength range for photonic synthesis. It has been revealed that, because of this fact, in the greenhouses subjected to the spraying of the red paint, the ratio of the photonicsynthesis functional wavelengths in the cultivation space was larger, which made the photonic-synthesis rate and the growth rate larger than the normal greenhouse. At the same time, there were different photo ratios in the greenhouses G-a to G-d. Accordingly, the results of the experiments shows that it is possible to increase the growth rate, by making the photo ratio coincident to that of a spectrum of sunny places resulted from sunshine streaming through leaves, for radish greens, spinach and sunny lettuce.

There are different photo ratios near the entrance and in the back side of clusters of plants and, in consideration of this fact, it can be understood, from the aforementioned results of experiments, there are photo ratios which are most suitable for the respective species of $C_3$ plants including radish greens, spinach and sunny lettuce. Although there are most suitable photo ratios therefor, it is not necessary to search for these photo ratios. This is because the photo ratio changes since sunlight is reflected or transmitted as described above. Accordingly, species which adapt to and naturally grow in the optical environment at the entrance of clusters of plants can adapt to sunlight which is less reflected. In other words, they prefer to environments which have photo ratios less different from those of bare grounds and have higher photosynthesis-rate saturation light intensities. On the other hand, species which adapt to and naturally grow in optical environments in the back of clusters of plants or in clusters of dense plants are suitable for sunlight which has been repeatedly reflected many times. In other words, they prefer to environments which have photo ratios largely different from those of bare grounds and have significantly lower photosynthesis-rate saturation light intensities.

Accordingly, it is necessary only to form cultivation greenhouses from an optically-transparent material which is made of a material capable of passing, therethrough, visible light rays in the wavelength range of 380 to 780 nm out of sunlight and is characterized in that the spectrum of its color has respective peak values for red light (R) and far infrared light (FR) and, also, spectral radiances in wavelength ranges other than those of the red light (R) and the far infrared light (FR) are zero or smaller than the spectral radiances of the red light (R) or the far infrared light (FR). Further, it is necessary only to ensure brightness with photosynthesis-rate saturation light intensities for vegetables to be cultivated within the inside of the cultivation greenhouses, with a predetermined transmittance of the optically-transparent material. Further, even with such an optically-transparent material, the photo ratio is changed depending on the thickness, type of the material thereof, the density of its color and the like. Therefore, it is necessary only to ensure brightness with photosynthesis-rate saturation light intensities for crops of $C_3$ plants to be cultivated within the inside of the cultivation greenhouse, with a predetermined transmittance of the optically-transparent material.

Experiment (2)
1. Object

During the summer season having bright sunshine, there is sufficient brightness even if sunlight is passed through a red-colored vinyl. Accordingly, eggplants were cultivated within plastic greenhouses employing a red-colored vinyl and being capable of ensuring brightness with a photosynthesis-rate saturation light intensity for eggplants within the cultivation greenhouses and the number of ingathered crops was compared.

2. Place for Experiments
Shinonome Town, Kochi City, Kochi Prefecture
3. Experimental period
Jul. 15, 2008 to Aug. 30, 2008
4. Conditions of Experiments
4-1. The Equipment of the Cultivation greenhouses: hereinafter, "red greenhouses" will refer to cultivation greenhouses painted in a red color at their portions other than the vinyl and the outside of pots within the greenhouses.

Cultivation greenhouse [2]: a red greenhouse having a red vinyl attached thereto without employing a normal vinyl Cultivation greenhouse [14]: a red greenhouse employing a normal vinyl and having a reflective plate and a red net attached thereto (see FIG. 34)

Cultivation greenhouse [8]: a normal plastic greenhouse installed at a position far from the red greenhouses (see FIG. 32)

4-2: Spectra of Materials used for Realizing Optical Environments within Cultivation Greenhouses as in 4-3

Waterborne paint (a red-color spray) was employed in order to color the reflective plates and the red vinyl in a red color. See FIG. 30.

See FIG. 35 illustrating the spectrum of the oil-based paint used for coloring the insides of the cultivation greenhouses and the net in a red color.

4-3. Illuminance within Respective Greenhouses and Illuminance in Bare Grounds

The following table illustrates the illuminances in a bare ground and the illuminances within the greenhouses [2] [14] around PM 3:00. The photosynthesis-rate saturation light intensity for eggplants is 40000 lx.

TABLE 40

Aug. 25 2008 (Monday) [mostly sunny]

| Measurement Place | Measurement Time | Illuminance at Bare Ground | Inside Greenhouse | | Optical Transmittance |
|---|---|---|---|---|---|
| | | | Illuminance | Average Illuminance | |
| Cultivation Greenhouse 2 (Red-sprayed Greenhouse) | 14:56 | 72000 lx | 56500 lx 54500 lx 56000 lx | About 55700 lx | 77.40% |
| Cultivation Greenhouse 14 (Red-net Greenhouse) | 14:58 | 71500 lx | 48000 lx 46000 lx 47000 lx | About 47000 lx | 65.70% |
| Cultivation Greenhouse 8 (Farmer Greenhouse) | 15:03 | 70500 lx | 61000 lx 63000 lx 62000 lx | About 62000 lx | 87.90% |

5. Cultivation Method of Experiment (2)

5-1. Eggplants (Senryo 2-go/Tonashimu)

Operation Procedures

Measurements of the temperature and the humidity were conducted at four times a day at AM 8:25, AM 10:10, PM 1:00 and PM 3:10.

At PM 1:00, the east reflective plate was set, instead of the west reflective plate. Measurements of the temperature and the humidity were conducted, and the number of flowers was checked, and sprayed Tomato Tone which contain fruit-setting hormone was applied thereto. Water was supplied in an amount of 2 liters (the amount of water was doubled in the days previous to holidays).

At about sunset, water was supplied in an amount of 2 liters (the amount of water was doubled in the days previous to holidays).

The east reflective plate was withdrawn, and the west reflective plate was ascended.

6. Results of Experiment (2)

July 15 (Tuesday); the cultivation was started.

July 19 (Saturday); flowers started to bloom. The temperature within the greenhouse [2] reached 40 degrees C.

July 21 (Monday); the temperatures within the greenhouses [2] and [14] reached 40 degrees C. Flowers abscised in the greenhouses [14] [8].

July 26 (Saturday); fans were installed in the greenhouses [2], [14] and [8], since the temperatures in the greenhouses were excessively high. The temperatures therein were dropped by about 5 degrees C. by the fans.

August 7 (Thursday); a single eggplant was ingathered from the greenhouse [2], and two eggplants were ingathered from the greenhouse [8]. There will be described below, the total sum of flowers which had bloomed up to today, the total sum of flowers which had abscised up to today, and the total sum of effective bloomed flowers which was resulted from the subtraction of the number of abscised flowers from the number of bloomed flowers.

TABLE 41

| Greenhouse | Blossomed Flowers | Abscised Flowers | The Number of Effective Flowers |
|---|---|---|---|
| [2] | 28 | 3 | 25 |
| [14] | 19 | 4 | 15 |
| [8] | 28 | 9 | 19 |

August 30 (Saturday)

TABLE 42

| Greenhouse | Blossomed Flowers | Abscised Flowers | The Number of Effective Flowers | The Total Sum of Ingathered Crops |
|---|---|---|---|---|
| [2] | 100 | 43 | 57 | 39 |
| [14] | 60 | 28 | 32 | 19 |
| [8] | 89 | 57 | 32 | 27 |

Occurrences of injurious insects were observed in the greenhouse [8], but no occurrence of injurious insects was observed in the greenhouses [2] and [14]. There was induced a sufficient difference in amount of crops between the greenhouses [2] and [8]. In other words, the object of the experiment was attained, and the experiment was completed today.

The greenhouses [2] [14] [8] had, inside thereof, brightness equal to or more than 40000 lx which is a photosynthesis-rate saturation light intensity for eggplants. Regarding the brightness within the greenhouses, the greenhouse [8] had highest brightness, the greenhouse [2] had second highest brightness, and the greenhouse [14] had highest darkness. Accordingly, the amount of eggplants ingathered in the darkest greenhouse [14] was smallest, as a matter of course. However, as of August 30, the amount of eggplants ingathered in the greenhouse [2] having darkness larger by about 10% than that of the brightest green house [8] was about 1.44 times that of the greenhouse [8]. By making the R/B ratio larger than that of bare grounds and also making the R/FR ratio smaller than that of bare grounds, it is possible to ingather a larger amount of eggplants, even with brightness lower by about 10%. Further, regarding the amount of eggplants ingathered in the green house [14] having brightness lower by about 24%, the amount of eggplants ingathered in the green house [8] was about 1.42 times that of the green house [14].

However, the greenhouse [14] having a smallest optical transmittance, namely having a largest R/B ratio in comparison with that of bare grounds and having a smallest R/FR ratio in comparison with that of bare grounds, out of the greenhouses [2] [14] [8], had highest activity. This is revealed by the fact that the number of abscised flowers was smallest. The greenhouse [2] had second highest activity and, therefore, it had been revealed that the injurious insect preventing effect was increased with increasing amount of change in the photo ratio. As of August 30, a larger amount of flowers had been abscised in the greenhouse [8], and therefore the number of effective flowers resulted from the subtraction of the number of abscised flowers from the number of bloomed flowers was equal to that of the greenhouse [14]. Eggplants have the property of certainly producing fruit after blooming.

Accordingly, the fact that the number of effective flowers was equal thereto indicates that the numerical value indicative of the amount of crops ingathered in the greenhouse [8] which was 1.42 times that of the greenhouse [14] was a halfway numerical value, and finally the difference in amount of ingathered crops therebeween would become smaller than 1.42.

The present experiments revealed that it was possible to provide the effect of increasing the amount of ingathered crops in addition to the injurious-insect preventing effect, by performing cultivation while maintaining brightness with a photosynthesis-rate saturation light intensity for plants to be cultivated, in an optical environment having a larger R/B ratio than that of bare grounds and having a smaller R/FR ratio than that of bare grounds.

DESCRIPTION OF REFERENCE NUMERALS

1: Greenhouse windbreak mechanism
2: Plastic greenhouse
3: Windbreak fence
5: Ventilation portion
7: Baffle plate
12: Red vinyl (waterborne paint: red color)
13: Red vinyl supporting tool (oil-based paint: red color)
14: Two boxes was mad of foam polystyrene for cultivation (oil-based paint: red color)
15: Light shield plate (for surrounding the periphery for preventing light from being inserted therein, veneer plates which are not colored)
16: Greenhouse (red net: oil-based paint) created by applying a red net to only the ceiling of a normal plastic green house having vinyl attached to its periphery and ceiling (vinyl: transparent)
17: Reflective plate (waterborne paint: red color)
18: Reflective-plate supporting tool (oil-based paint: red color)
19: Six cultivation pots (oil-based paint: red color)
20: Normal plastic greenhouse having vinyl attached to its ceiling and periphery (transparent)

The invention claimed is:

1. A greenhouse windbreak mechanism comprising:
a windbreak fence which surrounds one or more cultivation greenhouses and is placed to be erected with a larger height than that of the cultivation greenhouses;
a ventilation portion which is formed, at an upper portion of the windbreak fence, to have a predetermined longitudinal width from the upper end of the windbreak fence and includes a plurality of through holes which are dispersedly placed; and
a plurality of baffle plates erected internally of said windbreak fence and laterally adjacent said ventilation portion;
the plurality of baffle plates which form a plurality of through holes in its entire surface or partially for passing strong winds there through when they are laterally placed above the cultivation greenhouses;
wherein the ventilation portion is provided in the direction of the center axis of the through hole of a baffle plate; and
wherein the ventilation portion and the baffle plates alleviate strong winds intruding into the inside of the mechanism by getting around the upper end of the windbreak fence, when the strong winds impinge on the windbreak fence.

2. The greenhouse windbreak mechanism according to claim 1, wherein the ventilation portion is formed to have a longitudinal width of 50 to 200 mm from the upper end of the windbreak fence.

3. The greenhouse windbreak mechanism according to claim 1, wherein, when strong winds pass through the baffle plates, the average wind speed value thereof is reduced to 24 to 32%.

4. The greenhouse windbreak mechanism according to claim 1, wherein a lateral width of the baffle plates is larger than the longitudinal width of the ventilation portion.

5. The greenhouse windbreak mechanism according to claim 1, wherein in the placement of the baffle plates in as plane at an upper portion of the greenhouse windbreak mechanism, the baffle plates are arranged at equal intervals in the longitudinal and lateral directions and in a brace shape, in their entirety.

6. The greenhouse windbreak mechanism according to claim 1, wherein the windbreak fence is made of a transparent or semi-transparent material.

7. The greenhouse windbreak mechanism according to claim 1, wherein the windbreak fence is vertically fixed by supporting column which is vertically erected on the ground.

8. The greenhouse windbreak mechanism according to claim 1, wherein an openable ventilating door is mounted at a portion of the windbreak fence.

* * * * *